(12) United States Patent
Matsumoto et al.

(10) Patent No.: US 10,942,085 B2
(45) Date of Patent: Mar. 9, 2021

(54) OSCILLATION DEVICE WITH COUNTER BALANCER

(71) Applicant: KOKUSAI KEISOKUKI KABUSHIKI KAISHA, Tama (JP)

(72) Inventors: Sigeru Matsumoto, Tokyo (JP); Hiroshi Miyashita, Tokyo (JP); Kazuhiro Murauchi, Tokyo (JP)

(73) Assignee: KOKUSAI KEISOKUKI KABUSHIKI KAISHA, Tokyo (JP)

( * ) Notice: Subject to any disclaimer, the term of this patent is extended or adjusted under 35 U.S.C. 154(b) by 228 days.

(21) Appl. No.: 16/034,777

(22) Filed: Jul. 13, 2018

(65) Prior Publication Data
US 2018/0321111 A1    Nov. 8, 2018

Related U.S. Application Data

(63) Continuation-in-part of application No. PCT/JP2017/000978, filed on Jan. 13, 2017.

(30) Foreign Application Priority Data

Jan. 15, 2016    (JP) .............................. JP2016-006691
Jan. 15, 2016    (JP) .............................. JP2016-006692
(Continued)

(51) Int. Cl.
*G01M 7/06*    (2006.01)
*G01M 7/02*    (2006.01)
*B06B 1/04*    (2006.01)

(52) U.S. Cl.
CPC ............... *G01M 7/06* (2013.01); *B06B 1/045* (2013.01); *G01M 7/022* (2013.01); *G01M 7/027* (2013.01)

(58) Field of Classification Search
CPC .................................................. G01M 7/06
See application file for complete search history.

(56) References Cited

U.S. PATENT DOCUMENTS 4,948,123 A * 8/1990 Schook .............. A63B 21/0728
                                                             482/107
8,025,586 B2 * 9/2011 Teramoto ........... A63B 53/0487
                                                             473/221
(Continued)

FOREIGN PATENT DOCUMENTS

CN    102865986        1/2013
CN    204957624 U      1/2016
(Continued)

OTHER PUBLICATIONS

Aug. 19, 2019 Partial Search Report issued in European Patent Application No. 17738522.6.
(Continued)

*Primary Examiner* — Justin N Olamit
(74) *Attorney, Agent, or Firm* — Oliff PLC

(57) ABSTRACT

An oscillating device including a vibrating table, an actuator configured to oscillate the vibrating table in a first direction, a coupling mechanism configured to couple the vibrating table with the actuator in such a manner that the vibrating table is movable relative to the actuator in a second direction orthogonal to the first direction, and a counter balancer attached to the vibrating table and configured to compensate an imbalance of an oscillated portion including at least the vibrating table, the imbalance being caused by attaching the coupling mechanism to the vibrating table.

14 Claims, 42 Drawing Sheets

(30) Foreign Application Priority Data

Jun. 30, 2016 (JP) .............................. JP2016-131170
Oct. 19, 2016 (JP) .............................. JP2016-205586

(56) References Cited

U.S. PATENT DOCUMENTS

| | | | |
|---|---|---|---|
| 2007/0059668 A1* | 3/2007 | Mallaci | G09B 9/12 434/29 |
| 2014/0049122 A1* | 2/2014 | Matsumoto | G01M 7/027 310/12.16 |
| 2017/0030447 A1 | 2/2017 | Horiike et al. | |
| 2017/0160166 A1 | 6/2017 | Matsumoto et al. | |

FOREIGN PATENT DOCUMENTS

| | | |
|---|---|---|
| JP | S53-14557 U | 2/1978 |
| JP | S53-82372 A | 7/1978 |
| JP | S55-1539 A | 1/1980 |
| JP | H01-141441 U | 9/1989 |
| JP | H04-332839 A | 11/1992 |
| JP | 2002-236074 A | 8/2002 |
| JP | 2010-38872 A | 2/2010 |
| JP | 2011-112487 A | 6/2011 |
| JP | 2012-237736 A | 12/2012 |
| JP | 2015-105823 A | 6/2015 |
| WO | 2009/011433 A1 | 1/2009 |
| WO | 2012/147607 A1 | 11/2012 |
| WO | 2015/155928 A1 | 10/2015 |
| WO | 2016/017744 A1 | 2/2016 |

OTHER PUBLICATIONS

Nov. 13, 2019 Office Action issued in Chinese Patent Application No. 20178006934.8.
Apr. 4, 2017 International Search Report issued in International Application No. PCT/JP2017/000978.
Jul. 19, 2018 International Preliminary Report on Patentability issued in International Patent Application No. PCT/JP2017/000978.
Nov. 13, 2019 Office Action issued in Chinese Patent Application No. 201780006934.8.
Jun. 1, 2020 Office Action issued in Japanese Patent Application No. 2016-205586.
Sep. 14, 2020 Office Action issued in Japanese Patent Application No. 2017-003712.
Oct. 5, 2020 Office Action issued in Japanese Patent Application No. 2017-003711.

* cited by examiner

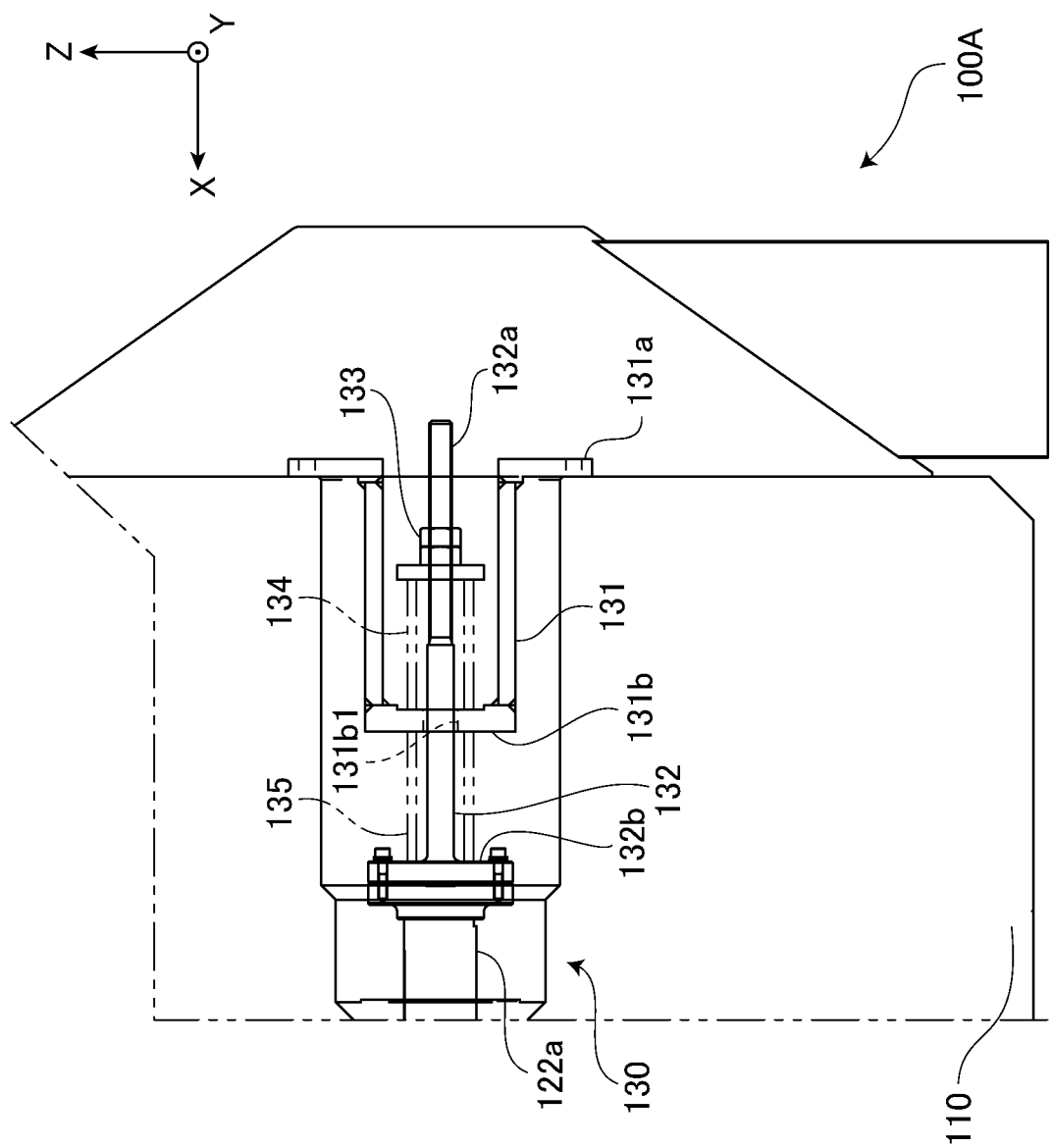
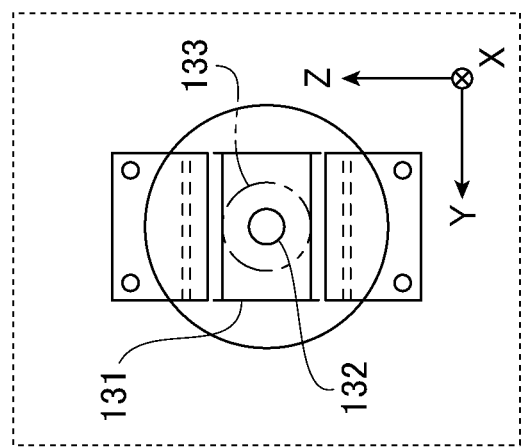
FIG. 11

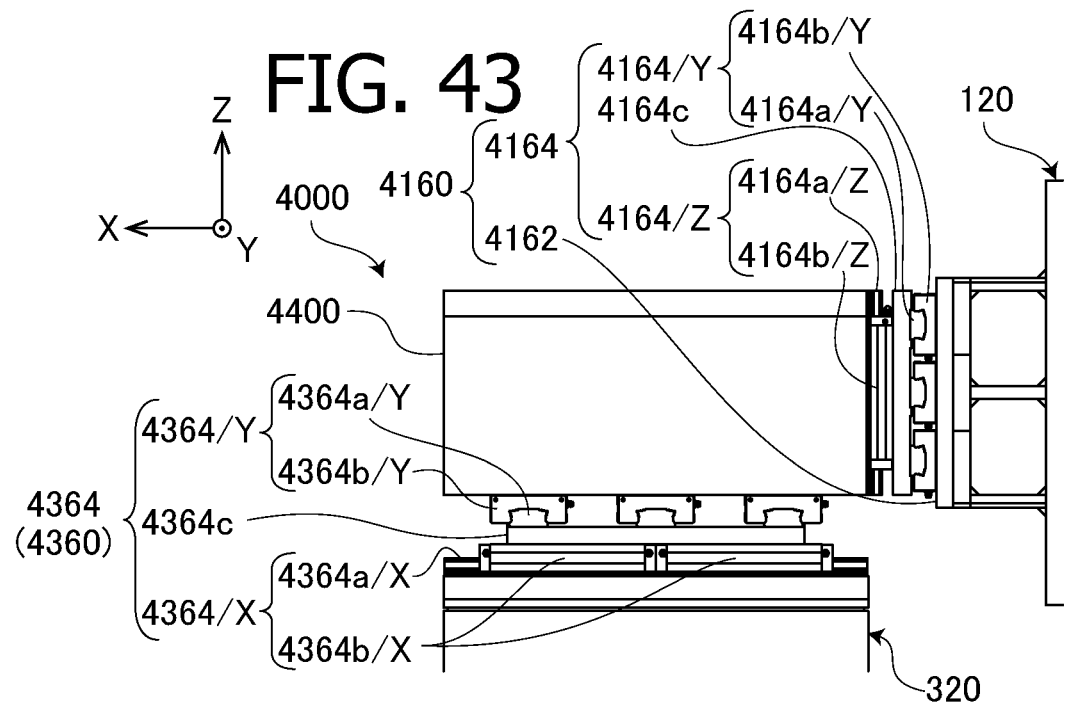
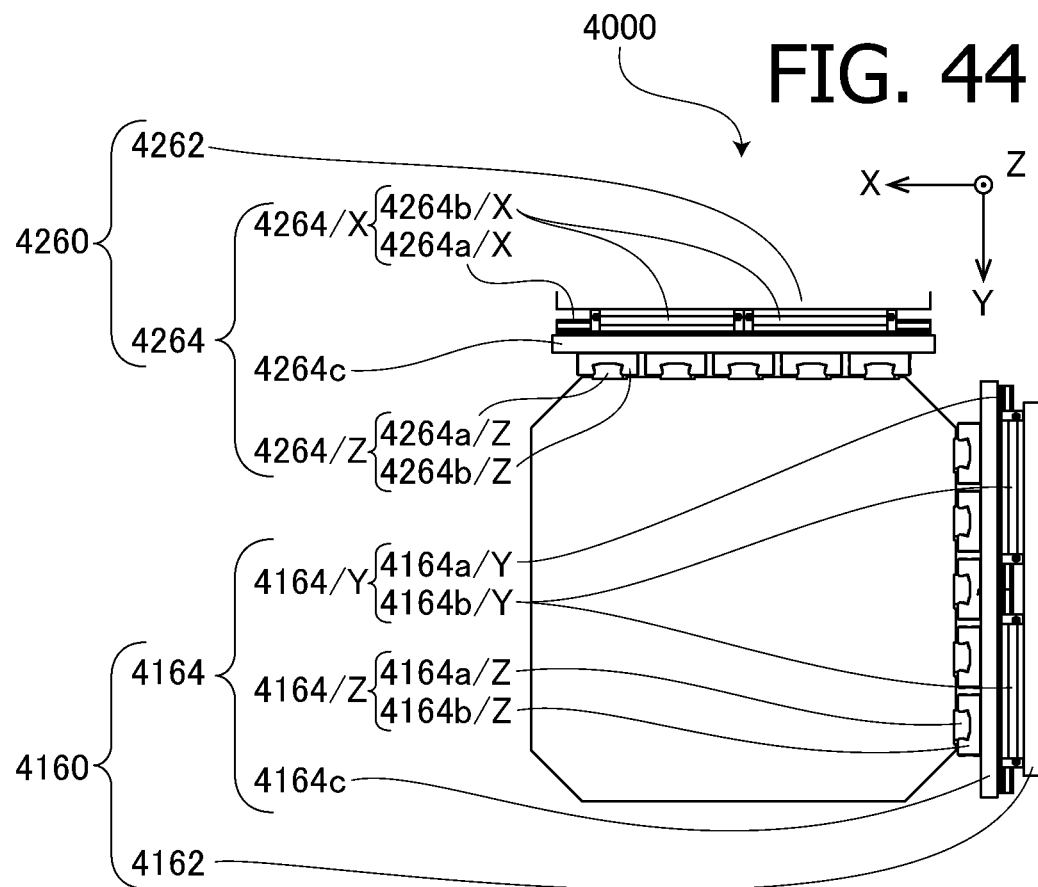

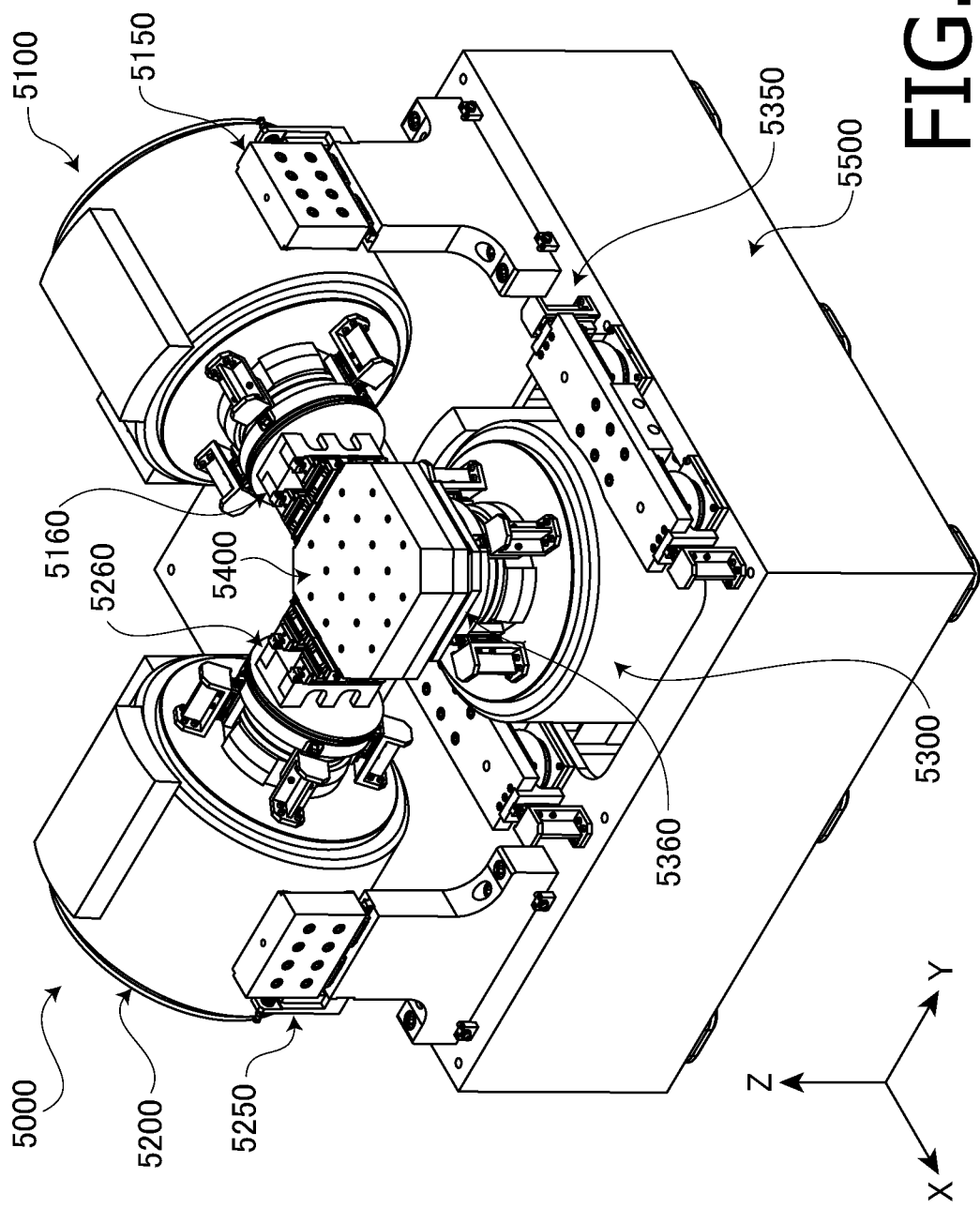

OSCILLATION DEVICE WITH COUNTER BALANCER

CROSS-REFERENCE TO RELATED APPLICATION

This is a Continuation-in-Part of International Application No. PCT/JP2017/000978 filed on Jan. 13, 2017, which claims priority from Japanese Patent Application No. 2016-006691 filed on Jan. 15, 2016. Japanese Patent Application No. 2016-006692 filed on Jan. 15, 2016, Japanese Patent Application No. 2016-131170 filed on Jun. 30, 2016, and Japanese Patent Application No. 2016-205586 filed on Oct. 19, 2016. The entire disclosures of the prior applications are incorporated herein by reference.

TECHNICAL FIELD

The present disclosure relates to oscillating devices and electrodynamic actuators for vibration tests and the like.

BACKGROUND

A triaxial simultaneous oscillating device (triaxial simultaneous vibration test device) that oscillates a vibrating table, on which an oscillated object (e.g., a specimen for a vibration test) is fixed, simultaneously in three orthogonal axis directions (X-axis direction, Y-axis direction and Z-axis direction) is known. To oscillate the vibrating table simultaneously in three orthogonal axis directions, for example, the vibrating table and a Z-axis actuator for oscillating the vibrating table in the Z-axis direction need to be coupled slidably in the X-axis direction and the Y-axis direction with a biaxial slider (XY slider).

An oscillating device that enables triaxial simultaneous oscillation at a frequency range ranging up to several hundreds Hz by such as the use of a rolling guide type linear guideway (Hereinafter simply referred to as "linear guide.") as the biaxial slider is conventionally known.

Also, an oscillating device that enables triaxial simultaneous oscillation at a frequency range exceeding 1 kHz by such as the use of rollers as rolling bodies to improve a rigidity of the linear guide is conventionally known.

SUMMARY

In onboard devices or the like, the triaxial simultaneous vibration test at a high frequency range of equal to or more than 2 kHz is desired, but no oscillating device that enables the triaxial simultaneous vibration test at frequencies of equal to or more than 2 kHz had been realized until now. As a result of the inventor's analysis, it has been proved that a rigidity and a motion accuracy (rectilinearity) of the linear guide need to be further improved to further reduce vibration noises in order to realize the triaxial simultaneous vibration test at frequencies of equal to or more than 2 kHz.

Aspects of the present disclosure are advantageous to provide one or more improved techniques, for an oscillating device and an electrodynamic actuator, which make it possible to reduce vibration noises.

According to aspects of the present disclosure, there is provided an oscillating device including a vibrating table, an actuator configured to oscillate the vibrating table in a first direction, a coupling mechanism configured to couple the vibrating table with the actuator in such a manner that the vibrating table is movable relative to the actuator in a second direction orthogonal to the first direction, and a counter balancer attached to the vibrating table and configured to compensate an imbalance of an oscillated portion including at least the vibrating table, the imbalance being caused by attaching the coupling mechanism to the vibrating table.

According to aspects of the present disclosure, further provided is an oscillating device including a vibrating table, an X-axis actuator configured to oscillate the vibrating table in an X-axis direction, a Y-axis actuator configured to oscillate the vibrating table in a Y-axis direction, a Z-axis actuator configured to oscillate the vibrating table in a Z-axis direction, the X-axis direction, the Y-axis direction and the Z-axis direction being orthogonal to each other, a YZ coupling mechanism configured to couple the vibrating table with the X-axis actuator in such a manner that the vibrating table is movable relative to the X-axis actuator in the Y-axis direction and the Z-axis direction, a ZX coupling mechanism configured to couple the vibrating table with the Y-axis actuator in such a manner that the vibrating table is movable relative to the Y-axis actuator in the Z-axis direction and the X-axis direction, an XY coupling mechanism configured to couple the vibrating table with the Z-axis actuator in such a manner that the vibrating table is movable relative to the Z-axis actuator in the X-axis direction and the Y-axis direction, a first counter balancer attached to the vibrating table and configured to compensate a first imbalance of an oscillated portion including at least the vibrating table, the first imbalance being caused by attaching the YZ coupling mechanism to the vibrating table, a second counter balancer attached to the vibrating table and configured to compensate a second imbalance of the oscillated portion, the second imbalance being caused by attaching the ZX coupling mechanism to the vibrating table, and a third counter balancer attached to the vibrating table and configured to compensate a third imbalance of the oscillated portion, the third imbalance being caused by attaching the XY coupling mechanism to the vibrating table.

According to aspects of the present disclosure, further provided is an oscillating device including a vibrating table, an actuator configured to oscillate the vibrating table in a first direction, and a coupling mechanism configured to couple the vibrating table with the actuator in such a manner that the vibrating table is movable relative to the actuator in a second direction orthogonal to the first direction. The vibrating table includes a predetermined imbalance previously provided thereto, the predetermined imbalance being set to make a center of gravity of an oscillated portion to be oscillated by the actuator positionally coincide with a center of an outer shape of the vibrating table, the oscillated portion including the vibrating table and a part of the coupling mechanism.

BRIEF DESCRIPTION OF THE DRAWINGS

FIG. 11 is an enlarged longitudinal section view around a neutral spring mechanism of a horizontal drive electrodynamic actuator according to the first embodiment of the present disclosure.

FIG. 43 is an enlarged side view around the vibrating table of the oscillating device according to the fourth embodiment of the present disclosure.

FIG. 44 is an enlarged plan view around the vibrating table of the oscillating device according to the fourth embodiment of the present disclosure.

FIG. 45 is a perspective view of the oscillating device according to the fifth embodiment of the present disclosure.

DETAILED DESCRIPTION OF EMBODIMENTS

Hereinafter, embodiments according to the present disclosure will be described with reference to the accompanying drawings. In the following description, the same or corresponding numerals are assigned to the same or corresponding components, and redundant descriptions will be herein omitted.

First Embodiment

Figure 1:
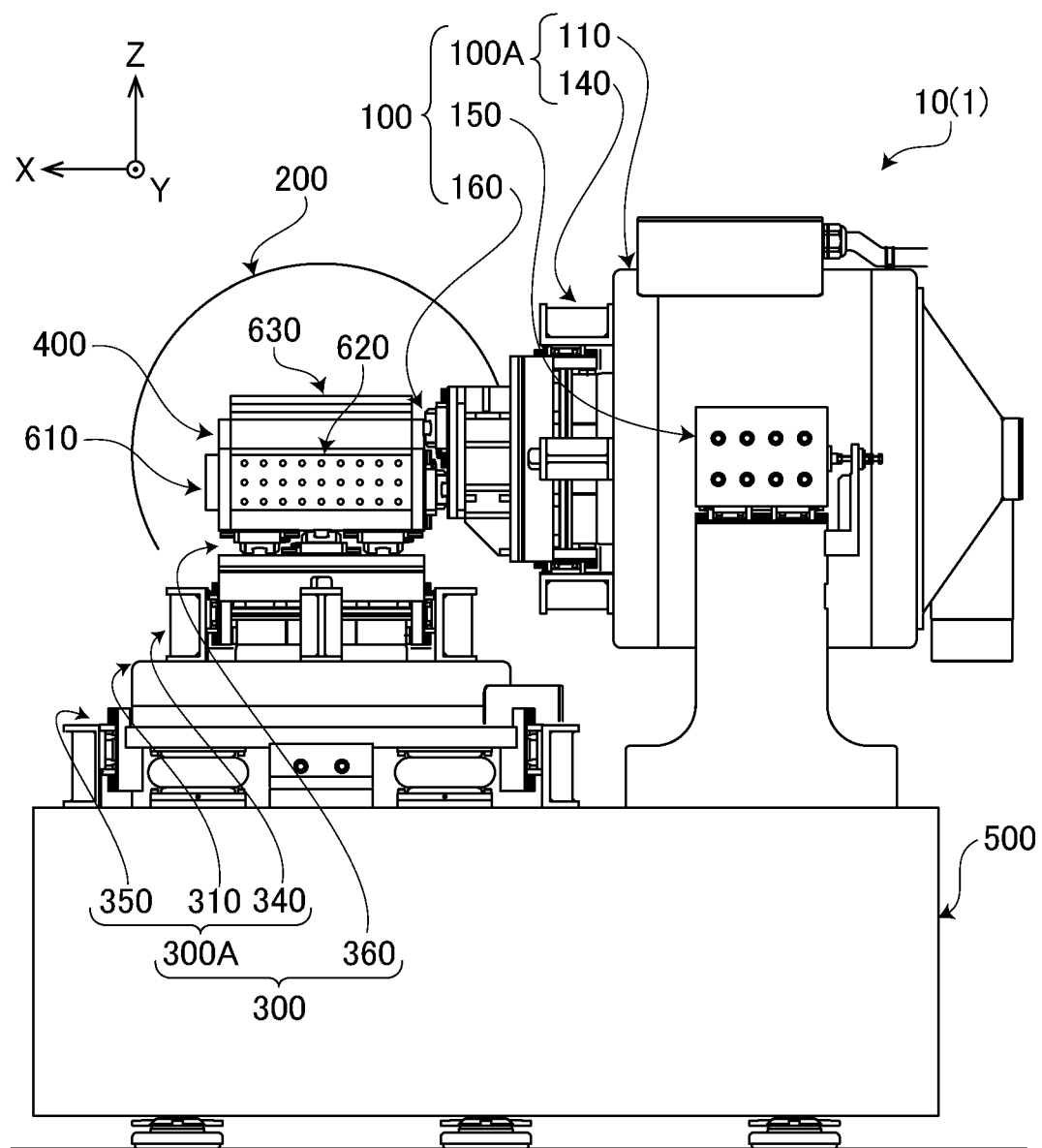
FIG. 1 is a front view of an oscillating device according to the first embodiment of the present disclosure.
Figure 2:
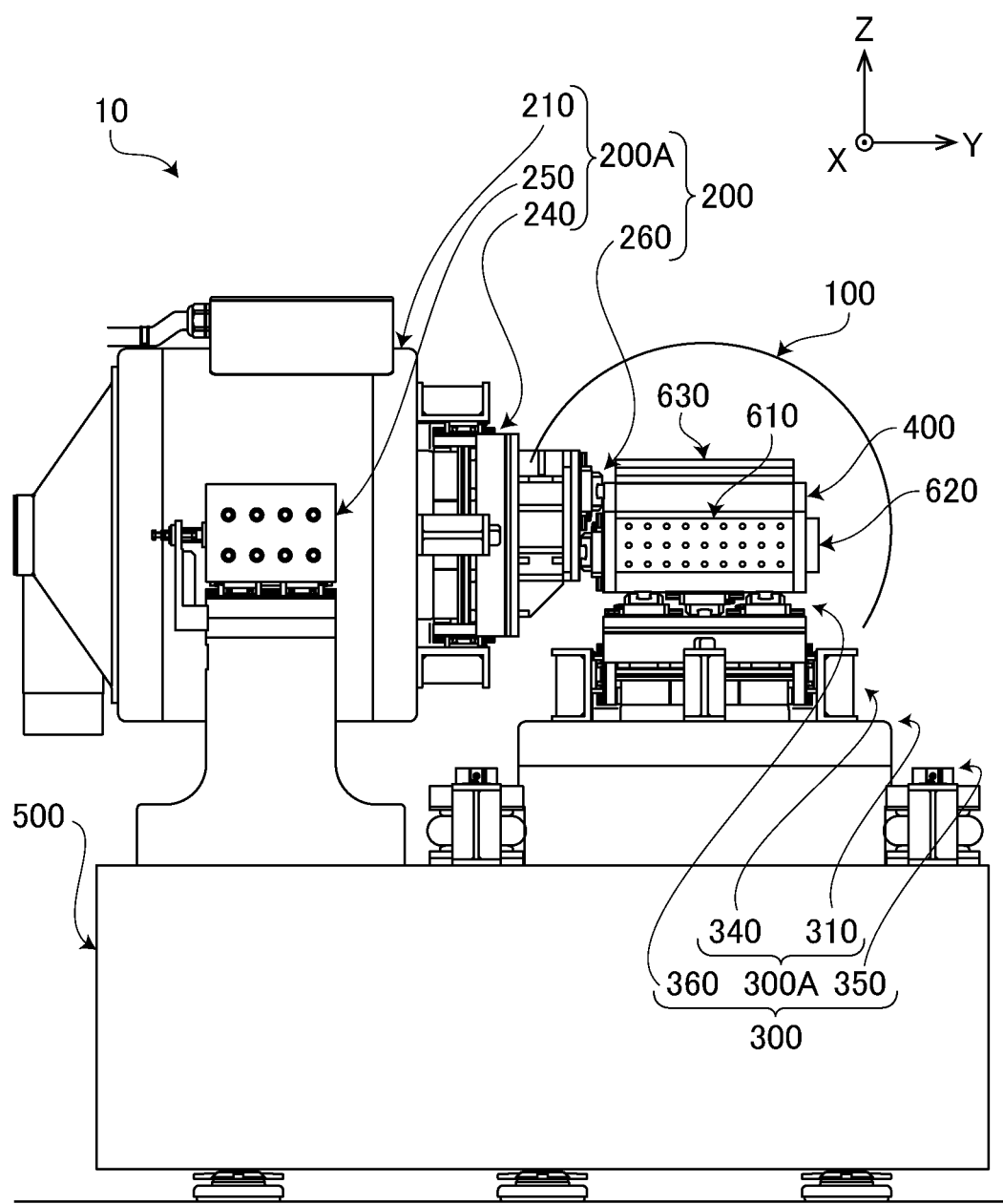
FIG. 2 is a side view of the oscillating device according to the first embodiment of the present disclosure.
Figure 3:
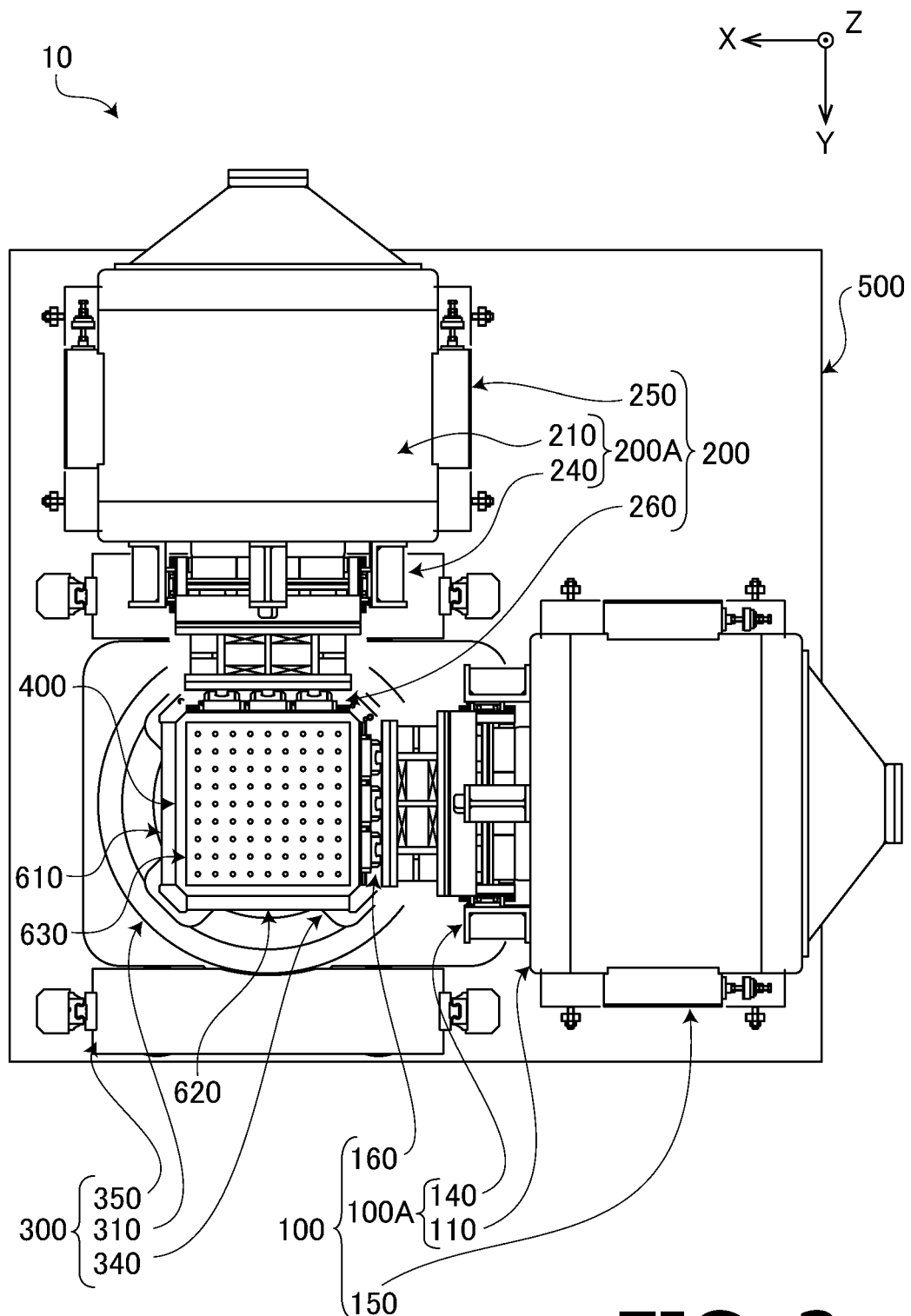
FIG. 3 is a plan view of the oscillating device according to the first embodiment of the present disclosure.

FIG. 1 is a front view of a mechanism part 10 of an electrodynamic triaxial oscillating device 1 (Hereinafter abbreviated to "oscillating device 1.") according to the first embodiment of the present disclosure. In the following description, a left right direction in FIG. 1 is referred to as X-axis direction (with the left direction as X-axis positive direction), an up-down direction in FIG. 1 is referred to as Z-axis direction (with the upward direction as Z-axis positive direction), and a direction perpendicular to the paper in FIG. 1 is referred to as Y-axis direction (with a direction going from the backside to the front side of the paper as Y-axis positive direction). It is noted that, in the present embodiment, the Z-axis direction is a vertical direction, and the X-axis direction and the Y-axis direction are horizontal directions. FIG. 2 and FIG. 3 are a left side view and a plan view of the mechanism part 10 of the oscillating device 1, respectively.

As shown in FIG. 1, the mechanism part 10 of the oscillating device 1 includes a substantially box-like vibrating table 400 to which a specimen (not shown) is to be fixed in a state where the specimen is housed inside the vibrating table 400, three oscillating units (X-axis oscillating unit 100, Y-axis oscillating unit 200 and Z-axis oscillating unit 300) which oscillate the vibrating table 400 in the X-axis direction, the Y-axis direction and the Z-axis direction, respectively, and a device base 500 to which the oscillating units 100, 200 and 300 are attached.

The oscillating units 100, 200 and 300 are linear motion oscillating units each including an electrodynamic actuator (voice coil motor).

The X-axis oscillating unit 100 is coupled to the vibrating table 400 via a biaxial slider (YZ slider 160) being a slide coupling mechanism. The YZ slider 160 is configured to be able to accurately transmit vibration of the X-axis oscillating unit 100 to the vibrating table 400 while permitting relative movement (sliding) between the X-axis oscillating unit 100 and the vibrating table 400 in two directions (Y-axis direction and Z-axis direction) orthogonal to an oscillating direction (X-axis direction) of the X-axis oscillating unit 100. Similarly, the Y-axis oscillating unit 200 and the Z-axis oscillating unit 300 are coupled to the vibrating table 400 via a 7X slider 260 and an XY slider 360 being biaxial sliders, respectively. With this configuration, the oscillating device 1 is capable of oscillating the vibrating table 400 and the specimen fixed to the vibrating table 400 in the three orthogonal axis directions simultaneously and independently using the oscillating units 100, 200 and 300.

Figure 4:
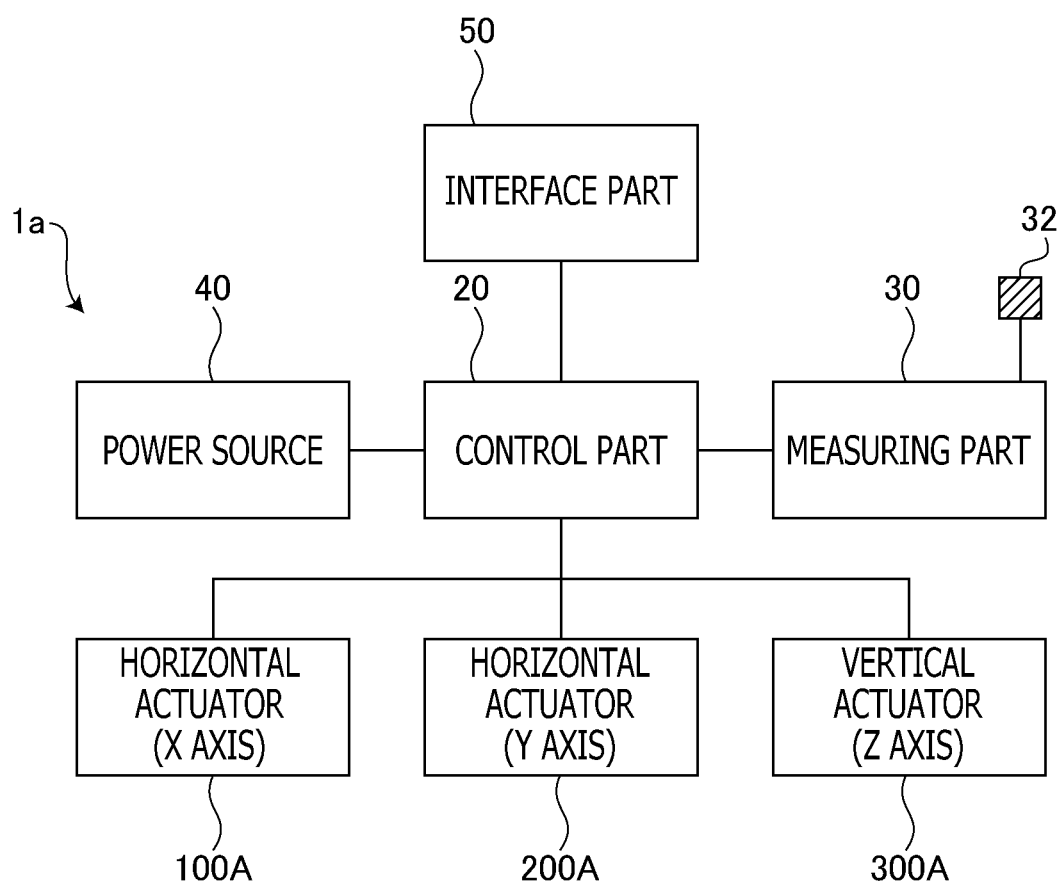
FIG. 4 is a block diagram of a drive control system of the oscillating device according to embodiments of the present disclosure.

FIG. 4 is a block diagram showing a brief configuration of a drive control system 1a of the oscillating device 1. The drive control system 1a includes a control part 20 configured to control operations of the whole device, a measuring part 30 configured to measure vibration of the vibrating table 400, a power source 40 configured to supply electrical power to each part of the oscillating device 1, and an interface part 50 configured to perform input from and output to the outside.

The interface part 50 includes, for example, one or more of a user interface for performing input from and output to a user, a network interface for connecting with every kind of networks such as a LAN (Local Area Network), and every kind of communication interfaces such as a USB (Universal Serial Bus) or a GPIB (General Purpose Interface Bus) for connecting with outside devices. Also, the user interface includes, for example, one or more of every kind of manipulation switches, indicators, every kind of display devices such as an LCD (Liquid Crystal Display), every kinds of pointing devices such as a mouse or a touch-pad, and every kind of input and output devices such as touch screens, video cameras, printers, scanners, buzzers, speakers, microphones and memory card readers and writers.

The measuring part 30 includes a triaxial vibration sensor (triaxial vibration pickup) 32 attached to the vibrating table 400, and performs amplification and digital conversion to signals outputted by the triaxial vibration sensor 32 (e.g., acceleration signals or velocity signals) and sends them to the control part 20. It is noted that the triaxial vibration sensor 32 detects vibrations in the X-axis direction, the Y-axis direction and the Z axis direction independently. Also, the measuring part 30 calculates every kind of parameters indicating a vibrating state of the vibrating table 400 (e.g., including one or more of velocity, acceleration, jerk, acceleration level (vibration level), amplitude, power spectral density and the like) on the basis of the signals from the triaxial vibration sensor 32 and sends them to the control part 20. The control part 20 can oscillate the vibrating table 400 in desired amplitudes and frequencies by controlling magnitudes and frequencies of alternating currents to be inputted to a drive coil of each of the oscillating units 100, 200 and 300 (which will be described later) on the basis of oscillation waveforms input via the interface part 50 and/or data input from the measuring part 30.

Next, structures of each of the oscillating units 100, 200 and 300 will be described. As will be described later, the X-axis oscillating unit 100 and the Y-axis oscillating unit 200 includes horizontal drive electrodynamic actuators (Hereinafter simply referred to as "horizontal actuator.") 100A and 200A, respectively. Also, the Z-axis oscillating unit 300 includes a vertical drive electrodynamic actuator (Hereinafter simply referred to as "vertical actuator.") 300A.

Figure 5:
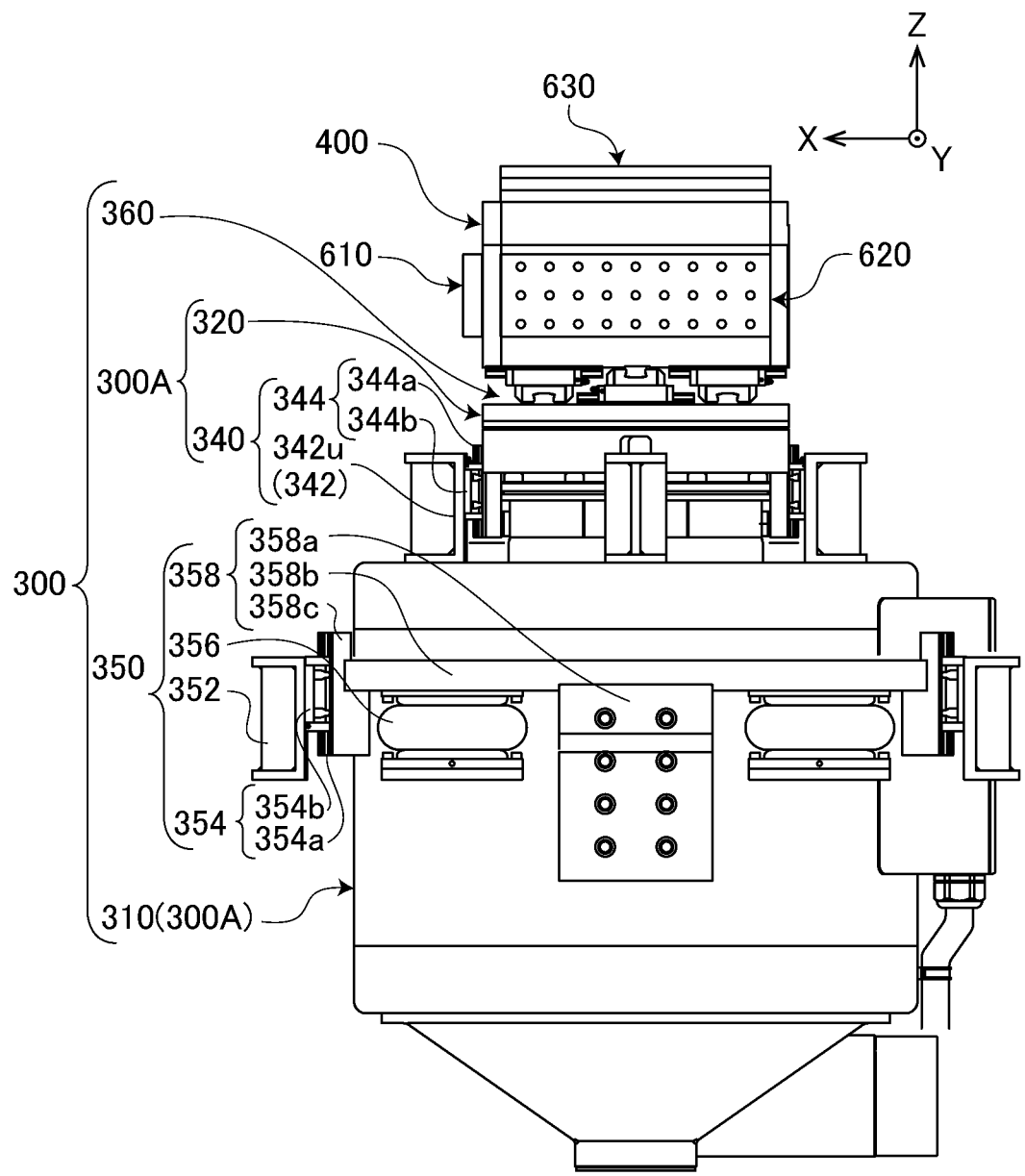
FIG. 5 is a front view of a Z-axis oscillating unit according to the first embodiment of the present disclosure.
Figure 6:
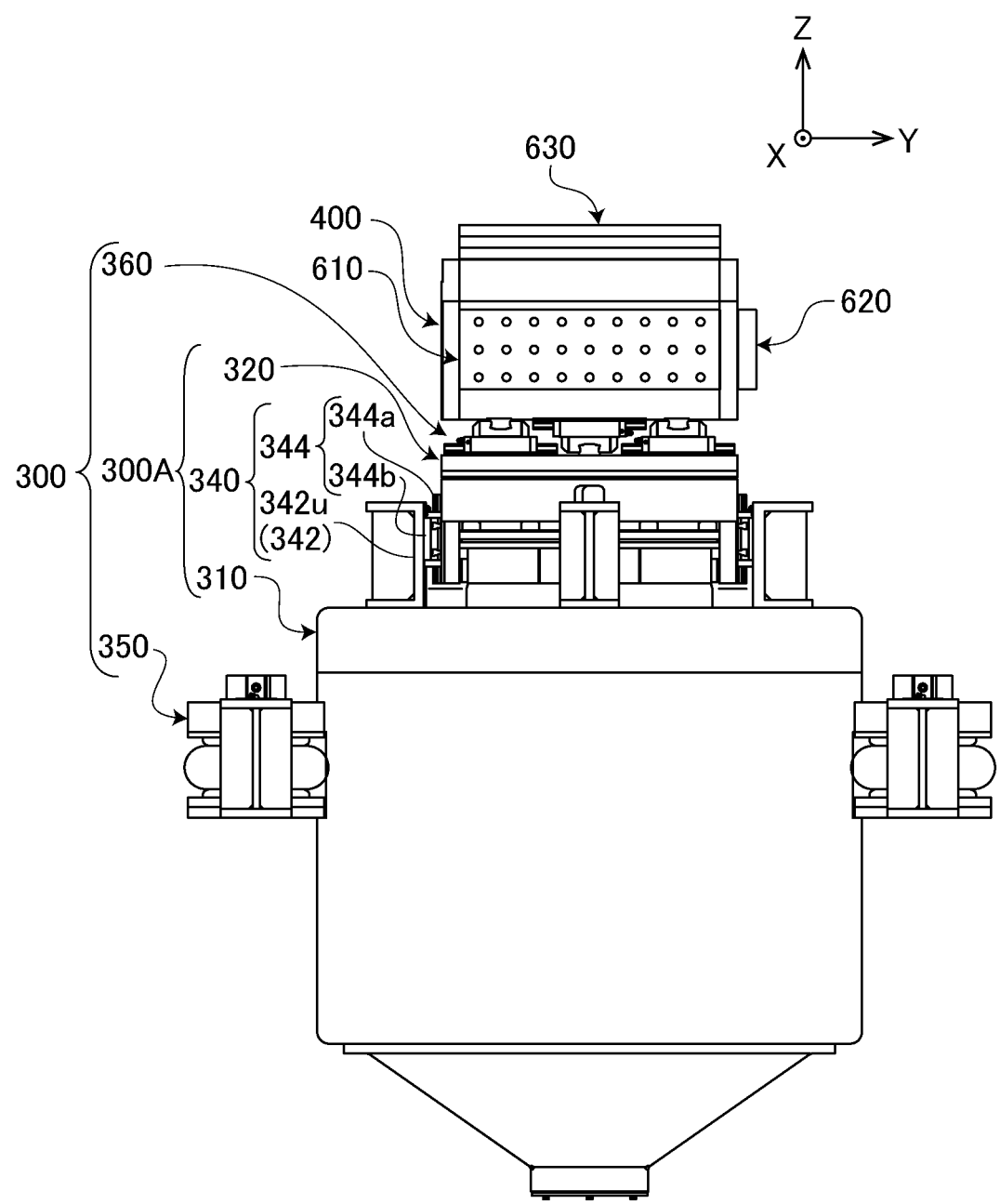
FIG. 6 is a side view of the Z-axis oscillating unit according to the first embodiment of the present disclosure.
Figure 7:
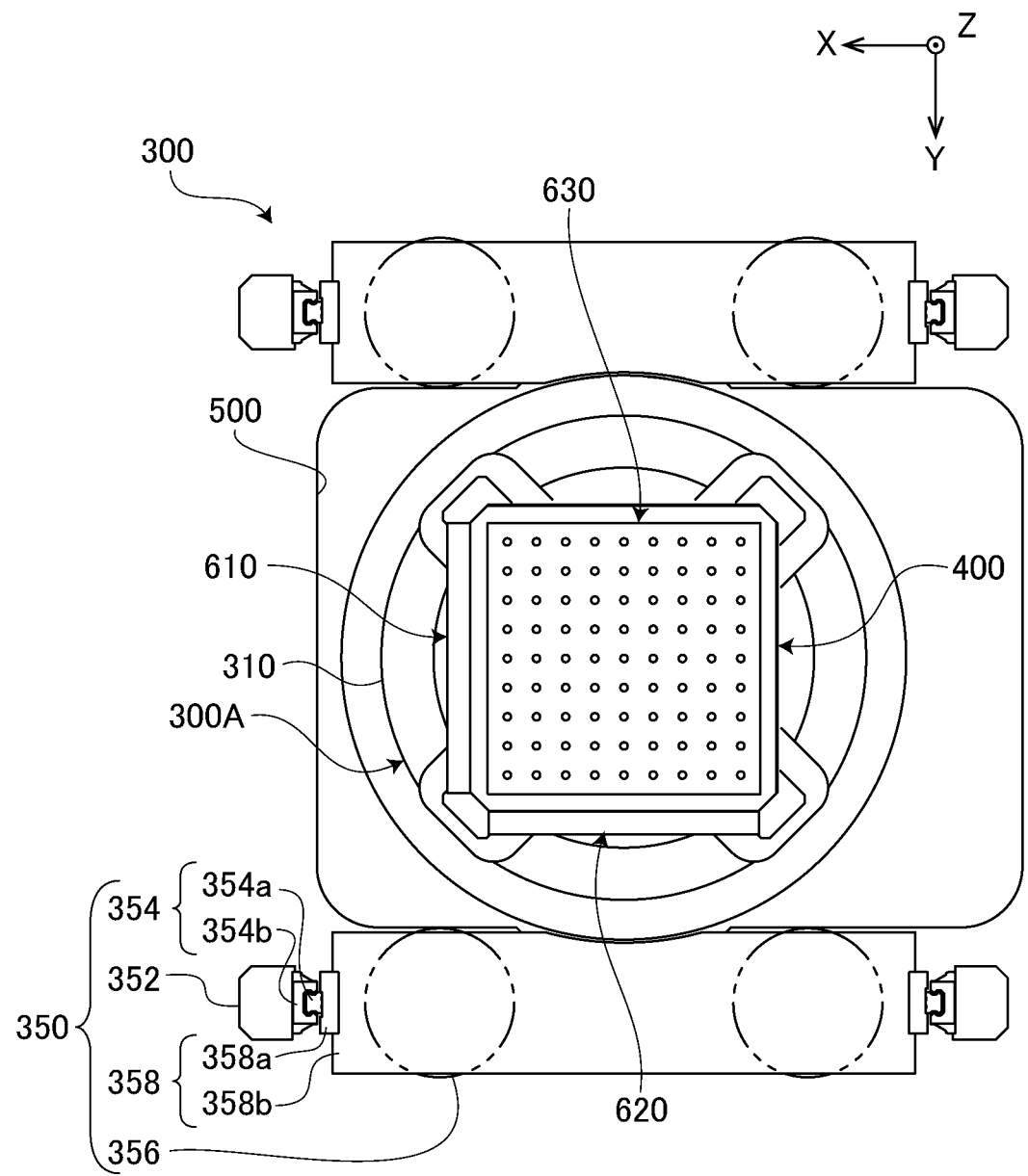
FIG. 7 is a plan view of the Z-axis oscillating unit according to the first embodiment of the present disclosure.

FIGS. 5, 6 and 7 are a front view, left side view and plan view of the Z-axis oscillating unit 300 (and the vibrating table 400), respectively.

The vertical actuator 300A includes an air spring 330 (FIG. 8) for supporting weights (static loads) of the specimen and the vibration table. On the other hand, the horizontal actuators 100A and 200A include neutral spring mechanisms 130 (FIG. 11) and 230 (not shown), respectively, that apply restoring forces for bringing the vibrating table back to a neutral position (origin, reference position). Since the configurations of the horizontal actuators 100A and 200A are identical to the vertical actuator 300A apart from the neutral spring mechanisms 130 and 230 being provided instead of the air spring 330 and specific structures of a supporting unit 350 and supporting units 150, 250, which will be described later, differing from each other, the detailed configuration of the vertical actuator 300A will be described on behalf of each of the actuators.

Figure 8:
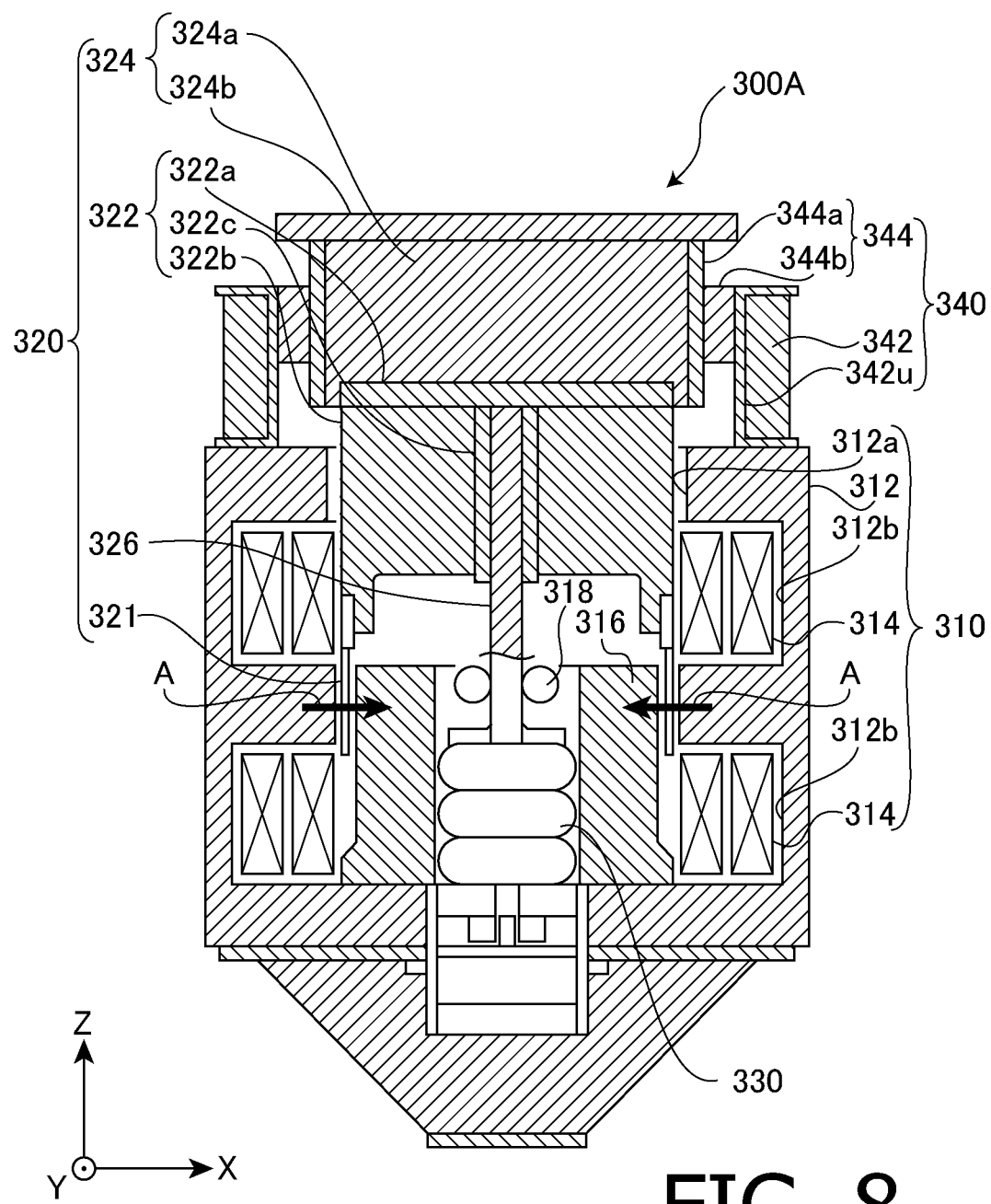
FIG. 8 is a longitudinal section view of a vertical drive electrodynamic actuator according to the first embodiment of the present disclosure.

As shown in FIG. 8, the vertical actuator 300A includes a fixing part 310 having a tubular body 312 and a movable part 320 of which a lower portion thereof is accommodated inside the tube of the fixing part 310. The movable part 320 can move in the vertical direction (Z-axis direction) with respect to the fixing part 310.

Figure 9:
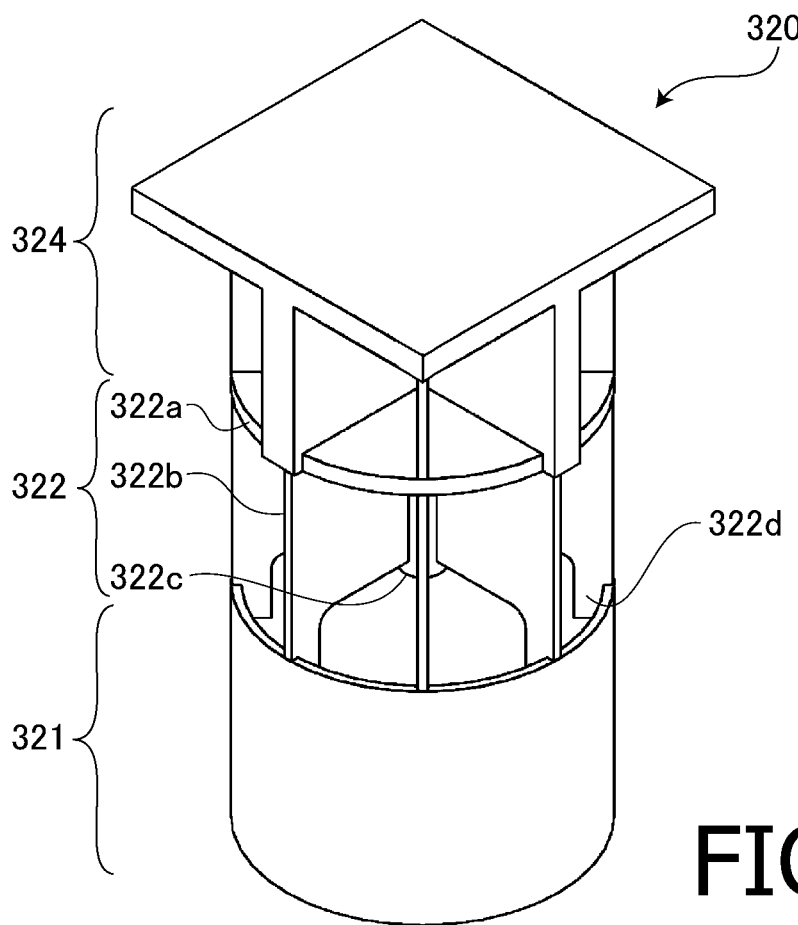
FIG. 9 is an external view of a movable part of the vertical actuator.

FIG. 9 is an external view showing a brief configuration of the movable part 320. The movable part 320 includes a main frame 322 having a substantially cylindrical shape, a drive coil 321 coaxially attached to a lower end portion of the main frame 322, and a rod 326 (FIG. 8) extending downward from the center of a lower surface of the main frame. Also, an expansion frame 324 having a diameter substantially equal to a diameter of the main frame 322 is coaxially attached to an upper end portion of the main frame 322.

The main frame 322 includes a substantially disk-shaped top plate 322a arranged perpendicularly to the drive direction (Z-axis direction), a tubular main column 322c extending perpendicularly (in the drive direction) from the center of a lower surface of the top plate 322a, and eight ribs 322b, each having a substantially rectangular flat plate shape, radially attached to an outer periphery of the main column 322c. By the main column 322c and the eight ribs 322b, a substantially tubular torso portion of the main frame 322 is formed. The eight ribs 322b are arranged around the main column 322c at regular intervals in a circumferential direction. By coupling the top plate 322a and the main column 322c with the eight ribs 322b arranged as described above, sufficient rigidity is given to the main frame 322. The top plate 322a, the ribs 322b and the main column 322c are integrally coupled to each other by welding or the like.

An outer periphery side of a lower end portion of each of the ribs 322b protrudes downwardly and forms a coil attaching part 322d. The coil attaching parts 322d of the eight ribs 322b are inserted into an upper end portion of the drive coil 321, and the drive coil 321 is attached to the main frame 322.

As shown in FIG. 8, to the main column 322c, the rod 326 is fitted from below. A lower portion of the rod 326 protrudes downwardly from the main column 322c. Also, to the top plate 322b, the expansion frame 324 is attached.

Figure 10:
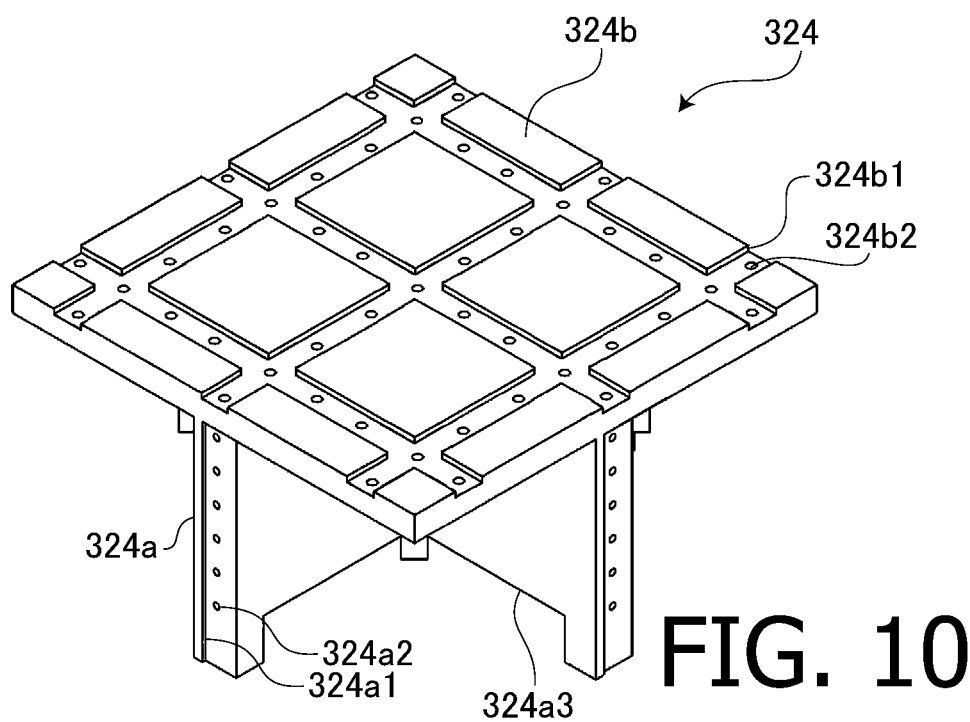
FIG. 10 is an external view of an expansion frame.

FIG. 10 is an external view of the expansion frame 324. As shown in FIG. 10, the expansion frame 324 includes a torso portion 324a having a diameter substantially equal to the diameter of the main frame 322, and a top plate 324b attached horizontally on an upper end of the torso portion 324a. The top plate 324b is a member having a substantially rectangular flat plate shape with a width (dimension in the X-axis direction) and a depth (dimension in the Y-axis direction) equal to or larger than the outer diameter of the torso portion 324a.

On an upper surface of the top plate 324b of the expansion frame 324, six streaks of grooves (pairs of perpendicular level differences 324b1) extending in a lattice in the X-axis direction and the Y-axis direction are formed. Along the level differences 324b1 on one side of respective grooves, rails 364a of as many as one half the number of the XY sliders 360 (in the present embodiment, nine rails), which will be described later, are arranged. That is, the level differences 324b1 are positioning structures for attaching the rails 364a at accurate positions on the top plate 324b. By providing the level differences 324b1, it becomes possible to place the nine rails 364a on the top plate 324b with high parallelism/perpendicularity only by simply attaching the rails 364a along the level differences 324b1. It is noted that a plurality of screw holes 324b2 for fixing the rails 364a with bolts are formed on the bottom of each groove.

On each of both side surfaces of the torso portion 324a in the X-axis direction and the Y-axis direction, a level difference 324a1 and a plurality of screw holes 324a2 for positioning and fixing a Z-axis rail 344a of a movable part support mechanism 340, which will be described later, are formed. Also, on a lower surface of the torso portion 324a, a recess 324a3 is formed. The expansion frame 324 is fixed to the main frame 322 with bolts in a state where the top plate 322a of the main frame 322 is fitted in this recess 324a3.

Inside the tubular body 312 of the fixing part 310, a substantially tubular shaped inner magnetic pole 316 arranged coaxially with the tubular body 312 is fixed. The tubular body 312 and the inner magnetic pole 316 are both formed of magnetic substances. An outer diameter of the inner magnetic pole 316 is smaller than an inner diameter of the drive coil 321, and the drive coil 321 is arranged in a gap between an outer peripheral surface of the inner magnetic pole 316 and an inner peripheral surface of the tubular body 312. Also, inside the tube of the inner magnetic pole 316, a bearing 318 configured to support the rod 326 movably only in the Z-axis direction is fixed.

A plurality of recesses 312b are formed on the inner peripheral surface 312a of the tubular body 312, and an excitation coil 314 is accommodated in each of the recesses 312b. When direct current (exciting current) is supplied to the exciting coils 314, magnetic fields in radial directions of the tubular body 312 such as shown in arrows A are generated at positions where the inner peripheral surface 312a of the tubular body 312 and the outer peripheral surface of the inner magnetic pole 316 are closely opposing to each other. If a drive current is supplied to the drive coil 321 in this state, Lorentz force acting in the axial direction of the drive coil 321, that is, in the Z-axis direction, is generated and the movable part 320 is driven in the Z-axis direction.

Also, the air spring 330 is accommodated in the tube of the inner magnetic pole 316. A lower end of the air spring 330 is fixed to the tubular body 312. Also, a flange portion formed on the rod 326 is placed on and upper surface of the air spring 330. That is, the air spring 330 supports the main frame 322 from below via the rod 326. More specifically, weights (static loads) of the movable part 320 and the XY slider 360, the vibrating table 400, an X-axis counter balancer 610, a Y-axis counter balance part 620 and a Z-axis counter balancer 630 which will be described later, and the specimen supported by the movable part 320 are supported by the air spring 330. Therefore, the need to support the weights (static loads) of the movable parts 320, the vibrating table 400 and the like by the drive force (Lorentz force) of the Z-axis oscillating unit 300 is eliminated by providing the air spring 330 to the Z-axis oscillating unit 300 and only dynamic load for oscillating the movable part 320 and the like needs to be supplied, and thus drive current to be supplied to the Z-axis oscillating unit 300 (i.e., power consumption) is reduced. Also, since the drive coil 321 can be downsized due to the reduction of the necessary drive force, the weight of the movable part 320 can be reduced and thus the Z-axis oscillating unit 300 can be driven in a higher frequency. Furthermore, since the need to supply a large direct current component for supporting the weights of the movable part 320, the vibrating table 400 and the like to the drive coil 321 is eliminated, a power source having a smaller and simpler configuration can be adopted as the power source 40.

Also, when the movable part 320 of the Z-axis oscillating unit 300 is driven, the fixing part 310 also receives a strong reaction force (oscillating force) in the drive axis (Z-axis) direction. The oscillating force transmitted from the movable part 320 to the fixing part 310 is alleviated by providing the air spring 330 between the movable part 320 and the fixing part 310. Therefore, for instance, vibration of the movable part 320 is prevented from being transmitted to the vibrating table 400 via the fixing part 310, the device base 500 and the oscillating units 100 and 200 as noise components.

Now, a configuration of the horizontal actuator 100A will be described. As described above, the horizontal actuator 100A differs from the vertical actuator 300A in that the horizontal actuator 100A includes the neutral spring mechanism 130 (FIG. 11) instead of the air spring 330 (FIG. 8) and in the specific structures of the supporting unit 150, but other basic configurations are in common. It is noted that, similarly to the air spring 330, the neutral spring mechanism 130 is a cushioning device that elastically couples a fixing part 110 and a movable part 120 of the horizontal actuator 100A. Also, the horizontal actuator 200A has the same configuration as the horizontal actuator 100A described below.

FIG. 11 is an enlarged longitudinal section view around the neutral spring mechanism 130 of the horizontal actuator 100A. Inside a broken line frame is a back view of the neutral spring mechanism 130 viewed toward the X-axis positive direction.

The neutral spring mechanism 130 includes an U-shaped stay 131, a rod 132, a nut 133 and a pair of compression coil springs 134 and 135 (elastic component). The U-shaped stay 131 is fixed to the bottom portion of the fixing part 110 (right end portion in FIG. 11) at flange portions 131a formed at both ends of the U-shape. Also, at the center of a bottom portion 131b of the U-shaped stay 131 (left end portion in FIG. 11), a through hole 131b1 through which the rod 132 extending in the X-axis direction is inserted is provided.

A flange portion 132b is provided at an end (left end in FIG. 11) of the rod 132, and the rod 132 is coupled to a tip (right end in FIG. 11) of a rod 122a of the movable part 120 via the flange portion 132b. Also, a male screw portion 132a that engages with the nut 133 is formed on the other end portion (right end portion in FIG. 11) of the rod 132.

The pair of the coil springs 134 and 135 are put on the rod 132. One coil spring 134 is retained by being nipped between a flange portion of the nut 133 and the bottom portion 131b (elastic component supporting plate) of the U-shaped stay 131. The other coil spring 135 is retained by being nipped between the bottom portion 131b of the U-shaped stay 131 and the flange portion 132b of the rod 132. A preload is applied to the pair of the coil springs 134 and 135 by the tightening of the nut 133. A position where restoring forces of the pair of the coil springs 134 and 135 balance is a neutral position (or origin or reference position) of the movable part 120 of the horizontal actuator 100A in the movable direction (X-axis direction). When the movable part 120 moves away from the neutral position, a restoring force that moves the movable part 120 back to the neutral position acts on the movable part 120 by the neutral spring mechanism 130 (directly by the pair of the coil springs 134 and 135). Accordingly, it becomes possible to reciprocally drive the movable part 120 in the X-axis direction with the neutral position always as the reference position of the reciprocation, and thus a problem that a position of the movable part 120 sways while driving is overcome.

Next, returning back to the description of the vertical actuator 300A, a configuration of a movable part support mechanism 340 supporting an upper portion of the movable part 320 from a side thereof slidably in the axial direction will be described.

As shown in FIG. 6 and FIG. 8, the movable part 320 of the vertical actuator 300A is supported from the sides thereof movably only in the drive direction (Z-axis direction) by four movable part support mechanisms 340 arranged at regular intervals around the movable part 320.

The movable part support mechanism 340 of the present embodiment includes an angle plate 342 and a Z-axis linear guide 344. Also, the Z-axis linear guide 344 includes the Z-axis rail 344a and a Z-axis carriage 344b. It is noted that, in the present embodiment, as the Z-axis linear guide 344, a linear guide having a configuration identical to an A-type linear guide 364A (FIGS. 14-19) which will be described later is used. It is noted that a linear guide is a mechanism that guides a linear motion, and the Z-axis linear guide 344 guides a linear motion in the Z-axis direction.

On a side face of the torso portion 324a of the expansion frame 324 of the movable part 320, four Z-axis rails 344a of the movable part support mechanisms 340 extending in the Z-axis direction are attached at regular intervals in a circumferential direction. It is noted that, in the present embodiment, as shown in FIG. 3 and FIG. 7, two pairs of the movable part support mechanisms 340 are arranged to respectively oppose to each other in horizontal directions forming an angle of 45 degrees with respect to the X-axis direction and the Y-axis direction, but for convenience of explanation, in other drawings, the two pairs of the movable part support mechanisms 340 are shown to oppose in the X-axis direction and the Y-axis direction, respectively. Also, the number and arrangement of the movable part support mechanisms 340 are not limited to those of the configuration of the present embodiment, but, for example, configurations in which the movable part 320 is supported by three or more sets of the movable part support mechanisms 340 arranged substantially at regular intervals around the movable part 320 are preferable.

On a top face of the fixing part 310 (tubular body 312), four angle plates 342 are fixed at regular intervals (90 degree intervals) along the inner peripheral surface of the tubular member 312. The angle plate 342 is a fixing member having an U-shaped (or L-shaped) cross-section and reinforced with a rib. To a vertical portion 342u of each of the angle plates 342, the Z-axis carriage 344b that engages with the Z-axis rail 344a is fixed.

The Z-axis carriage 344b has a plurality of balls RE (which will be described later) as rolling bodies and configures the Z-axis linear guide 344, being a rolling guide, together with the Z-axis rail 344a. That is, the movable part 320 is supported slidably only in the Z-axis direction, at the upper portion of the expansion frame 324, from its sides by four sets of supporting structures (movable part support mechanisms 340) each constituted of the angle plate 342 and the Z-axis linear guide 344 and is configured not to move in the X-axis direction and the Y-axis direction. Therefore, cross talks that occur due to vibrations of the movable part 320 in the X-axis direction and the Y-axis direction are prevented. Also, the movable part 320 can move smoothly in the Z-axis direction by the use of the Z-axis linear guide 344 (rolling guide). Furthermore, since, as described above, the movable part 320 is also supported, at its lower portion, by the bearing 318 movably only in the Z-axis direction, rotations about the X axis, the Y axis and the Z axis are also restricted, and thus unnecessary vibrations (vibrations other than the controlled translation in the Z-axis direction) hardly occur.

Also, in general use modes of the linear guides, the rail is attached to the fixed side, and the carriage is attached to the movable side. However, in the present embodiment, contrary to the general use modes, the Z-axis rail 344a is attached to the movable part 320 and the Z-axis carriage 344b is attached to the angle plate 342. Unnecessary vibrations are suppressed by adopting such an anomalous attachment structure. This is because, since the Z-axis rail 344a is lighter than the Z-axis carriage 344b, longer in length in the driving direction (Z-axis direction) (and therefore smaller in mass per unit length), and mass distribution is uniform in the driving direction, mass distribution change when the Z-axis oscillating unit 300 is driven is smaller if the Z-axis rail 344a is fixed to the movable part 320, and vibrations that occur due to the mass distribution change can be suppressed. Also, since the center of gravity of the Z-axis rail 344a is lower than that of the Z-axis carriage 344b (i.e., a distance between an installation surface and the center of gravity is shorter), an inertia moment becomes smaller if the Z-axis rail 344a is fixed to the movable side. Therefore, due to this configuration, it becomes possible to make a resonance frequency of the fixing part 310 sufficiently higher than oscillating frequency bands (e.g., equal to or more than 0-2000 Hz), and thus a decrease in an oscillating accuracy due to resonance is suppressed.

Next, a configuration of the XY slider 360 that couples the Z-axis oscillating unit 300 and the vibrating table 400 will be described.

Figure 12:
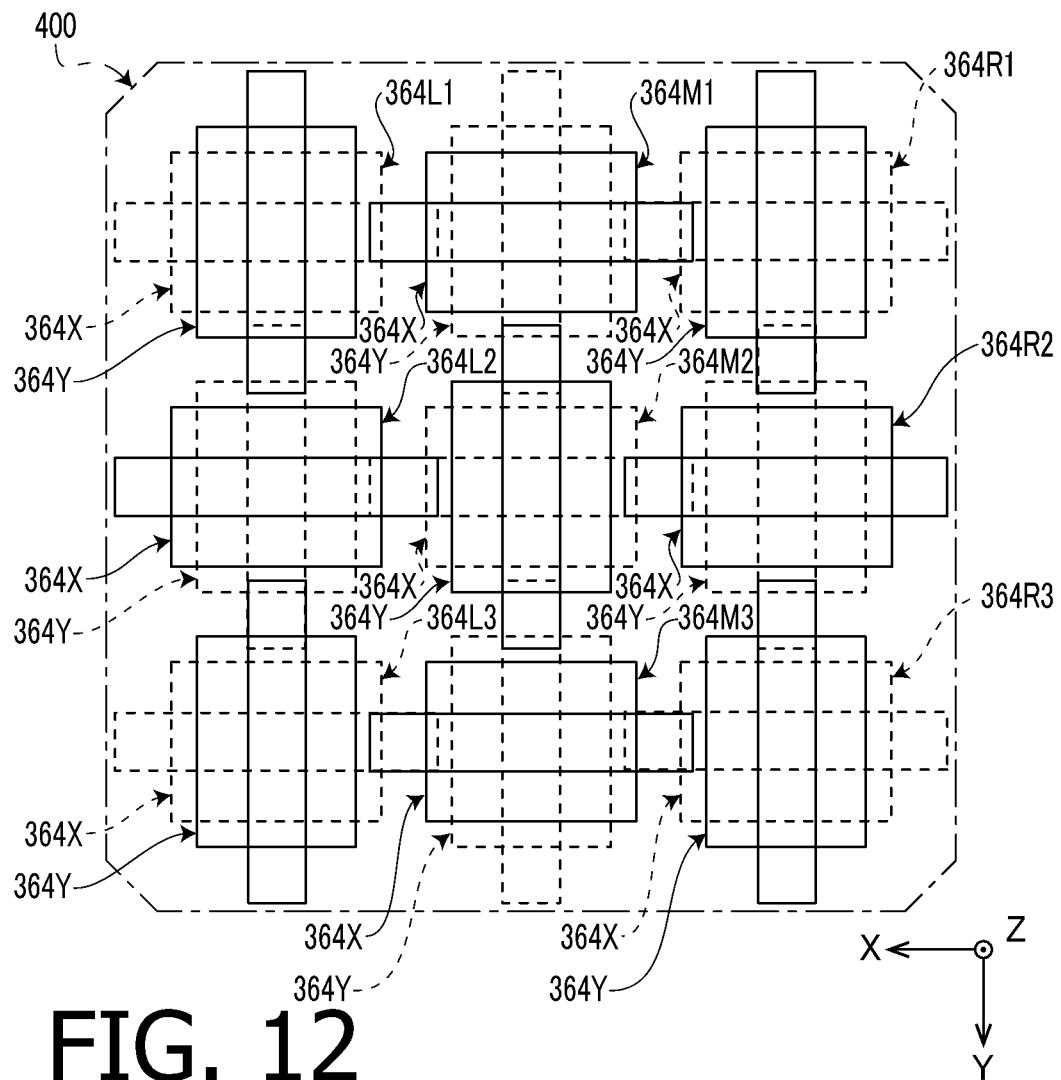
FIG. 12 is a plan view of an XY slider according to the first embodiment of the present disclosure.

FIG. 12 is a plan view illustrating the configuration of the XY slider 360. As shown in FIG. 5, FIG. 6 and FIG. 12, the XY slider 360 according to the present embodiment consists of nine cross guides 364 (364L1-L3, 364M1-M3, 364R1-R3) arranged at regular intervals in the X-axis direction and the Y-axis direction. Each of these nine cross guides 364 couples the Z-axis oscillating unit 300 (specifically, the movable part 320 of the vertical actuator 300A) and the vibrating table 400 slidably in the X-axis direction and the Y-axis direction with low resistance.

Figure 13:
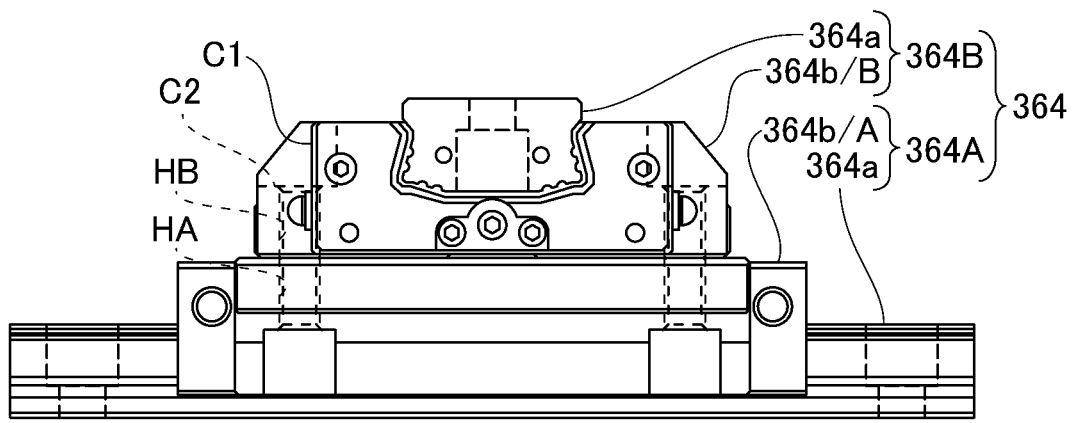
FIG. 13 is a side view of a cross guide according to embodiments of the present disclosure.

FIG. 13 is a side view of the cross guide 364. The cross guide 364 is a cross guide in which top faces of carriages of an A-type linear guide 364A and a B-type linear guide 364B are superimposed and fixed together such that their movable directions bisect at right angles. As will be described later, since the carriages of the A-type linear guide 364A and the B-type linear guide 364B are formed to be slightly longer in their moving directions, a mass distribution in a length (L) direction and a mass distribution in a width (W) direction differ from each other, and this may become a factor that causes a directionality in oscillating performance of the oscillating device 1. In the present embodiment, the carriages of the A-type linear guide 364A and the B-type linear guide 364B are directly fixed together while orienting the length direction of one of the two in the width direction of the other to form a cross carriage (a carriage of the cross guide 364). Due to this configuration, the mass distribution directionalities of the A-type linear guide 364A and the B-type linear guide 364B are offset to respectable degrees and thereby a cross carriage with small mass distribution directionality can be obtained. The directionality in the oscillating performance of the oscillating device 1 is alleviated by using such cross carriages. Details of the A-type linear guide 364A and the B-type linear guide 364B will be described later.

In FIG. 12, among a pair of linear guides (an X-axis linear guide 364X slidable in the X-axis direction and a Y-axis linear guide 364Y slidable in the Y-axis direction) configuring each cross guide 364, the one arranged on the vibrating table 400 side is indicated with solid lines, and the one arranged on the Z-axis oscillating unit 300 side is indicated with broken lines. Focusing on the linear guides on the vibrating table 400 side indicated with solid lines, first orientation cross guides 364P (cross guides 364M1, 364L2, 364R2, 364M3) of which the X-axis linear guides 364X are attached to the vibrating table 400 and second orientation cross guides 364 (cross guides 364L1, 364R1, 364M2, 364L3, 364R3) of which the Y-axis linear guides 364Y are attached to the vibrating table 400 are mixed. Furthermore, in each of the X-axis direction and the Y-axis direction, orientations of adjacent cross guides 364 are made to alternate. That is, the first orientation cross guides 364P and the second orientation cross guides 364 are alternately arranged in each of the X-axis direction and the Y-axis direction. By arranging the cross guides 364 while alternating their orientation as described above, the mass distribution directionalities of the cross guides 364 are averaged and thereby the oscillating performance with smaller directionality is realized.

Next, details of the A-type linear guide 364A and the B-type linear guide 364B configuring the cross guide 364 will be described.

Figure 14:
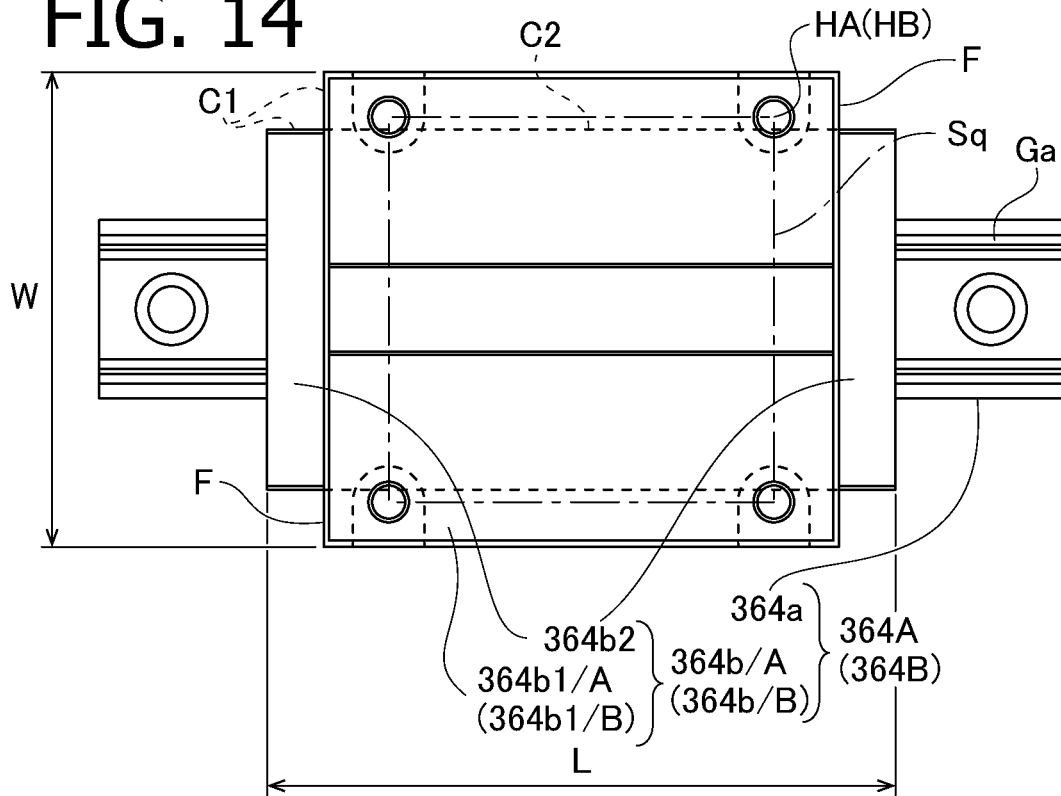
FIG. 14 is a plan view of an A-type linear guide according to embodiments of the present disclosure.
Figure 15:
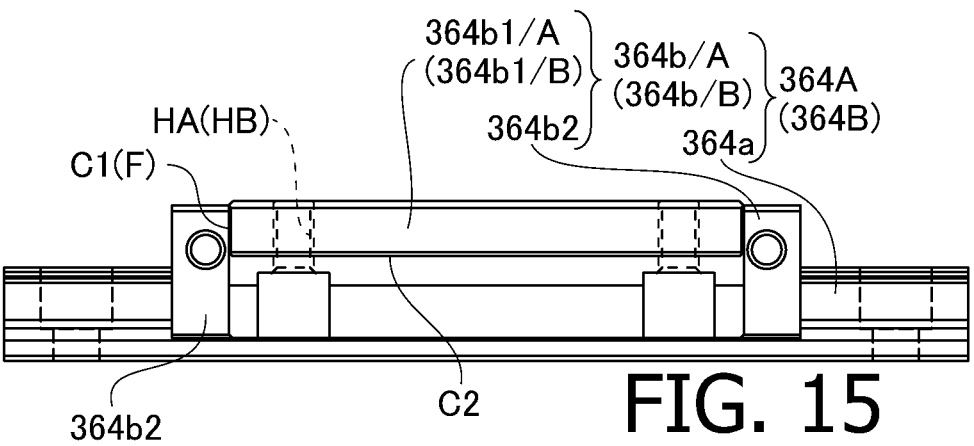
FIG. 15 is a side view of the A-type linear guide according to embodiments of the present disclosure.
Figure 16:
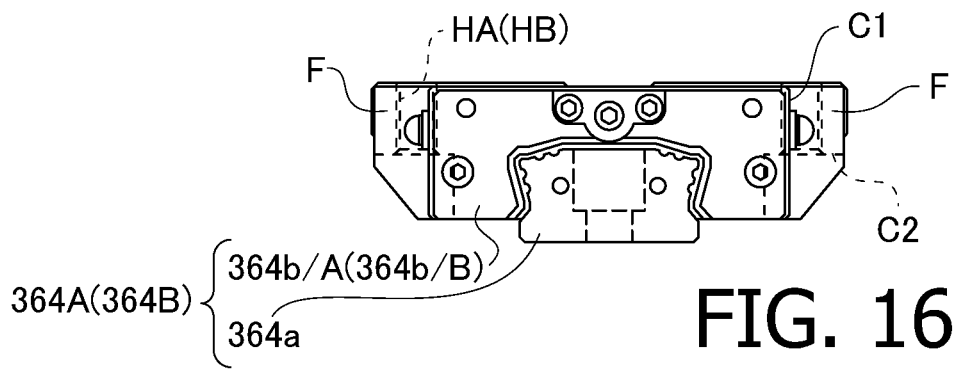
FIG. 16 is a front view of the A-type linear guide according to embodiments of the present disclosure.

FIG. 14, FIG. 15 and FIG. 16 are a plan view, a side view and a front view of the A-type linear guide 364A (B-type linear guide 364B), respectively. The A-type linear guide 364A (B-type linear guide 364B) includes a rail 364a and an A-type carriage 364b/A (B-type carriage 364b/B).

The A-type carriage 364b/A (B-type carriage 364b/B) is provided with four attachment holes HA (attachment holes HB), being tapped holes (drilled holes) for fixing bolts, at four corners of a top face of the carriage. Structures of the A-type carriage 364b/A and the B-type carriage 364b/B are identical except for types of the attachment holes HA, HB.

The four attachment holes HA, HB are formed such that their center lines touch respective corners of a square Sq (shown in a chain line in FIG. 14) on the top face of the carriage. That is, intervals (lengths of sides of the square Sq) at which the attachment holes HA of the A-type carriage 364b/A are formed coincide with intervals at which the attachment holes HB of the B-type carriage 364b/B are formed, and the arrangements of the attachment holes HA, HB each have four times rotation symmetry.

Therefore, the A-type linear guide 364b/A and the B-type linear guide 364b/B are configured such that, even if the A-type linear guide 364b/A and the B-type linear guide 364b/B are superimposed while shifting their moving directions to each other by 90 degrees, the four attachment holes HA and the four attachment holes HB respectively communicate, thereby making it possible to couple the A-type carriage 364b/A and the B-type carriage 364b/B by 4 bolts.

Also, since the attachment holes HA of the A-type carriage 364b/A are formed as tapped holes and the attachment holes HB of the B-type carriage 364b/B are formed as drilled holes, the A-type carriage 364b/A and the B-type carriage 364b/B can be coupled directly with each other without using a coupling plate. This makes it possible to downsize and reduce weight of the cross guide 364. By downsizing and reducing weight of the cross guide 364 by eliminating a coupling plate as described above, a rigidity of the cross guide 364 increases (i.e., eigen frequency of the cross guide 364 increases) and thereby the oscillating performance of the oscillating device 1 improves. Specifically, it becomes possible to oscillate up to a higher frequency with less vibration noises. Also, due to the reduced weight, electrical power needed to oscillate the cross guide 364 (i.e., to drive the mechanism part 10) is reduced.

An L-shaped notch C1 is formed at each of the four corners of the top face of the carriage of the A-type carriage 364b/A (B-type carriage 364b/B). Furthermore, a pair of L-shaped notches C2 extending in the moving direction are formed at lower portions of both sides in a width direction (up-down direction in FIG. 14) of the A-type carriage 364b/A (B-type carriage 364b/B). That is, apart from flange portions F overhanging from both sides in the width direction where the attachment holes HA (attachment holes HB) are formed, both side edges of the A-type carriage 364b/A (B-type carriage 364b/B) in the width direction are cut off. By these configurations, weight reduction of the A-type carriage 364b/A (B-type carriage 364b/B) is realized.

Since, as described above, the cross guide 364 consists only of the A-type linear guide 364A and B-type linear guide 364B for cross guides and four bolts for coupling the A-type linear guide 364A and B-type linear guide 364B, the cross guide 364 is small, lightweight and have a high rigidity. Therefore, a resonance frequency of the cross guide 364 is high, making it possible to realize an XY slider (slide coupling mechanism) with less vibration noises.

Also, as described above, apart from the attachment holes HA, HB, the A-type carriage 364b/A and the B-type carriage 364b/B have the same structure. Therefore, by coupling the A-type linear guide 364A and the B-type linear guide 364B while shifting their moving directions to each other by 90 degrees, the mass distribution directionalities of each of the linear guides in the length (L) direction and in the width (W) direction are offset, and thereby a cross guide 364 with small mass distribution directionality is realized.

Also, each of the carriage 364b/A and 364b/B has substantially two times rotation symmetry around an axis in an up-down direction (direction perpendicular to the paper in FIG. 14) but does not have four times rotation symmetry. Therefore, response characteristics of each of the carriages 364b/A, 364b/B to external forces in the moveable direction (left-right direction in FIG. 14) and in a lateral direction (up-down direction in FIG. 14) are different.

The carriage (cross carriage) of the cross guide 364 in which the A-type linear guide 364b/A and the B-type linear guide 364b/B, each having substantially two times rotation symmetry and their mass distributions being substantially equal, are rotated by 90 degrees about an up-down direction axis (rotation symmetry axis) and coupled with each other obtains substantially four times rotation symmetry and thus has response characteristics to external forces in two moving directions (X-axis direction and Y-axis direction) being more homogenous.

By coupling the movable part 320 of the Z-axis oscillating unit 300 and the vibrating table 400 via the cross guide 364, the vibrating table 400 is coupled to the movable part 320 of the Z-axis oscillating unit 300 slidably in the X-axis direction and the Y-axis direction.

Next, an internal structure of each linear guide configuring the cross guide 364 will be described by exemplifying the A-type linear guide 364A.

Figure 17:
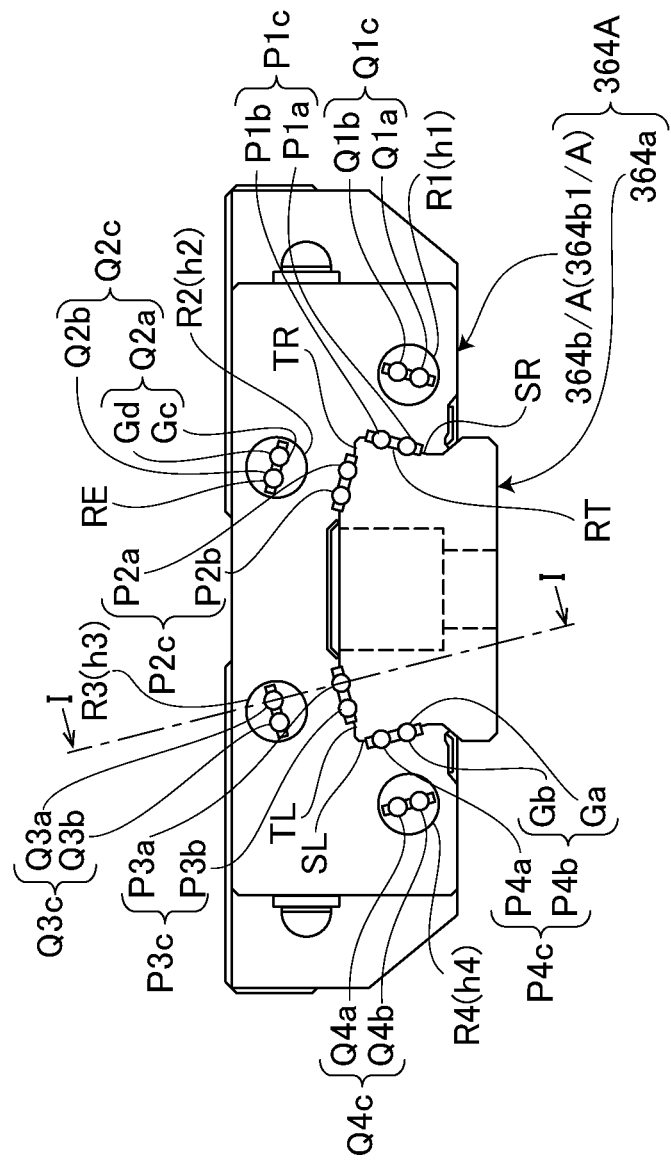
FIG. 17 is a cross sectional view of the A-type linear guide according to embodiments of the present disclosure.
Figure 18:
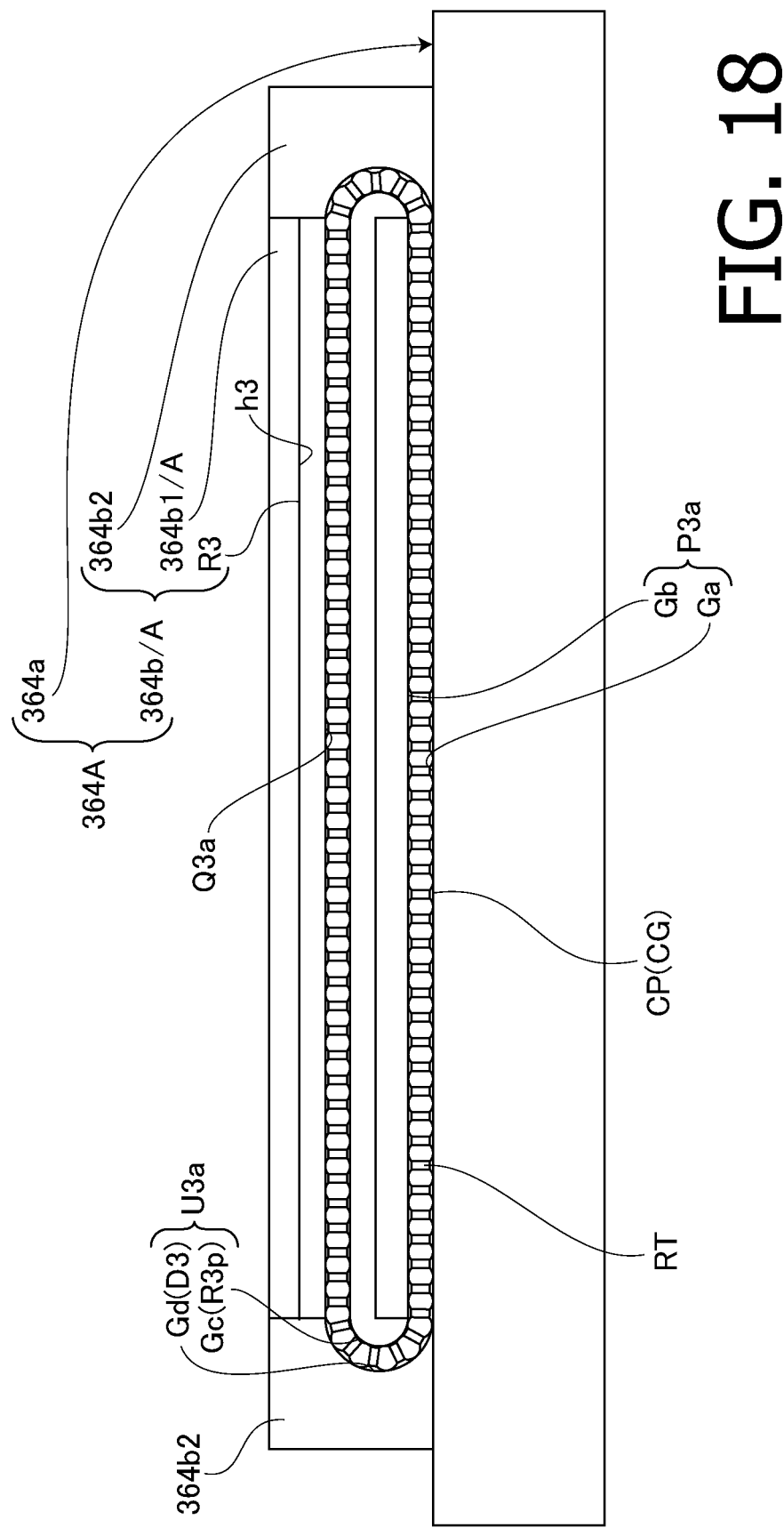
FIG. 18 is a diagram showing a section I-I of FIG. 17.

FIG. 17 is a cross sectional view of the A-type linear guide 364A. Also, FIG. 18 is a diagram showing of a section I-I of FIG. 17. The A-type linear guide 364A of the present embodiment is a linear guide of which the number of balls RE (the number of effective balls) being rolling bodies interposed between the rail and the carriage is increased to equal to or more than twice the ordinary number of balls by decreasing an outer diameter of the ball RE to about a half the ordinary outer diameter and by setting the number of load paths for the rolling bodies to eight streaks which is twice the ordinary number of load paths. Due to this configuration, since the load is distributed to equal to or more than twice the ordinary number of balls RE, a load for one ball RE is reduced by half, and thereby the rigidity of the linear guide improves significantly. Also, due to the increase in the number of effective balls, a more homogenous roll guiding becomes possible, and, as a result, a motion accuracy of the carriage improves (specifically, posture fluctuations and vibrations of the carriage that occur during travelling decreases).

The A-type carriage 364b/A includes a main block 364b1/A, a pair of end blocks 36462 attached on both sides of the main block 364b1/A in the moving direction, and four rod members R1, R2, R3, R4 respectively inserted in four cylindrical through holes h1, h2, h3, h4 penetrating through the main block 364b1/A in the moving direction. The rod members R1, R2, R3, R4 of the present embodiment are members having the same configuration. It is noted that a main block 364b1/B of the B-type carriage 3641/B has the same configuration as the main block 364b/A. Accordingly, the description of the main block 364b1/B is herein omitted.

In the present embodiment, the main block 364b1/A is a metal member (e.g., stainless steel), and the end blocks 364b2 and the rod members R1, R2, R3, R4 are resin members. It is noted that materials of each of the members configuring the A-type carriage 364b/A is not limited to those of the present embodiment, and can be properly selected from metals, resins, ceramics or every types of composite materials (e.g., fiber reinforced plastic).

As shown in FIG. 17, on each of both side faces of the rail 364a (right side face SR, left side face SL), two streaks of grooves Ga extending in the length direction are formed close to each other. Also, on each of the left and right portions of the top face of the rail 364a (right top face TR, left top face TL), two streaks of grooves Ga extending in the length direction are formed close to each other.

On the other hand, on the main block 364b1/A of the A-type carriage 364b/A, eight streaks (two streaks×four sets) of grooves Gb are formed at positions opposing each of the grooves Ga. By the pairs of the grooves Ga and the grooves Gb opposing to each other, load paths Pa (P1a, P2a, P3a, P4a) and load paths Pb (P1b, P2b, P3b, P4b) are formed. It is noted that a load path refers to a portion among a path of the rolling bodies where a load acts on the rolling bodies.

The load paths P1a and P1b (load path pair P1) are formed close to each other between the right side face SR of the rail 364a and the main block 364b1/A. The load paths P2a and P2b (load path pair P2) are formed close to each other between the right top face TR of the rail 364a and the main block 364b1/A. The load paths P3a and P3b (load path pair P3) are formed close to each other between the left top face TL of the rail 364a and the main block 364b1/A. The load paths P4a and P4b (load path pair P4) are formed close to each other between the left side face SL of the rail 364a and the main block 364b1/A. The pair of paths for the rolling bodies that are formed in parallel and close to each other as described above will be hereinafter referred to as a "path pair."

Also, between the right side face SR, right top face TR, left top face TL and left side face SL of the rail 364a and the main block 364b1/A, gaps P1c, P2c, P3c, P4c are respectively formed. The load path pairs P1, P2, P3, P4 are respectively formed in the gaps P1c, P2c, P3c, P4c.

The four through holes h1, h2, h3, h4 are formed in parallel with and at positions opposing the respective four load path pairs P1, P2, P3, P4.

Through holes Qc (Q1c, Q2c, Q3c, Q4c) having substantially rectangular cross sectional shapes pass through the rod members R1. R2, R3, R4 in the length directions, respectively. On an inner peripheral surface of each through hole Qc (specifically, two surfaces opposing with a narrow interval), no-load paths Qa (Q1a, Q2a, Q3a, Q4a) and Qb (Q1b, Q2b, Q3b, Q4b) consisting of two opposing pairs of grooves Gc, Gd (Reference signs are indicated only to the through hole Q2c.) extending in the extending direction of the through hole Qc are formed.

As shown in FIG. 18, on each of both ends of the rod member R3, an U-shaped protruding part R3p protruding from a through hole h3 of the main block 364b1/A is provided. On an outer peripheral surface of each protruding part R3p, the above mentioned pair of parallel grooves Gc is formed. On the other rod members R1, R2, R4, protruding parts Rip, R2p, R4p (not shown), each formed with a pair of the U-shaped grooves Gc, are respectively provided as well.

On the end block 364b2, four recessed parts D1, D2, D3, D4 (Only the recessed part D3 is shown in the drawings.) configured to accommodate respective protruding parts Rp (R1p, R2p, R3p, R4p) are formed. On the recessed part D3, a pair of grooves Gd respectively opposing the pair of grooves Gc formed on the protruding part R3p is formed. By the two pairs of grooves Gc, Gd opposing to each other, Two U-shaped turning paths U3a, U3b (Only the path U3a is shown in the drawings.) are formed. Similarly, a pair of the grooves Gd is formed on each of the other three recessed parts D1, D2, D4 as well, and a pair of turning paths U1a and U1b, a pair of turning paths U2a and U2b, and a pair of turning paths U4a and U4b are formed between respective pairs of grooves Gc formed on the protruding parts Rip, R2p, R4p.

Also, between the protruding parts R1p, R2p, R3p, R4p and the recessed parts D1, D2, D3, D4, gaps Gu1, Gu2, Gu3, Gu4 (not shown) are respectively formed. The turning paths U1a and U1b, the turning paths U2a and U2b, the turning paths U3a and U3b, and the turning paths U4a and U4b are respectively formed in the gaps Gu1, Gu2, Gu3, Gu4.

One end of each of the turning paths Ua, Ub is connected to the load path Pa, Pb, and the other end is connected to the no-load path Qa, Qb, respectively. That is, eight streaks of the load paths P1a, P1b, P2a. P2b, P3a, P3b. P4a, P4b and eight streaks of the no-load paths Q1a, Q1b, Q2a, Q2b, Q3a, Q3b, Q4a, Q4b are connected to form loops by the eight turning paths U1a, U1b, U2a, U2b, U3a, U3b, U4a, U4b, thereby forming eight circulating passages.

Also, the gaps Pc (P1c, P2c, P3c, P4c) and the through holes Qc (Q1c, Q2c, Q3c, Q4c) are connected to form loops by the pairs of U-shaped gaps Gu (Gu1, Gu2, Gu3, Gu4), thereby forming four annular gaps CG. To these four annular gaps CG, the above described four pairs (eight streaks) of circulating passages CP are respectively formed.

To each of the eight streaks of circulating passages CP, a plurality of balls RE (rolling bodies) made of stainless steel are accommodated while aligned in a line. Also, a retainer RT in the form of one endless belt is inserted in each of the four annular gaps CG.

Figure 19:
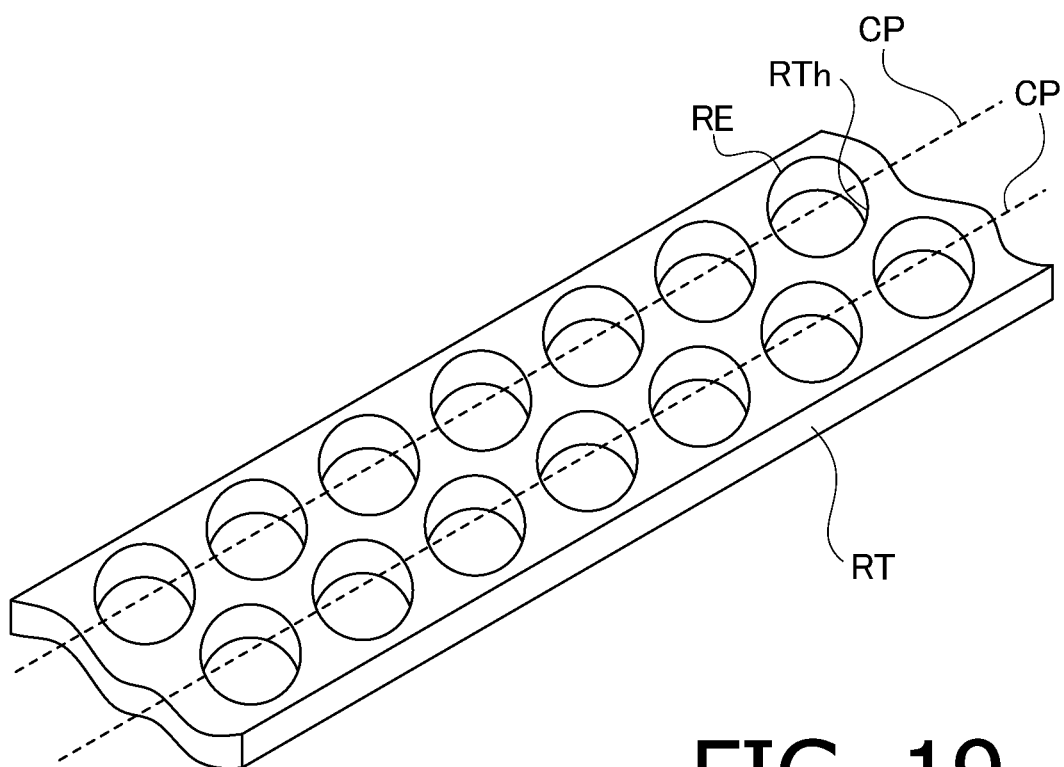
FIG. 19 is an illustration diagram of a retainer.

FIG. 19 is a perspective view showing a portion of the retainer RT. The retainer RT is a flexible resin member, and a plurality of through holes RTh are formed at regular intervals in two rows in the length direction. An interval between the two rows of the through holes RTh is the same as an interval between the two streaks of circulating passages CP (passage pair) provided in each annular gap CG. In the two rows of the through holes RTh of the retainer RT, each of a plurality of the balls RE arranged in the passage pair within the same annular gap CG is rotatably fitted. Then, the retainer RT circulates within the annular gap CG together with a plurality of the balls RE. The retainer RT prevents the balls RE from contacting with each other and thereby reduces vibration noises caused by frictions between the balls RE and abrasion of the balls RE.

As shown in FIG. 14, a length L of the A-type carriage 364b/A (and B-type carriage 364b/B) of the present embodiment is set to be equal to or less than 125 mm (about 120 mm) and thereby an aspect ratio (a ratio L/W of the length L and a width W) is suppressed to be equal to or less than 1.35 (about 1.32).

If the carriage is long, a motion accuracy (waving characteristic and the like) and a rigidity improve, but there is an disadvantage that the mass increases and the oscillating (accelerating) performance degrades. Preferably, the length L of the eight-streak type carriage to be used in the oscillating device is within the range of 70-160 mm (more preferably, within the range of 90-140 mm, and further preferably, within the range of 110-130 mm).

Also, the aspect ratio L/W is better to be near 1 so that the oscillating performances becomes uniform in every axis directions. Preferably, the aspect ratio L/W of the eight-streak type carriage such as the one in the present embodiment is within the range of 0.65-1.5 (more preferably, within the range of 0.7-1.4, and further preferably, within the range of 0.75-1.35).

By coupling the Z-axis oscillating unit 300 and the vibrating table 400 via the XY slider 360 capable of sliding in the X-axis direction and the Y-axis direction with small resistance as described above, vibration components of the vibrating table 400 in the X-axis direction and the Y-axis direction will not be transmitted to the Z-axis oscillating unit 300 even if the vibrating table 400 is vibrated in the X-axis direction and the Y-axis direction by the X-axis oscillating unit 100 and the Y-axis oscillating unit 200, respectively.

Also, forces in the X-axis direction and the Y-axis direction hardly act on the vibrating table 400 by the driving of the Z-axis oscillating unit 300. Therefore, oscillation with less crosstalk becomes possible.

Also, as described above, in the A-type linear guide 364A of the present embodiment, the number of streaks of the circulating passages CP is set to eight which is twice the ordinary number of streaks by decreasing the outer diameter of the ball RE to about a half the ordinary outer diameter. Furthermore, the number of balls RE arranged in the load paths is also increased to nearly twice the ordinary number of balls RE. As a result, the A-type carriage 364b/A is more dispersedly supported by equal to or more than twice (nearly four times) the conventional number of balls RE. As a result, improvement in the rigidity and improvement in the motion accuracy (lowering of wavings) are realized.

Since the use of eight-streak type linear guides such as the A-type linear guide 364A had been limited to the use for the purpose of improving positional accuracies in machine tools or the like, conventional eight-streak type linear guides have large carriage lengths L of equal to or more than 180 mm, and their aspect ratios are equal to or more than 2.3 indicating that they have bad weight balances. As a result, the conventional eight-streak type linear guides had not been suitable for mechanisms such as oscillating devices which are driven at high speeds. The A-type linear guide 364A (B-type linear guide 364B) of the present embodiment is made such that the eight-streak type linear guide becomes applicable to oscillating devices by making the carriage length L and the aspect ratio smaller. Also, oscillations with frequencies over 2 kHz, which were conventionally difficult, have become possible by the use of the A-type linear guide 364A.

Next, a configuration of the YZ slider 160 which couples the X-axis oscillating unit 100 and the vibrating table 400 will be described.

Figure 20:
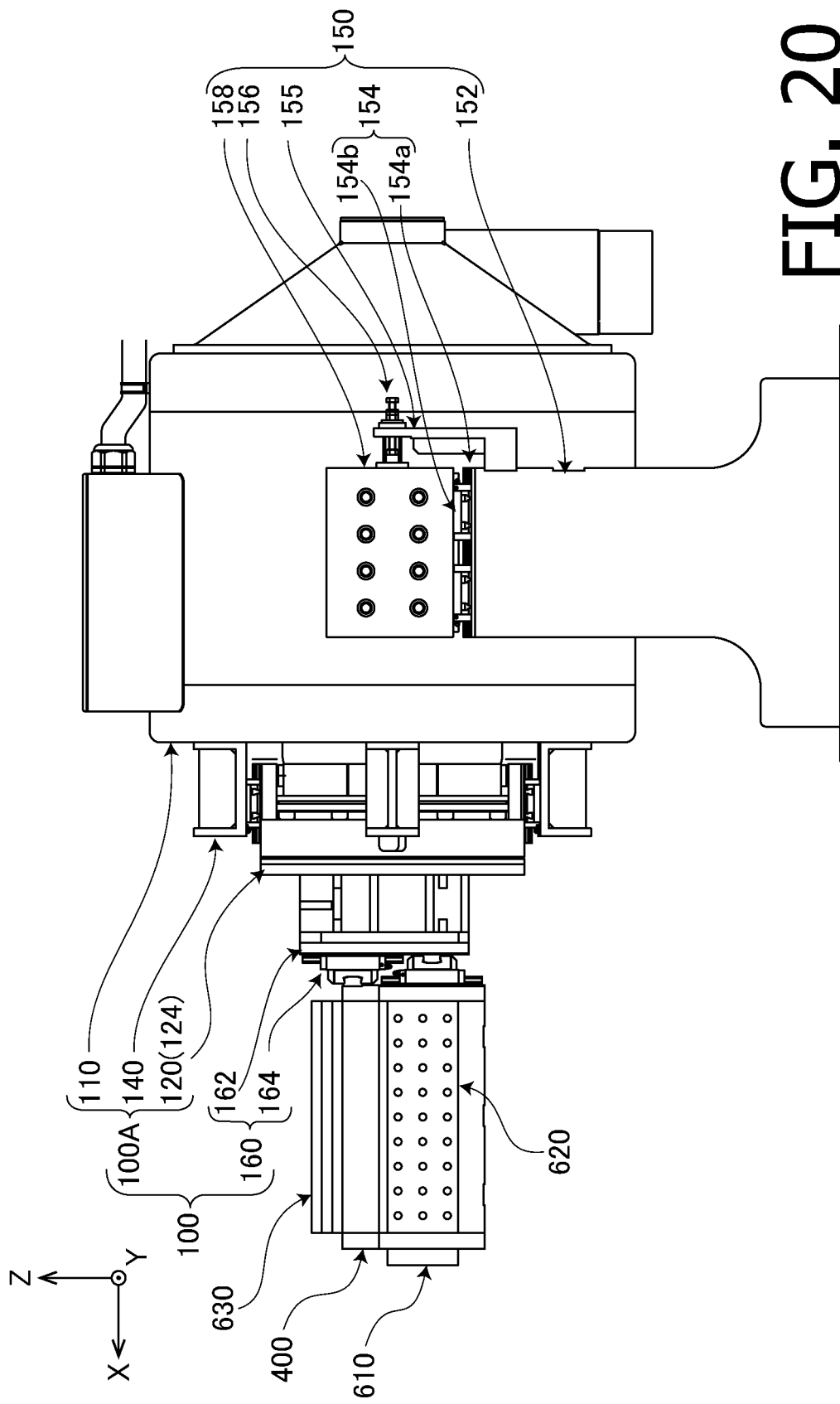
FIG. 20 is a side view of an X-axis oscillating unit according to the first embodiment of the present disclosure.

FIG. 20 is a side view of the X-axis oscillating unit 100 and the vibrating table 400.

Figure 21:
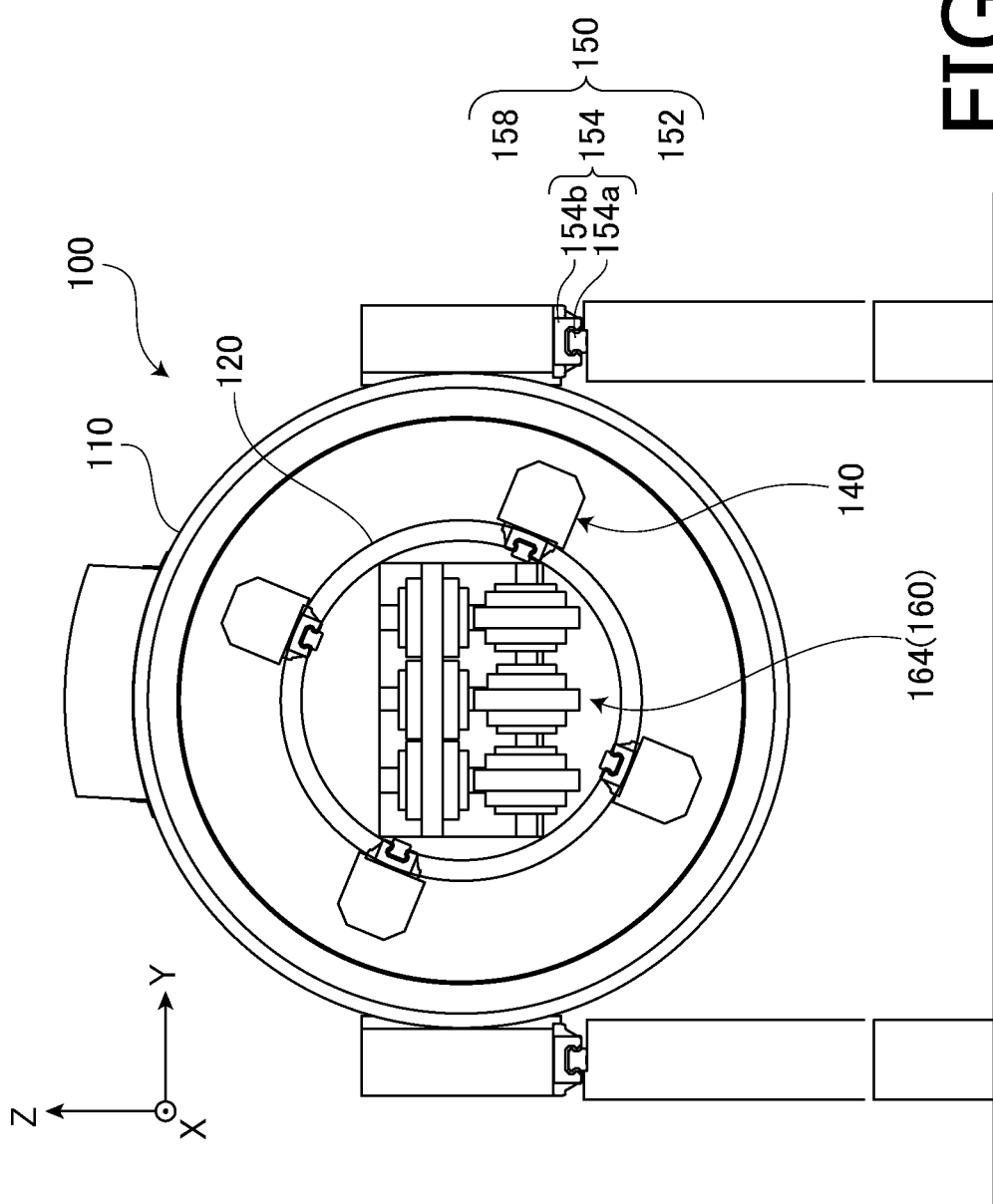
FIG. 21 is a front view of the X-axis oscillating unit according to the first embodiment of the present disclosure.

FIG. 21 is a front view of the X-axis oscillating unit 100.

Figure 22:
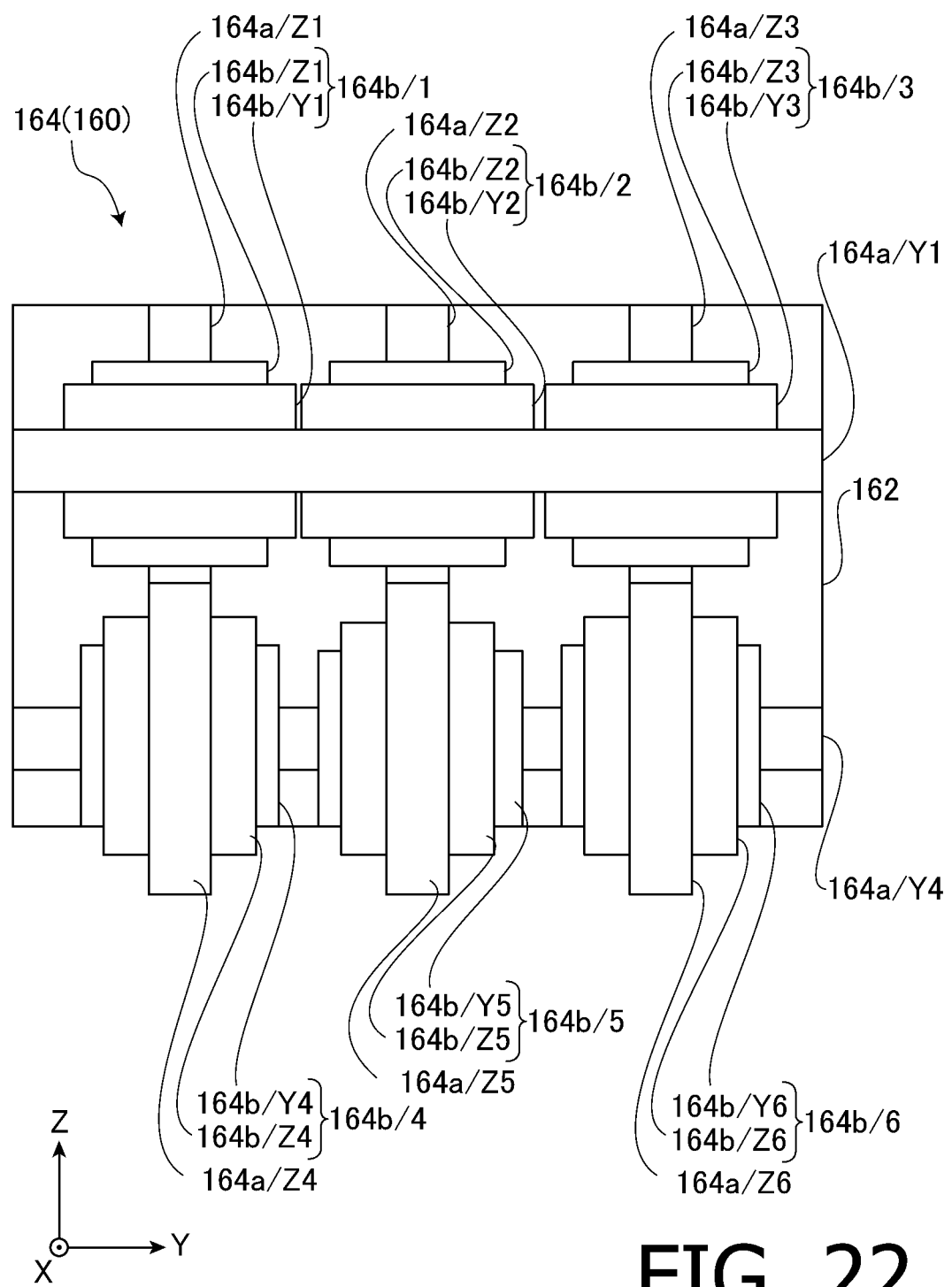
FIG. 22 is an enlarged view of the YZ slider shown in FIG. 21.

FIG. 22 is a front view of the YZ slider 160.

Figure 23:
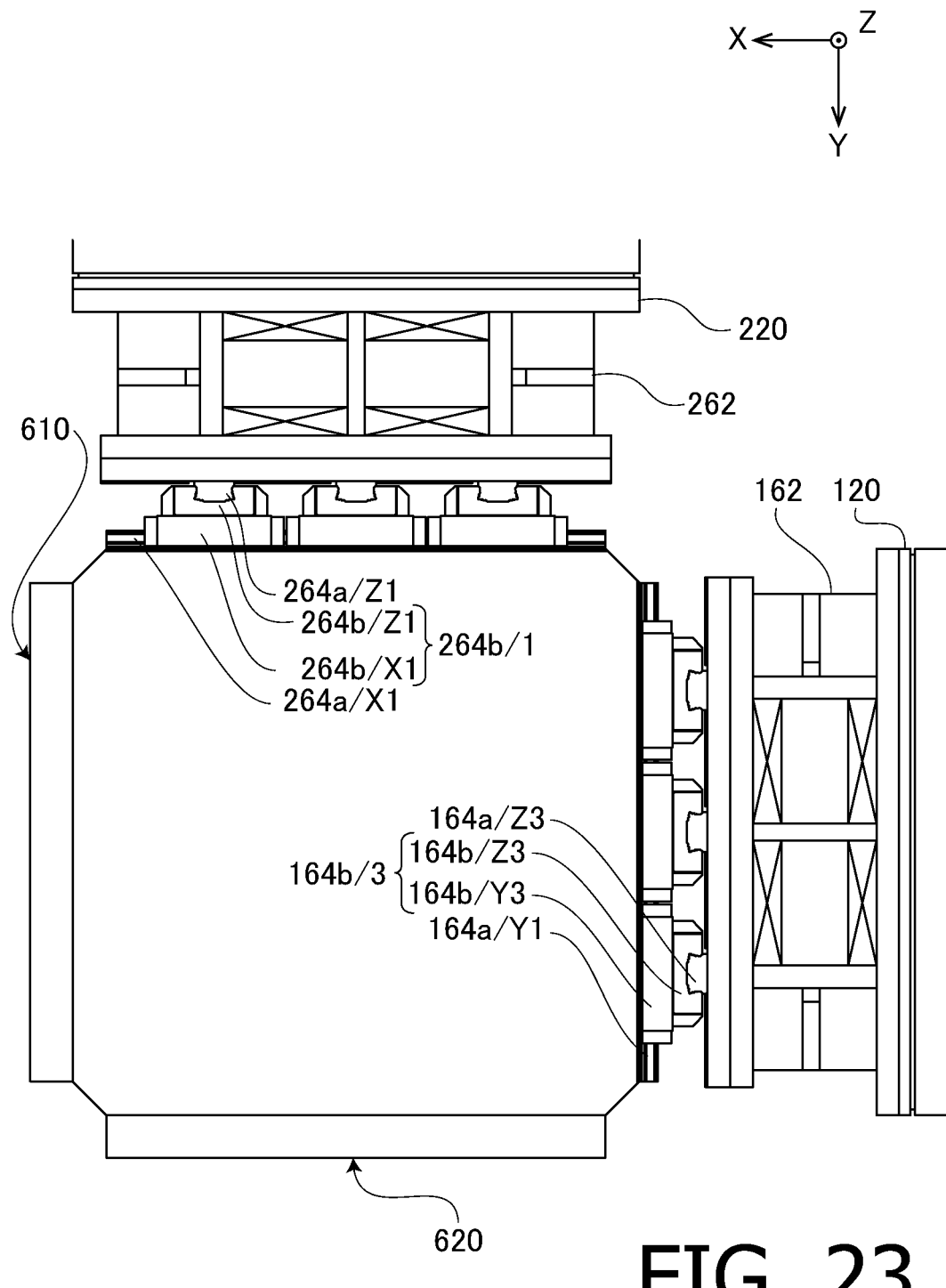
FIG. 23 is a plan view around a vibrating table of the oscillating device according to the first embodiment of the present disclosure.

FIG. 23 is a plan view around the vibrating table 400.

As shown in FIG. 20, the YZ slider 160 includes a coupling arm 162 fixed to a tip face of the movable part 120 (expansion frame 124) of the X-axis oscillating unit 100, and a cross guide part 164 coupling the coupling arm 162 and the vibrating table 400 slidably in the y-axis direction and the Z-axis direction.

As shown in FIG. 22, the cross guide part 164 includes two Y-axis rails 164a/Y (164a/Y1, 164a/Y4), six Z-axis rails 164a/Z (164a/Z1, 164a/Z2, 164a/Z3, 164a/Z4, 164a/Z5, 164a/Z6), and six cross carriages 164b (164b/1, 164b/2, 164b/3, 164b/4, 164b/5, 164b/6) which couple the Y-axis rails 164a/Y and the Z-axis rails 164a/Z slidably in the Y-axis direction and the Z-axis direction. The six cross carriages 164b are arranged in a lattice (Y-axis direction: three rows, Z-axis direction: two rows). It is noted that the cross carriages 164b/2, 164b/3, 164b/4, 164b/5, 164b/6 have the same configuration as the cross carriage 164b/1. Accordingly, the descriptions of the cross carriages 164b/2, 164b/3, 164b/4, 164b/5, 164b/6 and their Y-axis carriages 164b/Y2, 164b/Y3, 164b/Y4, 164b/Y5, 164b/Y6 and Z-axis carriages 164*b*/Z2, 164*b*/Z3, 164*b*/Z4, 164*b*/Z5, 164*b*/Z6 are herein omitted. Also, a cross carriage 264*b*/1 has the same configuration as the cross carriage 164*b*/1. Accordingly, the descriptions of the cross carriage 264*b*/1 and its X axis rail 264*a*/X1, Z-axis rail 264*a*/Z1, X-axis carriage 264*b*/X1 and Z-axis carriage 264*b*/Z1 are herein omitted. Furthermore, a coupling arm 262 fixed to a tip face of a movable part 220 of the horizontal actuator 200A has the same configuration as the coupling arm 162.

Three Z-axis rails 164*a*/Z1, 164*a*/Z2, 164*a*/Z3 on the upper row and one Y-axis rail 164*a*/Y4 on the lower row are fixed to the tip face of the coupling arm 162. Also, the remaining three Z-axis rails 164*a*/Z4, /Z5, /Z6 on the lower row and one Y-axis rail 164*a*/Y1 on the upper row are fixed to a side face of the vibrating table 400.

The cross carriage 164*b*/1 is a cross carriage in which the Y-axis carriage 164*b*/Y1 which engages with the Y-axis rail 164*a*/Y1 and a Z-axis carriage 164*b*/Z1 which engages with the Z-axis rail 164*a*/Z1 are superimposed back to back (i.e., the top faces of the carriages are superimposed with each other) and fixed. One of the Y-axis carriage 164*b*/Y1 and the Z-axis carriage 164*b*/Z1 has the same configuration as the above-described A-type carriage 364*b*/A, and the other has the same configuration as the above-described B-type carriage 364*b*/B. Similarly to the cross carriage of the crossguide 364, the Y-axis carriage 164*b*/Y1 and the Z-axis carriage 164*b*/Z1 are directly fixed together only with four bolts without using an attaching plate.

All the three cross carriages 164*b*/1, 164*h*2, 164*b*/3 on the upper row engage with one Y-axis rail 164*a*/Y1 on the upper row, and engage with three Z-axis rails 164*a*/Z1, 164*a*/Z2, 164*a*/Z3 on the upper row, respectively.

Similarly, all the three cross carriages 164*b*/4, 164*b*/5, 164*b*/6 on the lower row engage with one Y-axis rail 164*a*/Y4 on the lower row, and engage with three Z-axis rails 164*a*/Z4, 164*a*/Z5, 164*a*/Z6 on the lower row, respectively.

The vibrating table 400 is coupled to the movable part 120 of the X-axis oscillating unit 100 slidably in the Y-axis direction and the Z-axis direction by the configuration of the YZ slider 160 described above.

By coupling the X-axis oscillating unit 100 and the vibrating table 400 via the YZ slider 160 capable of sliding in the Y-axis direction and the Z-axis direction with small resistance as described above, vibration components of the vibrating table 400 in the Y-axis direction and the Z-axis direction will not be transmitted to the X-axis oscillating unit 100 even if the vibrating table 400 is vibrated in the Y-axis direction and the Z-axis direction by the Y-axis oscillating unit 200 and the Z-axis oscillating unit 300, respectively.

Also, forces in the Y-axis direction and the Z-axis direction hardly act on the vibrating table 400 by the driving of the X-axis oscillating unit 100. Therefore, oscillation with less crosstalk becomes possible.

Furthermore, the ZX slider 260 which couples the Y-axis oscillating unit 200 and the vibrating table 400 also has the same configuration as the YZ slider 160, and the vibrating table 400 is coupled to the movable part 220 of the Y-axis oscillating unit 200 slidably in the Z-axis direction and the X-axis direction. Therefore, vibration components of the vibrating table 400 in the Z-axis direction and the X-axis direction will not be transmitted to the Y-axis oscillating unit 200 even if the vibrating table 400 is vibrated in the Z-axis direction and the X-axis direction by the Z-axis oscillating unit 300 and the X-axis oscillating unit 100, respectively.

Also, forces in the Z-axis direction and the X-axis direction hardly act on the vibrating table 400 by the driving of the Y-axis oscillating unit 200. Therefore, oscillation with less crosstalk becomes possible.

As described above, the oscillating units 100, 200, 300 can accurately oscillate the vibrating table 400 in respective driving directions without interfering with each other. Also, since the movable parts of the oscillating units 100, 200, 300 are supported movably only in their driving directions by the movable part support mechanisms 140, 240, 340, respectively, the oscillating units 100, 200, 300 hardly vibrate in the non-driving directions. Therefore, uncontrolled vibrations in the non-driving directions do not act on the vibrating table 400 from the oscillating units 100, 200, 300. Accordingly, vibration of the vibrating table 400 in each axis direction is accurately controlled by the driving of the corresponding one of the oscillating units 100, 200, 300.

The vibrating table 400 is configured such that its center of gravity substantially coincides with the center of its outer dimension so as to suppress occurrence of unnecessary rotational motion (rotational vibration). However, if the biaxial sliders (YZ slider 160, ZX slider 260, XY slider 360) are attached to one side of the vibrating table 400 in each axis direction, since portions of the biaxial sliders are fixed to the vibrating table 400 (more precisely, portions of the biaxial sliders are restrained by the vibrating table 400 and move along with the vibrating table 400), the center of gravity of the oscillated portion (the vibrating table 400 and the portions of the biaxial sliders) shifts from the center of the vibrating table 400. This bias in the center of gravity of the oscillated portion causes rotational vibration of the vibrating table 400 and, as a result, causes variations in vibrating states (e.g., acceleration) according to positions on the vibrating table 400.

In consideration of the above, in the present embodiment, counter balancers which compensate the ambalance caused by the biaxial sliders are provided to the vibrating table 400 on the opposite sides of the biaxial sliders such that the center of gravity of the oscillated portion (the vibrating table 400, the counter balancers and the portions of the biaxial sliders) substantially coincides with the center of the vibrating table 400.

As shown in FIGS. 1-3 and FIGS. 5-7, on a side face of the vibrating table 400 opposite to the side face on which the YZ slider 160 is attached (i.e., the side face on the X-axis positive direction side), an X-axis counter balancer 610 (first counter balancer) is provided.

Also, on a side face of the vibrating table 400 opposite to the side face on which the ZX slider 260 is attached (i.e., the side face on the Y-axis positive direction side), a Y-axis counter balancer 620 (second counter balancer) is provided. It is noted that the Y-axis counter balancer 620 of the present embodiment has the same configuration as the X-axis counter balancer 610.

Furthermore, on a top face of the vibrating table 400 opposite to the lower face on which the XY slider 360 is attached (i.e., the side face on the Z-axis positive direction side), a Z-axis counter balancer 630 (third counter balancer) is provided.

Figure 25:
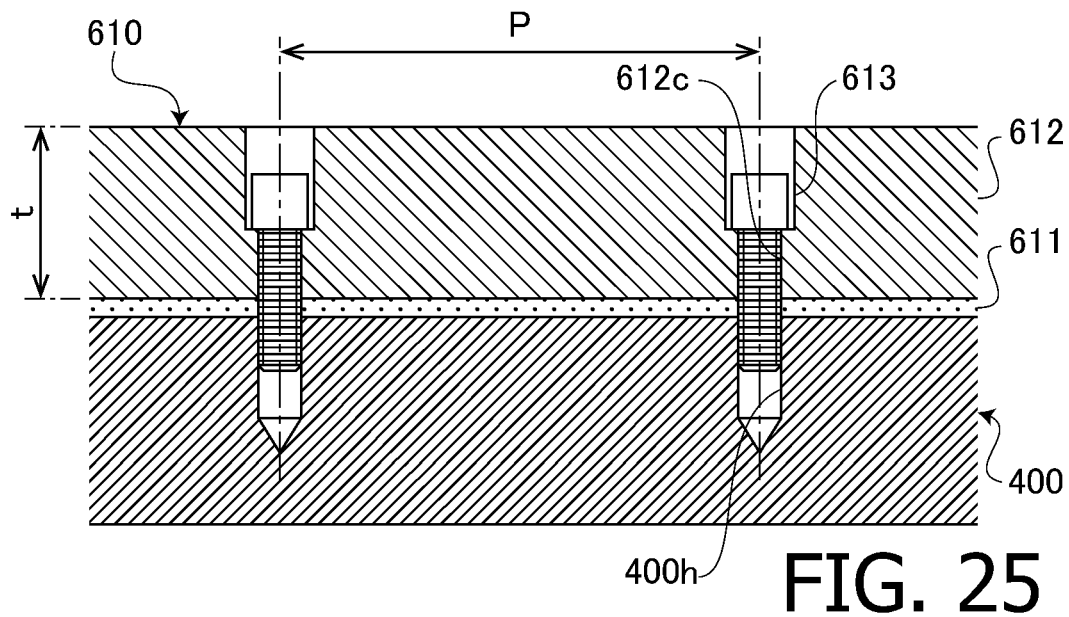
FIG. 25 is a sectional view of an X-axis counter balancer.

FIG. 25 is a sectional view of the X-axis counter balancer 610 (and the Y-axis counter balancer 620). It is noted that the X-axis counter balancer 610 includes a cushioning layer 611 (cushioning part) and a weight plate 612 (weight part). The cushioning layer 611 is pinched between the weight plate 612 and the side face of the vibrating table 400 and fastened.

The weight plate 612 is a member for providing a mass for compensating an imbalance of the oscillated portion caused by the attachment of the biaxial slider to the vibrating table 400. It is noted that the imbalance of the oscillated portion may represent an uneven distribution of weight in the oscillated portion. A thickness t of the weight plate 612 of the present embodiment is 20 mm.

The cushioning layer 611 blocks transmission of vibration noises with frequencies higher than an oscillating frequency between the weight plate 612 and the vibrating table 400. Also, the cushioning layer 611 prevents occurrence of chattering between the vibrating table 400 and the weight plate 612.

The weight plate 612 and the cushioning layer 611 are attached to the side face of the vibrating table 400 with a plurality of bolts 613. Tapped holes 400h are formed on the side face of the vibrating table 400, and through holes 612c are formed on the weight plate 612. The weight plate 612 and the cushioning layer 611 are fastened to the side face of the vibrating table 400 by inserting the bolts 613 in the through holes 612c and screwing them in the tapped holes 400h. It is noted that through holes communicating with the through holes 612c and the screw holes 400h are formed on the cushioning layer 611 as well.

Figure 33A:
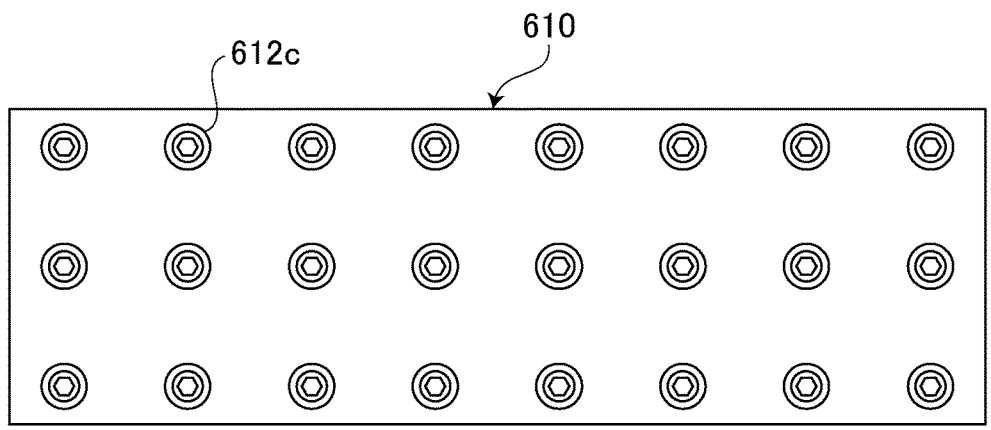
FIG. 33A, FIG. 33B and FIG. 33C are external views of the X-axis counter balancer.

As shown in FIG. 33A, on the X-axis counter balancer 610, a plurality of through holes 612c are formed in a lattice point in two orthogonal directions (Y-axis direction and Z-axis direction) at regular intervals P. In the present embodiment, the intervals P between the through holes 612c are 50 mm. The occurrence of the chattering can be effectively suppressed by shortening the intervals P between the through holes 612c (by setting the intervals P preferably to equal to or less than 100 mm, and more preferably to equal to or less than 50 mm).

Figure 26:
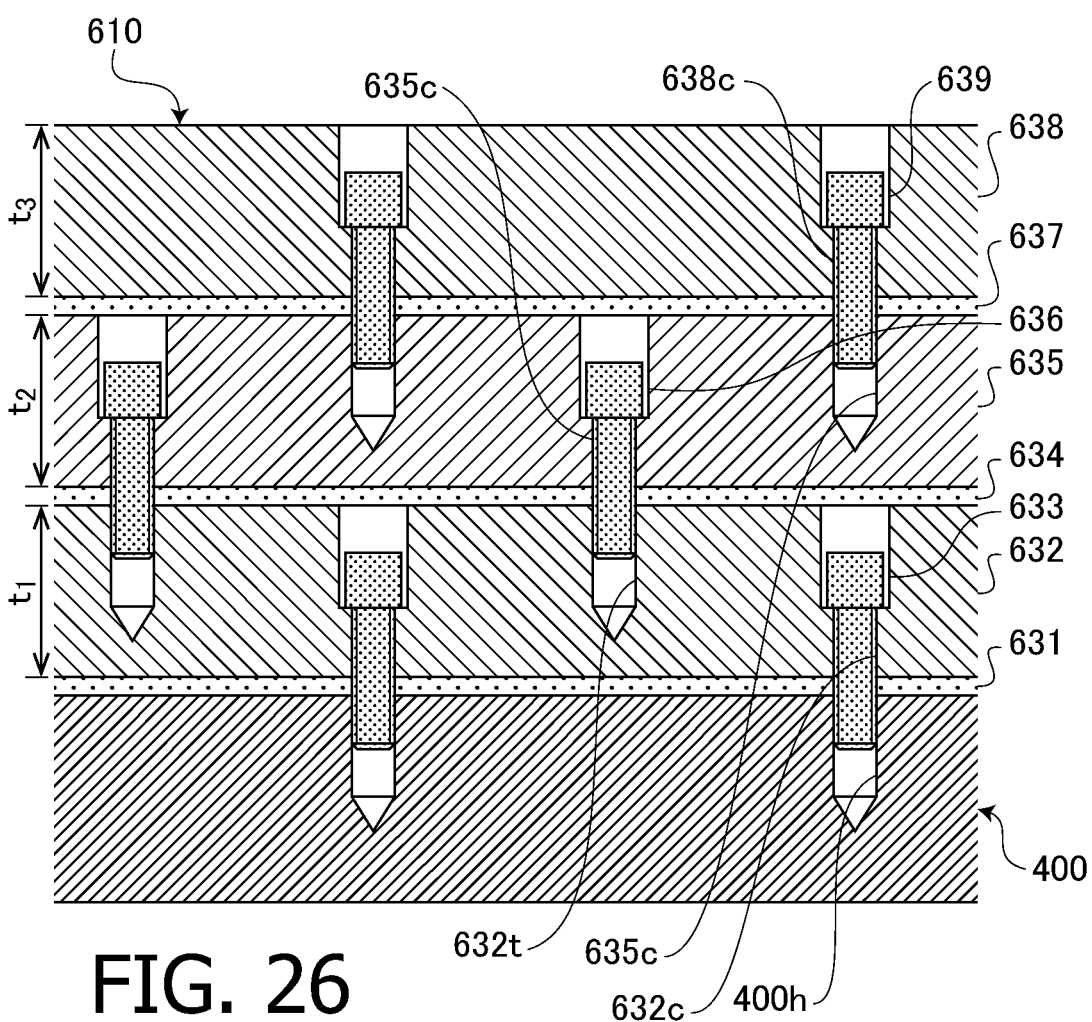
FIG. 26 is a sectional view of a Z-axis counter balancer.
Figure 27:
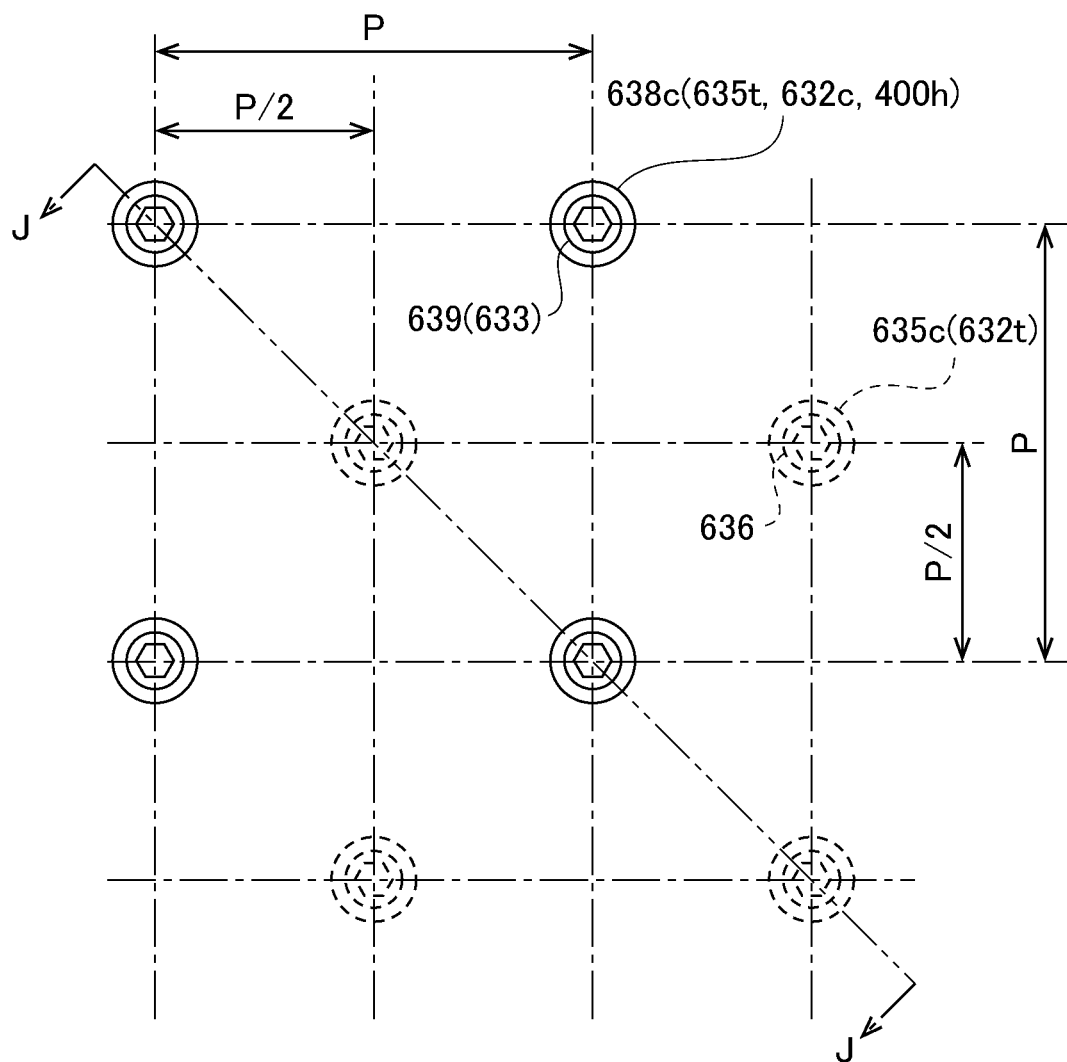
FIG. 27 is an enlarged plan view showing bolt fixing positions of the Z-axis counter balancer.

Next, a configuration of the Z-axis counter balancer 630 will be described. FIG. 26 is a sectional view of the Z-axis counter balancer 630. Also, FIG. 27 is an enlarged plan view showing bolt fixing positions of the Z-axis counter balancer 630. It is noted that FIG. 26 a sectional view in J-J of FIG. 27.

The Z-axis counter balancer 630 includes a first cushioning layer 631 (first cushioning part), a first weight plate 632 (first weight part), a second cushioning layer 634 (second cushioning part), a second weight plate 635 (second weight part), a third cushioning layer 637 (third cushioning part), and a third weight plate 638 (third weight part). The first cushioning layer 631, the first weight plate 632, the second cushioning layer 634, the second weight plate 635, the third cushioning layer 637 and the third weight plate 638 are stacked on the top face of the vibrating table 400 in this order.

The first weight plate 632, the second weight plate 635 and the third weight plate 638 are members for providing masses for compensating the imbalance of the oscillated portion caused by the attachment of the biaxial slider to the vibrating table 400 and, in the present embodiment, they are plate members made of aluminium alloy. In the present embodiment, thicknesses t1, t2, t3 of the first weight plate 632, the second weight plate 635 and the third weight plate 638 are 30 mm, 20 mm and 10 mm, respectively. It is noted that a width (X-axis direction) and a depth (Y-axis direction) of the vibrating table 400 of the present embodiment are 500 mm, and a width and a depth of the Z-axis counter balancer 630 are 400 mm.

The first cushioning layer 631, the second cushioning layer 634 and the third cushioning layer 637 lower transmission of vibration noises with frequencies higher than an oscillating frequency between the first weight plate 632 and the vibrating table 400 or between adjacent weight plates 632, 635, 638, respectively. Also, the first cushioning layer 631, the second cushioning layer 634 and the third cushioning layer 637 prevent occurrence of chatterings between the vibrating table 400 and the first weight plate 632 or between adjacent weight plates 632, 635, 638.

On the first weight plate 632, a plurality of through holes 632c and a plurality of tapped holes 632t are respectively formed in lattice points in two orthogonal directions (X-axis direction and Y-axis direction) at regular intervals (in the present embodiment, at intervals P which are the same as those for the through holes 612c of the X-axis counter balancer 610). It is noted that, as shown in FIG. 27, positions of the through holes 632c and the tapped holes 632t are shifted by P/2 in each arranging direction. That is, in the plan view, the tapped hole 632t is formed at an intermediate position of four through holes 632c. The first weight plate 632 and the first cushioning layer 631 are fastened to the top face of the vibrating table 400 by inserting bolts 633 in the through holes 632c and screwing them in tapped holes 400h formed on the top face of the vibrating table 400.

On the second weight plate 635, a plurality of through holes 635c and a plurality of tapped holes 635t are respectively formed in lattice points in two orthogonal directions (X-axis direction and Y-axis direction) at regular intervals P as well. Positions of the through holes 635c and the tapped holes 635t are shifted by P/2 in each arranging direction. The second weight plate 635 and the second cushioning layer 634 are fastened to a top face of the first weight plate 632 by inserting bolts 636 in the through holes 635c and screwing them in the tapped holes 632t formed on the top face of the first weight plate 632.

On the third weight plate 638, only through holes 638c are formed. The third weight plate 638 and the third cushioning layer 637 are fastened to a top face of the second weight plate 635 by inserting bolts 639 in the through holes 638c and screwing them in the tapped holes 635t formed on the top face of the second weight plate 635.

As described above, by stacking three layers of the weight plates and the cushioning layers, the Z-axis counter balancer 630 is made capable of effectively suppressing vibration noises even if a specimen, being a heavy load, are put on the Z-axis counter balancer 630.

Also, by adopting the configuration in which adjacent weight plates (the first weight plate 632 and the second weight plate 635, the second weight plate 635 and the third weight plate 638) are sequentially individually fixed with the bolts instead of fixing the three layers of the weight plates and the cushioning layers to the vibrating table 400 directly with one bolt (co-fastening), transmission of vibration noises from the vibrating table 400 to the third weight plate 638 is effectively suppressed.

The shape of each of the weight plates 612, 632, 635, 638 is not limited to the rectangular flat plate shape, but can be formed in various shapes. For example, by making the shape to correspond to the shape (mass distribution) of the biaxial sliders, it becomes possible to compensate the imbalance with high accuracy.

Also, the thickness of each of the weight plates 632, 635, 638 may be changed in accordance with a mass of the specimen, oscillating conditions or the like. For example, the thicknesses of all the weight plates 632, 635, 638 may be made the same. Also, the thicknesses of the weight plates may be made thicker as the layer goes up, or the intermediate weight plate 635 may be made the thickest.

Also, as materials for each of the weight plates 612, 632, 635, 638, besides typical structure materials such as aluminium alloys or steel, lead, copper, metal foams, resins (including plastics and rubbers), fiber reinforced plastics or the like having vibration absorbing property may be used.

The thickness of each of the cushioning layers 611, 631, 634, 637 is decided within the range of 0.5 mm to 2 mm in accordance with masses of the weight plates, materials and characteristics of the cushioning layers, a size of the oscillating device 1, test conditions or the like. If the cushioning layers are made too thick, the weight plates become prone to resonate and oscillating performances at low frequency ranges degrade. Furthermore, if the cushioning layers are made too thin, enough vibration noise suppressing effect cannot be obtained.

For the cushioning layers 611, 631, 634, 637, sheets of various materials such as various synthetic resins (e.g., plastics such as polyolefin, polyvinyl chloride, polyamide, PEEK (polyether ether ketone), polycarbonate and polytetrafluoroethylene), various elastomers (vulcanized rubbers such as natural rubbers and various synthetic rubbers, thermosetting elastomers such as urethane rubbers and silicone rubbers, and thermoplastic elastomers), silicone gel (low crosslinking density silicone resins), various polymer alloys, fiber reinforced plastics, resin foams, soft metals such as lead, and metal foams or felt (nonwoven fabrics) may be used.

Also, the cushioning layers may be formed by providing gaps between the vibrating table 400 and the weight plates 612, 632 (or between adjacent weight plates 632, 635, 638) and filling the gaps with adhesives or claking materials and curing them.

Also, the Z-axis counter balancer 630 of the present embodiment has the configuration in which three layers of the cushioning layers and the weight plates are alternately laminated, but may have a configuration in which two layers or four or more layers are laminated. Furthermore, the materials and/or the thicknesses of the cushioning layers and/or the weight plates may be changed for each layer.

Next, oscillation uniformity of the oscillating device 1 of the present embodiment will be described. FIGS. 28A, 28B, 29A, 29B, 30A and 30B are graphs showing relative acceleration spectrum characteristics measured at four points on the vibrating table 400 (more precisely, on the Z-axis counter balancer 630). Also, FIG. 31 is a diagram showing monitoring points (acceleration measurement points) on the Z-axis counter balancer 630.

The oscillating device 1 is designed such that a reference point MP0, which is at the center of the top face of the Z-axis counter balancer 630, vibrates in the same acceleration as the indicated value (i.e., a single-point control is executed on the basis of a measured acceleration value at the reference point MP0). It is noted that an oscillating device may be configured to execute a multi-point control in which vibration is controlled on the basis of measurement results of parameters indicating vibration states, such as acceleration, at two or more points among five monitoring points including the reference point MP0 (e.g., on the basis of an average of measured values at a plurality of monitoring points). The oscillation uniformity of the oscillating device 1 was evaluated by measuring relative acceleration levels La in areas at four corners of the Z-axis counter balancer 630 (monitoring points MP1, MP2, MP3, MP4) where it is thought that differences in accelerations from an acceleration at the reference point MP0 are the largest. It is noted that the relative acceleration level La is a relative acceleration level at each of the monitoring points MP1-MP4 relative to the acceleration at the reference point MP0, and is defined by the following Equation 1.

$La = 20 \log a/a_0 \text{[dB]}$ [Expression 1]

where

La represents relative acceleration level at each monitoring point, a represents acceleration at each monitoring point (MP1-MP4), and $a_0$ represents acceleration at reference point MP0.

Also, As shown in FIG. 31, the monitoring points MP1, MP2, MP3, MP4 are set at the centers of four areas at four corners among 16 areas obtained by dividing the top face of the Z-axis counter balancer 630 in a lattice of 4×4.

Also, the evaluation of the oscillation uniformity was carried out in every oscillating directions (X-axis direction, Y-axis direction, Z-axis direction) for each of the case where oscillation is performed using a sine wave and a case where oscillation is performed using a random wave.

Figure 28A:
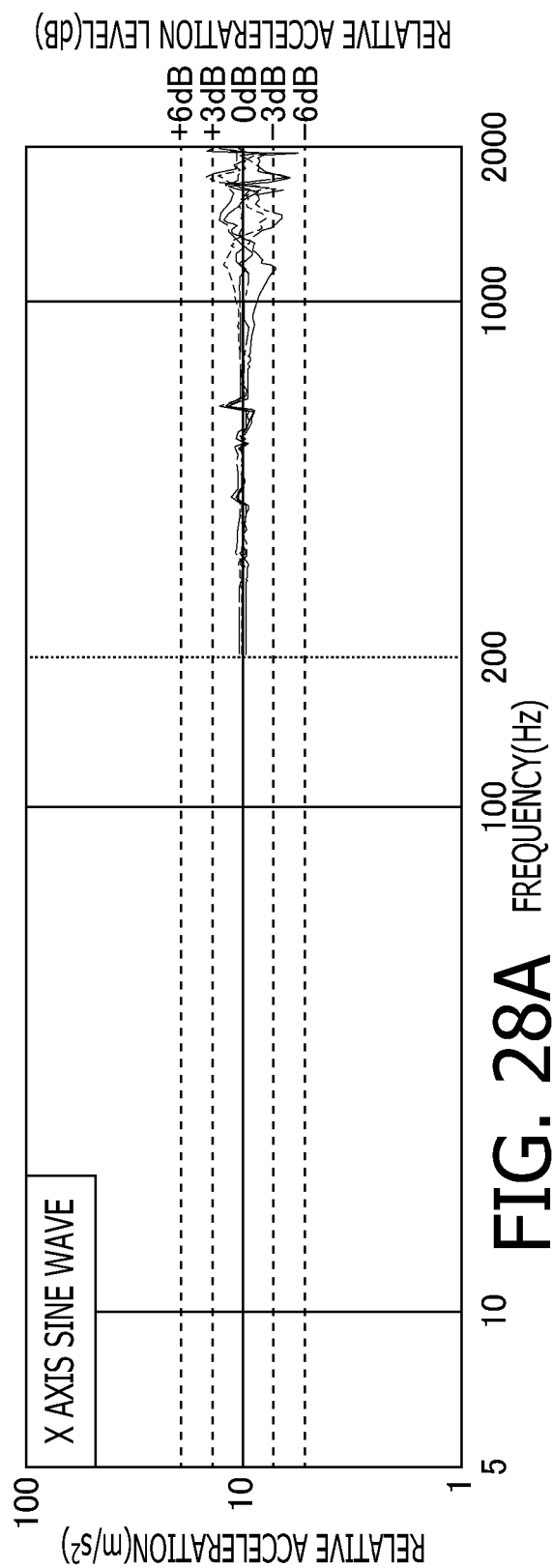
FIG. 28A and FIG. 28B show relative acceleration spectra in the X-axis direction measured at four corners of an upper surface of the vibrating table.
Figure 28B:
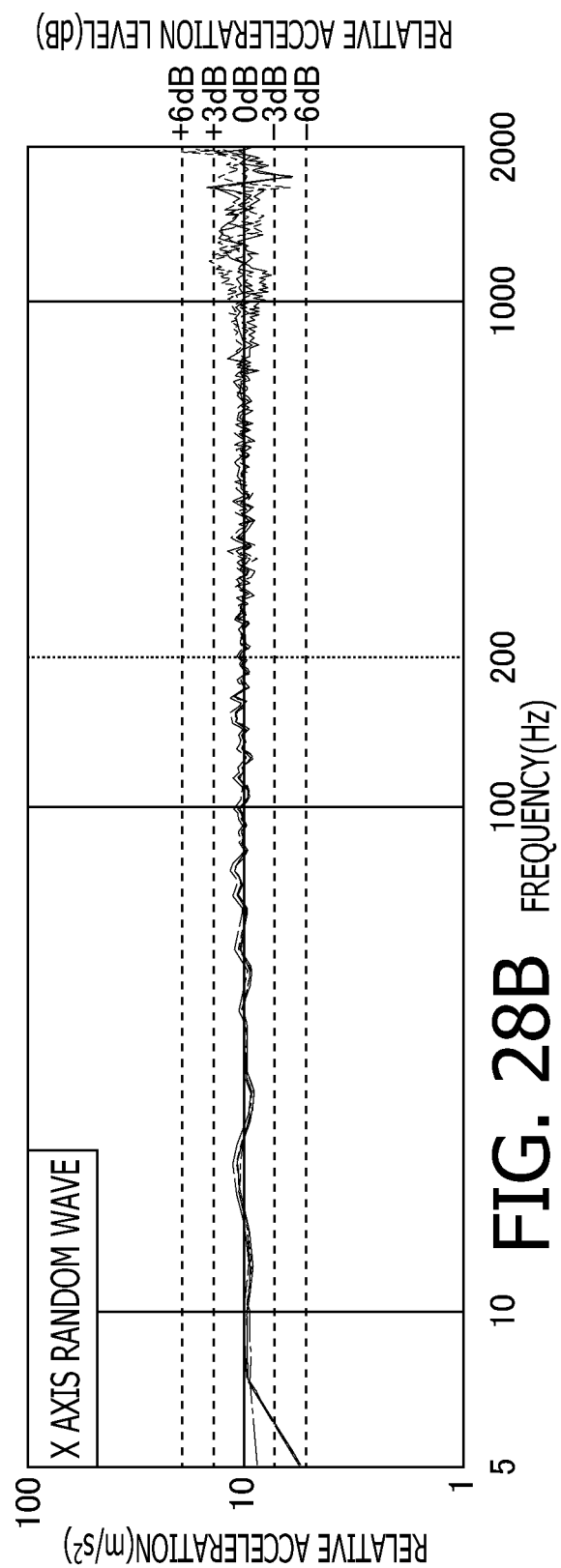
Figure 29A:
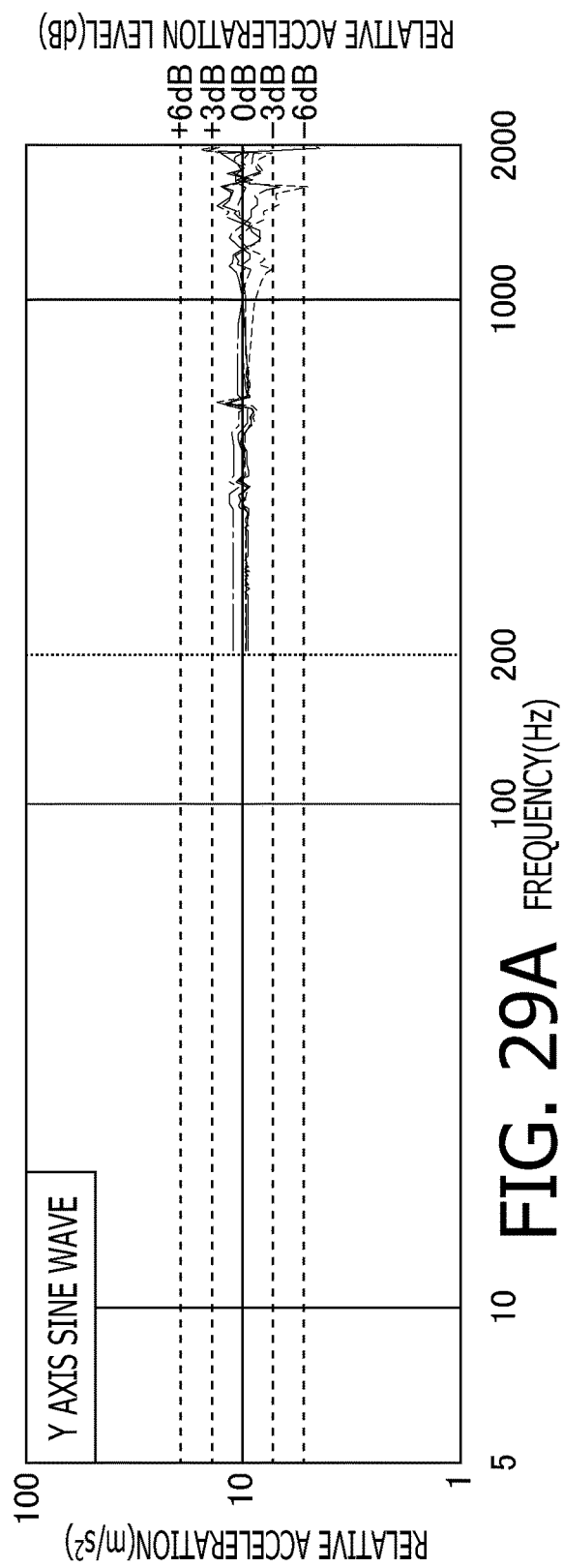
FIG. 29A and FIG. 29B show relative acceleration spectra in the Y-axis direction measured at four corners of an upper surface of the vibrating table.
Figure 29B:
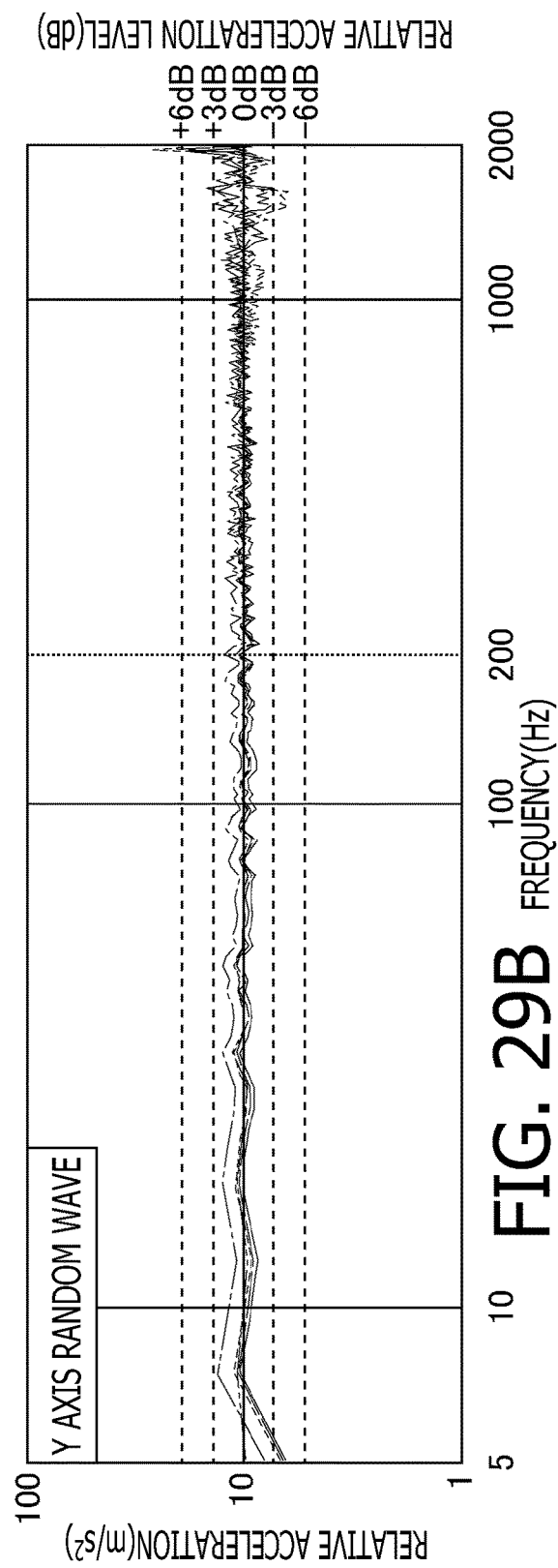
Figure 30A:
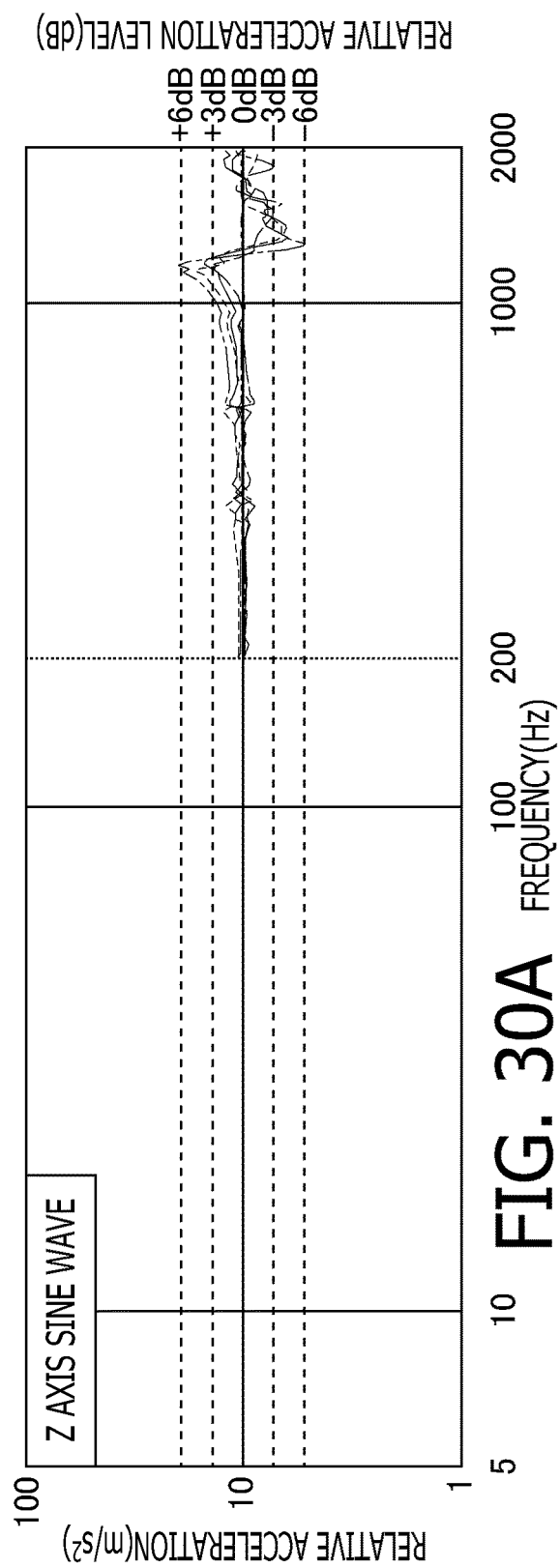
FIG. 30A and FIG. 30B show relative acceleration spectra in the Z-axis direction measured at four corners of an upper surface of the vibrating table.
Figure 30B:
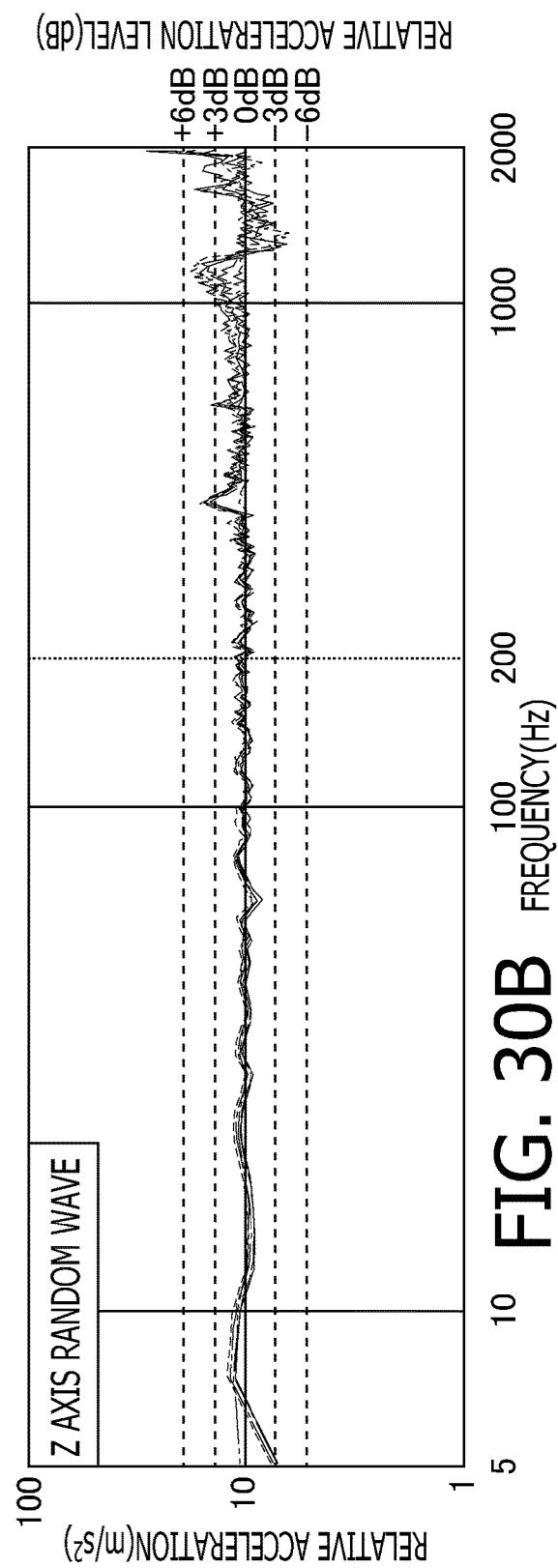
Figure 31:
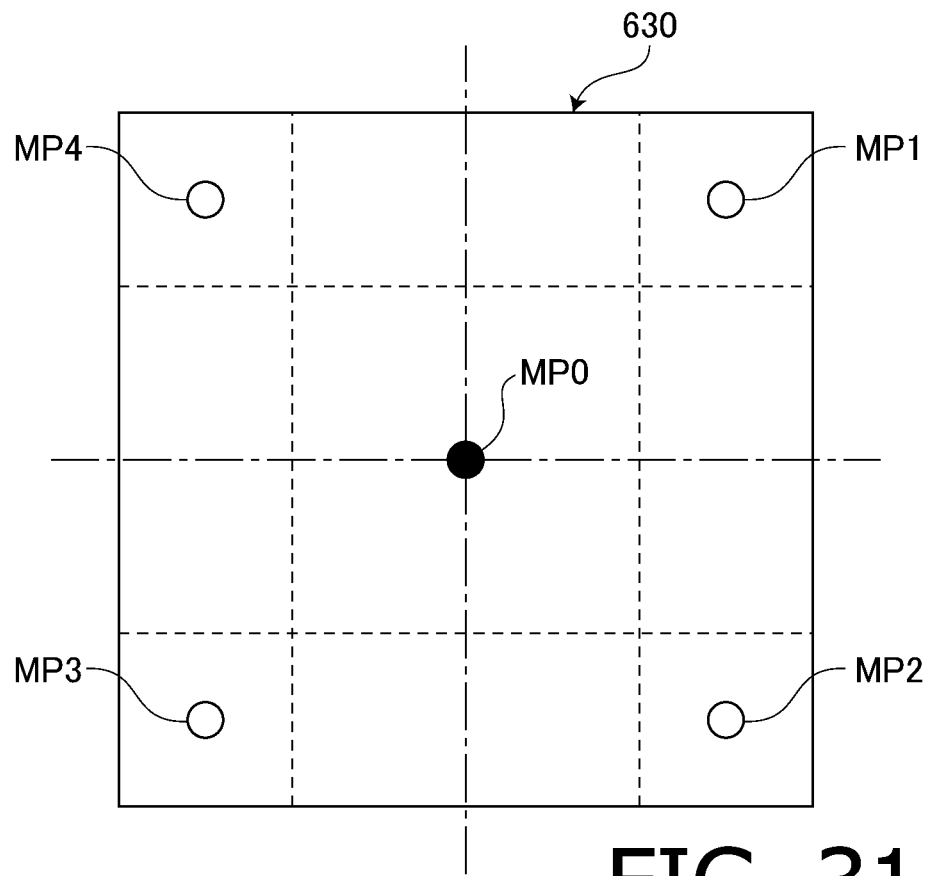
FIG. 31 is a diagram showing acceleration monitoring points on the Z-axis counter balancer.

FIGS. 28A and 28B, FIGS. 29A and 29B, and FIGS. 30A and 30B are graphs showing measurement results of X-axis direction, Y-axis direction and Z-axis direction, respectively. FIGS. 28A, 29A and 30A are measurement results for the case where oscillation was performed using the sine wave, and FIGS. 28B, 29B and 30B are measurement results for the case where oscillation was performed using the random wave. It is noted that the measurement with the sine wave was carried out within the frequency range of 200-2000 Hz, and the measurement with the random wave was carried out within the frequency range of 5-2000 Hz.

As shown in FIGS. 28A, 28B, 29A, 29B, 30A and 30B, in all conditions, in a frequency range equal to or less than 1 kHz, the relative acceleration levels were suppressed to less than ±3 dB. Also, in a frequency range equal to or less than 2 kHz, the relative acceleration levels were suppressed to less than ±6 dB apart from those for some measurement conditions, and the relative acceleration levels were suppressed to less than ±10 dB for all measurement conditions. In a state where the counter balancers are not attached, in a frequency range equal to or less than 2 kHz, the relative acceleration levels exceeded ±10 dB for all measurement conditions, and thus a remarkable improvement in the oscillation uniformity by the attachment of the counter balancers was confirmed.

Figure 32:
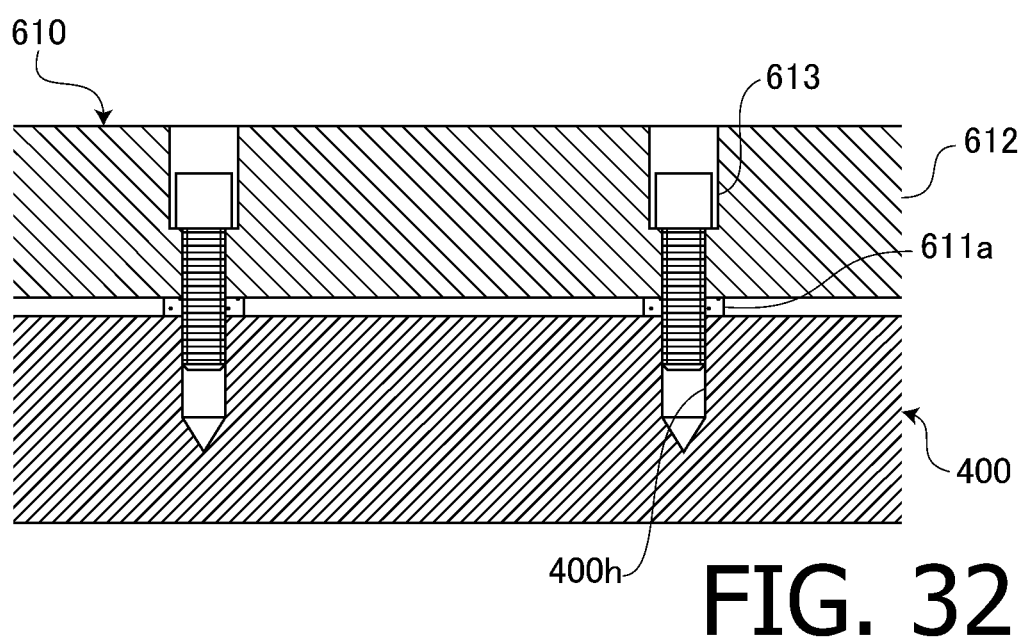
FIG. 32 is a sectional view of a variation of the X-axis counter balancer.

FIG. 32 is a sectional view of the first variation 610A of the X-axis counter balancer 610. In this variation 610A, spacers 611a (e.g., flat washers) are used in place of the cushioning layer 611. Apart from fixing points where the spacers 611a intervene, a gap is provided between the weight plate 612 and the vibrating table 400 and thereby the weight plate 612 is held on the vibrating table 400 in a contactless manner. Therefore, it is made difficult for the vibration to be transmitted between the vibrating table 400 and the weight plate 612. Furthermore, the occurrence of chattering between the vibrating table 400 and the weight plate 612 is also prevented.

For the spacer 611a, in addition to various steels such as stainless steel and various nonferrous metals such as aluminium alloys, copper alloys such as brass, and titanium alloys, the above-mentioned materials that can be used for the cushioning layer 611 can be used.

Also, the spacers 611a may be formed integrally with the vibrating table 400 or the weight plate 612 as protruding portions in the form of bosses. Furthermore, a filler (e.g., silicone resin) may be filled in the gap between the vibrating table 400 and the weight plate 612.

Also, one or more of the cushioning layers 631, 634, 637 of the Z-axis counter balancer 630 may be changed to the spacers 611a.

Figure 33B:
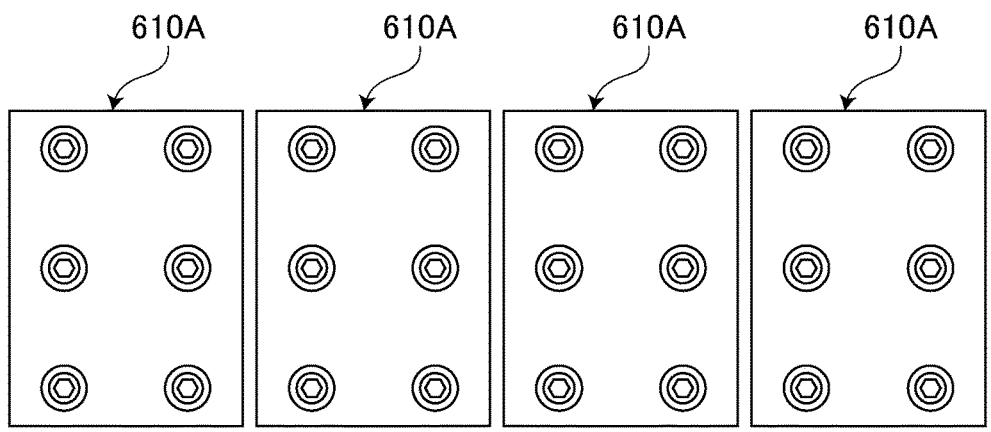
Figure 33C:
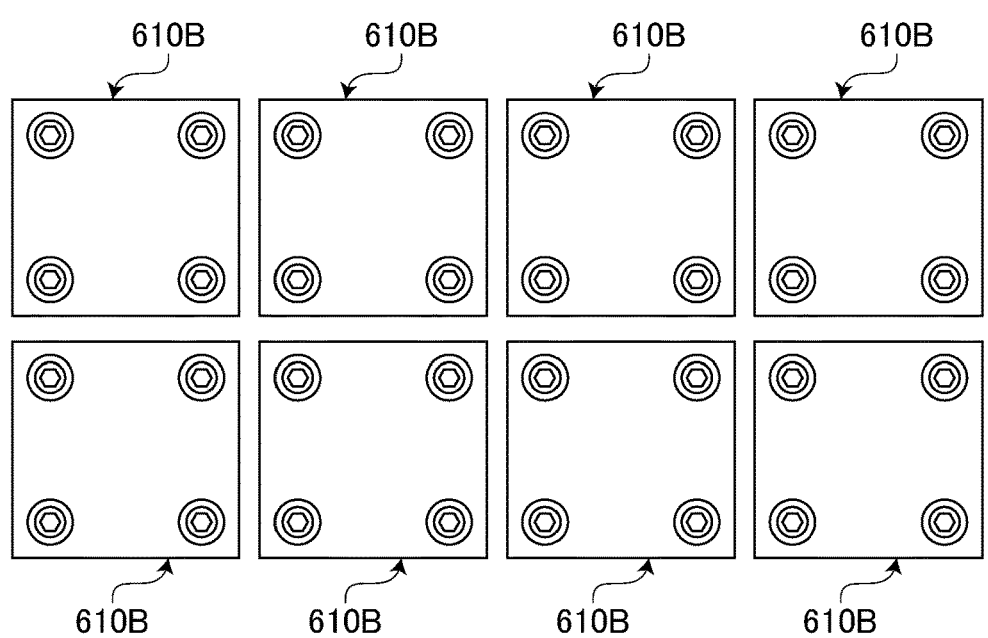

FIGS. 33A, 33B and 33C are external views of the X-axis counter balancer. FIG. 33A shows the X-axis counter balancer 610 of the first embodiment, and FIG. 33B and FIG. 33C show the second variation 610B and the third variation 610C, respectively. The X-axis counter balancer 610 of the first embodiment is integrally formed from one weight plate 612 (and one cushioning layer 611). In contrast, in the second variation 610B shown in FIG. 33B, the weight plate 612 and the cushioning layer 611 are divided into four pieces in the length direction (right-left direction in the drawing). Furthermore, in the third variation 610C shown in FIG. 33C, the weight plate 612 and the cushioning layer 611 are further dived into two pieces in the width direction (up-down direction in the drawing) and thus are divided into 8 pieces in total. By dividing the X-axis counter balancer 610 into small elements, the resonance frequency increases and thereby the occurrence of vibration noises in the test frequency range is reduced. It is noted that the configuration of the first variation 610A may be applied to the second variation 610B and the third variation 610C.

Also, in the present embodiment, the X-axis counter balancer 610, the Y-axis counter balancer 620 and the Z-axis counter balancer 630 are all attached to the outer surface of the vibrating table 400, but one or more of them may be attached to the inside of the vibrating table 400.

Figure 54:
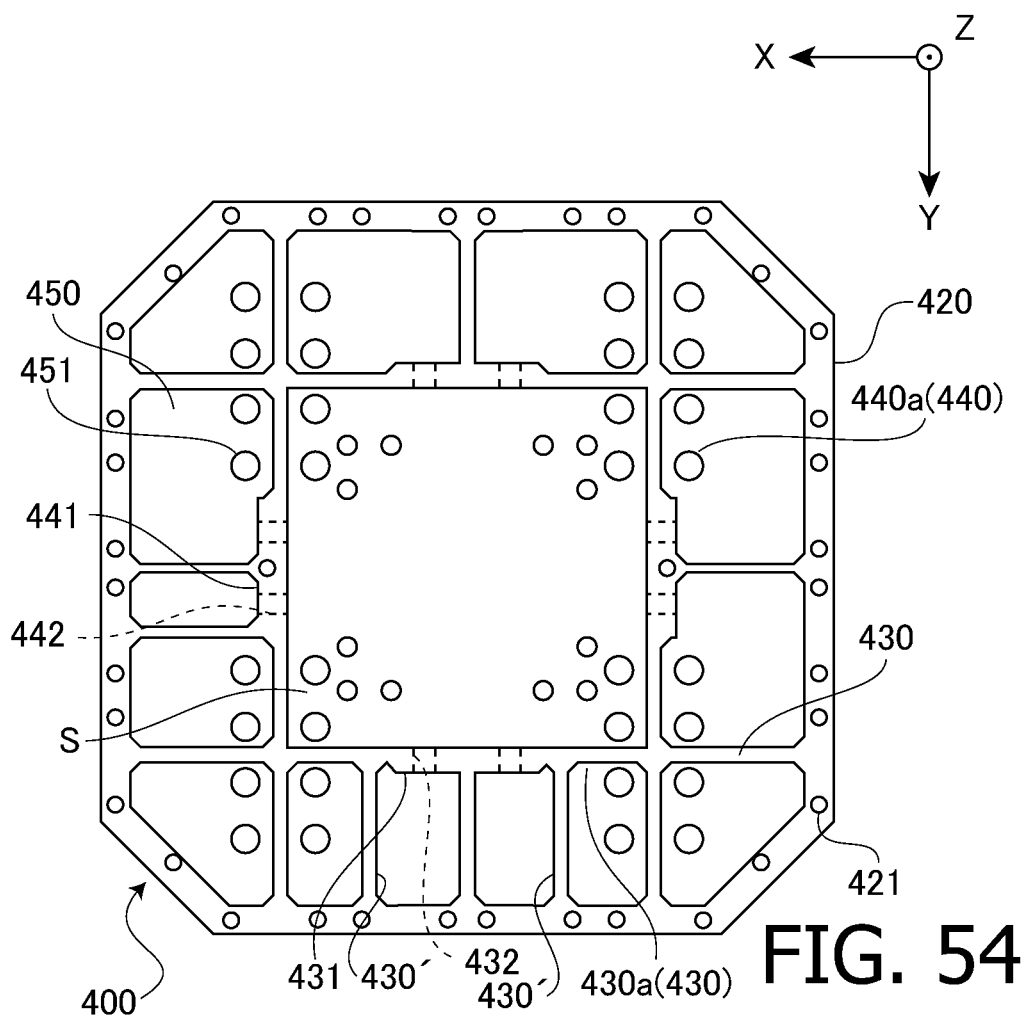
FIG. 54 is a plan view of the vibrating table to which an initial imbalance is provided.
Figure 55:
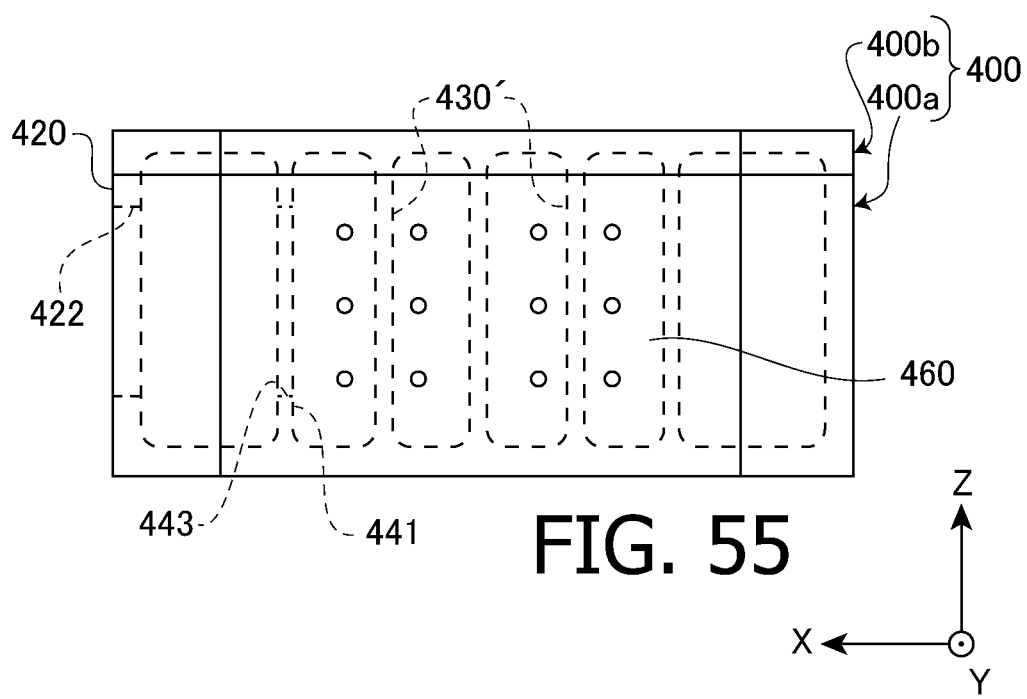
FIG. 55 is a front view of the vibrating table to which an initial imbalance is provided.

Also, in the present embodiment, the vibrating table 400 itself does not have imbalance, but an initial imbalance may be provided to the vibrating table 400 in advance such that the vibrating table 400 is balanced in the state where the biaxial sliders are attached (i.e., the center of gravity of the oscillated portion coincides with the center of the outer shape of the vibrating table). The initial imbalance can be provided by, for example, making thicknesses of the box-shaped vibrating table and/or arrangements of reinforcing ribs inside the vibrating table uneven (See FIGS. 54 and 55. In the vibrating table 400 shown in FIGS. 54 and 55, additional ribs 430' are added to make the arrangements of reinforcing ribs uneven.).

Next, configurations for attaching the fixing parts of the oscillating units to the device base 500 will be described.

As shown in FIGS. 1-3 and FIGS. 5-7, the fixing part 310 of the Z-axis oscillating unit 300 is attached to a top face of the device base 500 via a pair of supporting units 350 (also referred to as fixing part support mechanisms, floating mechanisms or elastic support mechanisms) arranged on both sides of the Z-axis oscillating unit 300 in the Y-axis direction.

As shown in FIG. 5 and FIG. 7, each supporting unit 350 includes a movable block 358, a pair of angle plates (fixing blocks) 352 and a pair of linear guides 354. The movable block 358 is a supporting member fixed on a side face of the fixing part 310 of the Z-axis oscillating unit 300, and has portions 358*a*, 358*b* and 358*c*. The angle plates 352 of the pair are arranged to respectively oppose both end faces of the movable block 358 in the X-axis direction, and are fixed on the top face of the device base 500. Both ends of the movable block 358 in the X-axis direction and the respective angle plates 352 are respectively coupled slidably in the Z-axis direction by the linear guides 354.

The linear guide 354 includes a rail 354*a* and a carriage 354*b* which engages with the rail 354*a*. On each of both end faces of the movable block 358 in the X-axis direction, the rail 354*a* is attached. Also, to the angle plate 352, the carriage 354*b* which engages with the opposing rail 354*a* is attached. Furthermore, between the movable block 358 and the device base 500, a pair of air springs 356 is placed while being arranged in the X-axis direction, and the movable block 358 is supported by the device base 500 via the pair of air springs 356.

Since, as described above, the fixing part 310 of the Z-axis oscillating unit 300 is elastically supported with respect to the device base 500 in the driving direction (Z-axis direction) by the supporting unit 350 including the linear guides 354 and the air springs 356, strong reaction forces (oscillating forces) acting on the fixing part 310 in the Z-axis direction during the driving of the Z-axis oscillating unit 300 are not directly transmitted to the device base 500, but high frequency components are especially largely attenuated by the air springs 356. Therefore, vibration noises transmitted to the vibrating table 400 from the Z-axis oscillating unit 300 via the device base 500 and the other oscillating units 100, 200 are largely reduced.

As shown in FIGS. 20-21, the fixing part 110 of the horizontal actuator 100A is attached on the top face of the device base 500 via a pair of supporting units 150 arranged at both sides of the X-axis oscillating unit 100 in the Y-axis direction. Each of the supporting units 150 includes an inverse T-shaped fixing block 152 fixed on the top face of the device base 500, a substantially rectangular movable block 158 attached to a side face of the fixing part 110 of the X-axis oscillating unit 100, a linear guide 154 that couples the fixing block 152 and the movable block 158 slidably in the X-axis direction, and a spring mechanism 156 that elastically couples the movable block 158 and the fixing block 152.

The linear guide 154 includes a rail 154*a* extending in the X-axis direction and attached on a top face of the fixing block 152, and a pair of carriages 154*b* attached on a lower face of the movable block 158 and that engage with the rail 154*a*. Also, on a side face of the fixing block 152 in the X-axis negative direction side, an L-shaped arm 155 extending upwardly is fixed. The movable block 158 and the arm 155 are coupled by the spring mechanism 156.

Figure 24:
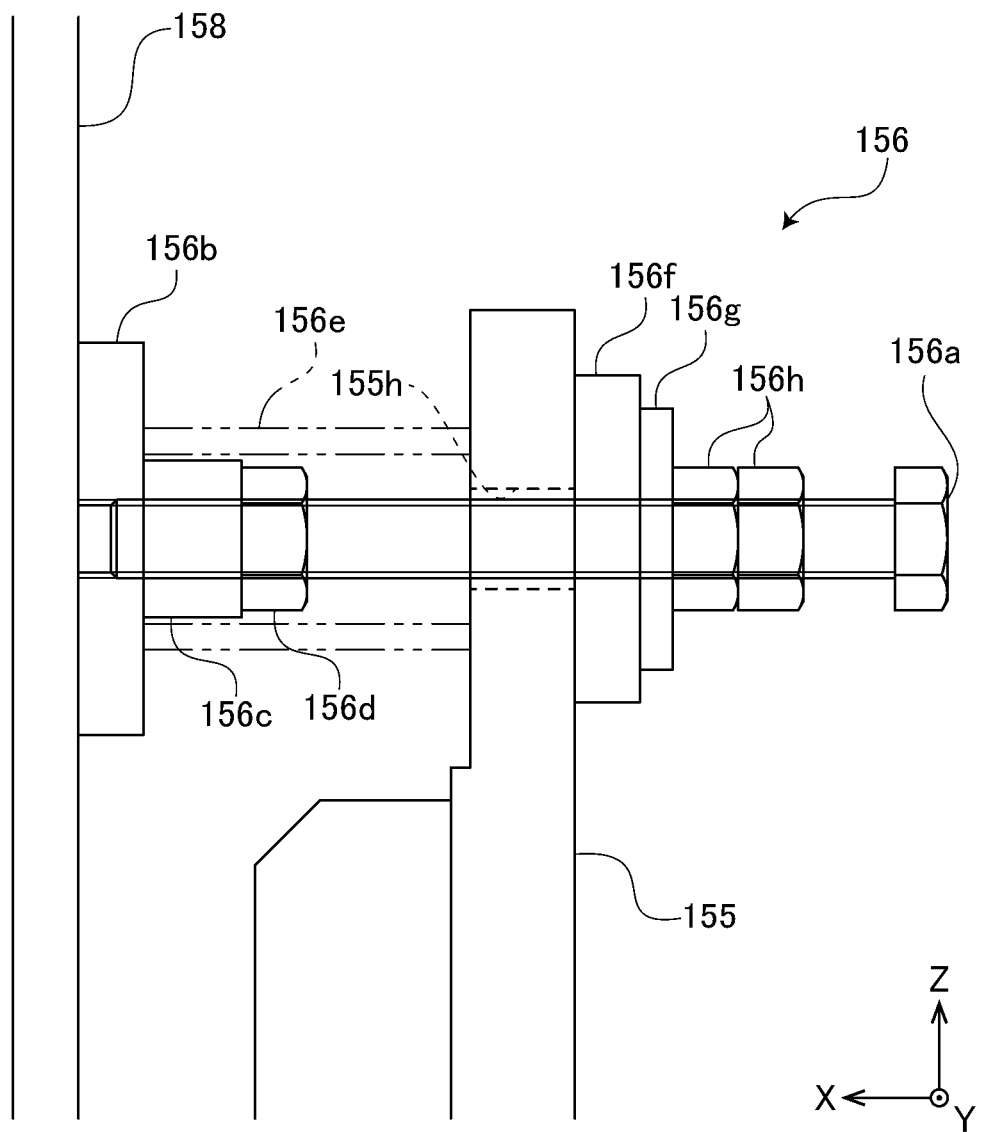
FIG. 24 is an enlarged side view around a spring mechanism of a horizontal drive electrodynamic actuator according to the first embodiment of a supporting unit.

FIG. 24 is an enlarged side view around the spring mechanism 156 of the supporting unit 150. The spring mechanism 156 includes a bolt 156*a*, a fixing plate 156*b*, a ring 156*c*, a nut 156*d*, a anti-vibration spring 156*e*, a cushion plate 156*f*, a washer 156*g* and nuts 156*h*. On a top portion of the arm 155, a through hole 155*h* extending in the X-axis direction is provided, and the bolt 156*a* is inserted in this through hole 155*h*. A tip of the bolt 156*a* is fixed to the movable block 158 via the fixing plate 156*b*. Also, a tip portion of the bolt 156*a* runs through the tubular ring 156*c*.

The ring 156*c* is fixed by nipping between the nut 156*d*, screwed to the bolt 156*a*, and the fixing plate 156*b*. Also, a tip side of the bolt 156*a* is inserted in a hollow part of the tubular anti-vibration spring 156*e*. The anti-vibration spring 156*e* is retained by being nipped between the fixing plate 156*b* and the arm 155. Also, the ring 156*c* is fitted at an end side of the hollow part of the anti-vibration spring 156*e*.

It is noted that the anti-vibration spring 156*e* is a tubular member in which a compression coil spring made of steel is embedded in a viscoelastic body (damper) such as acrylic resins. A simple coil spring may be used in place of the anti-vibration spring 156*e*. Also, a separate damper (e.g., anti-vibration rubber or oil damper) may be provided serially or parallelly with the coil spring.

At a head side of the bolt 156*a*, two nuts 156*h* are attached. Also, the bolt 156*a* is inserted in through holes respectively provided to the cushion plate 156*f* and the washer 156*g*. The cushion plate 156*f* is retained by being nipped between the washer 156*g* and the arm 155 supported by the two nuts 156*h*. The cushion plate 156*f* is, for example, formed of anti-vibration rubbers or resins such as polyurethane (i.e., rubbery elastic bodies and/or viscoelastic bodies).

A preload (a compressing load in the X-axis direction) is applied to the anti-vibration spring 156e and the cushion plate 156f by the tightening of the bolt 156a, and the horizontal actuator 100A fixed to the movable block 158 is retained at a neutral position where restoring forces of the anti-vibration spring 156e and the cushion plate 156f balance. That is, the spring mechanism 156 functions as a neutral spring mechanism as well.

When the X-axis oscillating unit 100 oscillates the vibrating table 400 in the X-axis direction, a reaction force is transmitted to the movable blocks 158 of the supporting units 150, and is further transmitted to the fixing blocks 152 via the spring mechanisms 156 (anti-vibration springs 156e, cushion plates 156f) and the arms 155. Since the anti-vibration springs 156e and the cushion plates 156f attenuate vibrations with frequencies higher than their low resonance frequencies, transmission of vibration noises from the X-axis oscillating unit 100 to the device base 500 is suppressed by the supporting units 150.

It is noted that a reaction force acting on the supporting unit 150 in the X-axis positive direction is smaller than a reaction force in the X-axis negative direction. Therefore, in the present embodiment, a small and inexpensive cushion plate 156f is used as an elastic component that receives the reaction force in the X-axis positive direction. If the reaction force in the X-axis positive direction becomes large, an anti-vibration spring or a coil spring may be used in place of the cushion plate 156f. Also, if the reaction forces in both directions are small, a cushion plate may be used in place of the anti-vibration spring 156e.

Due to the above configuration, the fixing part 110 of the X-axis oscillating unit is supported softly and elastically with respect to the device base 500 in the driving direction (X-axis direction) by the supporting units 150 each including the linear guide 154 and the spring mechanism 156, and thus strong reaction forces (oscillating forces) in the X-axis direction that acts on the fixing part 110 during the driving of the X-axis oscillating unit 100 are not transmitted directly to the device base 500 but especially high frequency components of the reaction forces are attenuated by the spring mechanisms 156, and the reaction forces are then transmitted to the device base 500. Therefore, vibration noises that are transmitted from the X-axis oscillating unit 100 to the vibrating table 400 are reduced.

The Y-axis oscillating unit 200 also includes the horizontal actuator 200A that has the same configuration as the horizontal actuator 100A. The fixing part 210 of the horizontal actuator 200A is also supported elastically on the device base 500 in the Y-axis direction by a pair of supporting units 250 (FIG. 2). Since the supporting unit 250 has the same configuration as the supporting unit 150 of the X-axis oscillating unit 100, redundant detailed descriptions thereof are herein omitted.

As described above, by adopting a configuration for elastically supporting each of the oscillating units 100, 200, 300 with the supporting units 150, 250, 350 including elastic components (air springs or spring mechanisms), transmissions of especially high frequency components of vibrations (noises) between the oscillating units via the device base 500 are suppressed, thereby making it possible to oscillate with higher accuracy.

It is noted that, on the supporting unit 350 that supports the Z-axis oscillating unit 300, in addition to the dynamic load for oscillating the specimen and the vibrating table 400, weights (static loads) of the Z-axis oscillating unit 300, the vibrating table 400 and the specimen act. Therefore, the air spring 356 that is relatively small and capable of supporting a large load is adopted. On the other hand, since the large static load does not act on the supporting unit 150 that supports the X-axis oscillating unit 100 and the supporting unit 250 that supports the Y-axis oscillating unit 200, a coil spring that is relatively small and has a simple configuration is used.

In the present embodiment, the rotational vibration of the vibrating table 400 is suppressed by the use of the low waving eight-streak linear guide as the biaxial sliders (YZ slider 160, ZX slider 260, XY slider 360) which greatly affect the oscillating performance, and, as a result, uniformity of the vibrating state (acceleration) on the vibrating table 400 is remarkably improved. Conventionally, oscillating performance specifications could only be prescribed at the reference point (the center of the top face of the vibrating table). For example, in a conventionally known oscillating device, oscillation with sufficiently high accuracy is possible at a reference point on the vibrating table (e.g., at the center of the top face of the vibrating table), but since there are variations in vibrating states depending on locations on the vibrating table, oscillating accuracies at positions other than the reference point are not sufficient. However, due to this improvement in the uniformity, it is made possible to prescribe the oscillating performance specifications within a wide area on the vibrating table.

Furthermore, by positioning the center of gravity of the oscillated portion (including the vibrating table and portions of the biaxial sliders) at the center of the vibrating table by providing the counter balancers (or by creating a predetermined imbalance on the vibrating table in advance), it is made possible to lower the variations in vibrations (accelerations) on the vibrating table to equal to or less than 3 dB within the frequency range of up to 1 kHz, and equal to or less than about 6 dB within the frequency range of up to 2 kHz.

<Variation of XY Slider>

Figure 34:
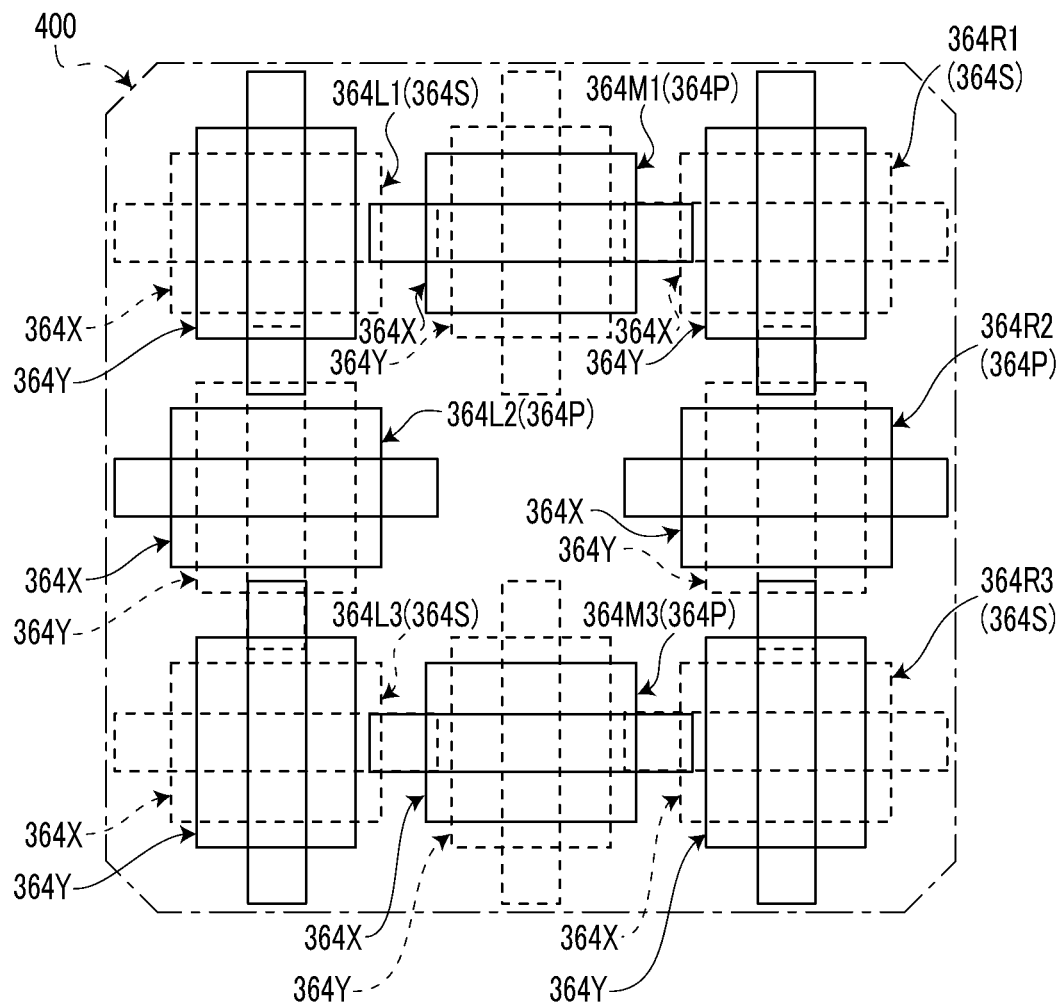
FIG. 34 is a plan view of a variation of the XY slider.

FIG. 34 is a plan view illustrating a configuration of a variation 360A of the XY slider. The present variation is an XY slider in which the second orientation cross guide 364M2 arranged at the center is removed from the XY slider 360 of the above-described first embodiment (FIG. 12). In the XY slider 360A of the present variation, the number of the first orientation cross guides 364P (cross guides 364M1, 364L2, 364R2, 364M3) of which the X-axis linear guides 364X are attached to the vibrating table 400 and the number of the second orientation cross guides 364S (cross guides 364L1, 364R1, 364L3, 364R3) of which the Y-axis linear guides 364Y are attached to the vibrating table 400 are the same.

Figure 35A:
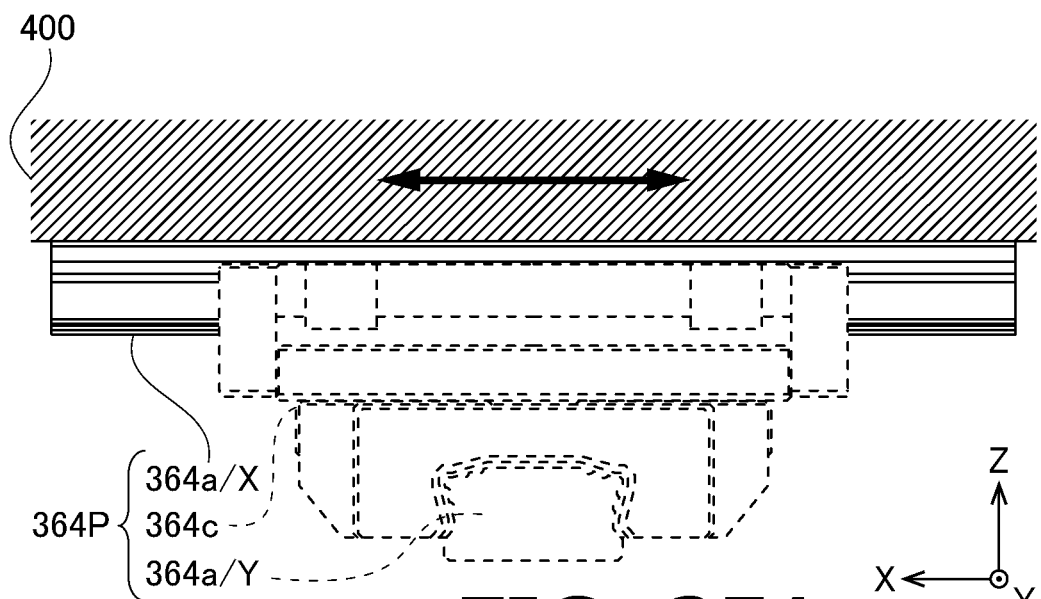
FIG. 35A and FIG. 35B are diagrams illustrating behaviors of the cross guide.

Now, differences in behaviors of the cross guide 364 depending on oscillating directions will be described. FIG. 35A is a front view of the first orientation cross guide 364P, and FIG. 35B is a left side view thereof.

As shown in FIG. 35A, regarding the first orientation cross guide 364P of which the X-axis linear guide 364X (X-axis rail 364a/X) is attached to the vibrating table 400, when the vibrating table 400 is oscillated in the X-axis direction, only the X-axis rail 364a/X (solid lines) fixed to the vibrating table 400 is oscillated in the X-axis direction along with the vibrating table 400, and the cross carriage 364c and the Y-axis rail 364a/Y (broken lines) are not oscillated in the X-axis direction.

Figure 35B:
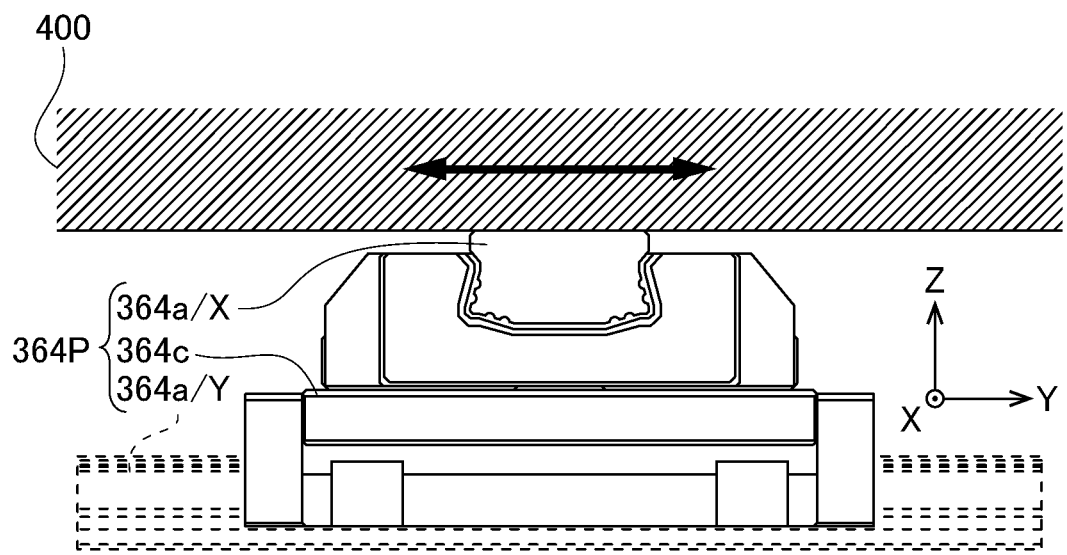

On the other hand, as shown in FIG. 35B, regarding the first orientation cross guide 364P, when the vibrating table 400 is oscillated in the Y-axis direction, the X-axis rail 364a/X and the cross carriage 364c (solid lines) are oscillated in the Y-axis direction along with the vibrating table 400, and only the Y-axis rail 364a/Y (broken lines) is not oscillated in the Y-axis direction.

Also, regarding the second orientation cross guide 364S of which the Y-axis linear guide 364Y (Y-axis rail 364a/Y) is attached to the vibrating table 400, contrary to the first orientation cross guide 364P described above, when the vibrating table 400 is oscillated in the X-axis direction, the Y-axis rail 364a/Y and the cross carriage 364c (solid lines) are oscillated in the X-axis direction along with the vibrating table 400, and only the X-axis rail 364a/X (broken lines) is not oscillated in the X-axis direction. Also, when the vibrating table 400 is oscillated in the Y-axis direction, only the Y-axis rail 364a/Y (solid lines) is oscillated in the Y-axis direction along with the vibrating table 400, and the cross carriage 364c and the X-axis rail 364a/X (broken lines) are not oscillated in the Y-axis direction.

Table 1 is a table in which relationships between the attaching orientations of the cross guide 364, the oscillating directions of the vibrating table, and oscillated parts of the cross guide 364 (components of the cross guide 364 which are oscillated along with the vibrating table 400) described above are organized.

TABLE 1

| cross guide attaching orientation | oscillated parts of cross guide | |
|---|---|---|
| | X-axis direction oscillation | Y-axis direction oscillation |
| first orientation cross guide | X-axis rail | X-axis rail Cross carriage |
| second orientation cross guide | Y-axis rail cross carriage | Y-axis rail |

As described above, portions of the cross guide 364 which are oscillated along with the vibrating table 400 differ depending on the oscillating direction and the attaching orientation. For example, when the vibrating table 400 is oscillated in the X-axis direction, as described above, regarding the first orientation cross guide 364P, only the X-axis rail 364a/X is oscillated in the X-axis direction, but regarding the second orientation cross guide 364S, the Y-axis rail 364a/Y and the cross carriage 364c are oscillated in the X-axis direction. Furthermore, the relationships between the oscillating direction and the number of components of the oscillated parts of the cross guide 364 (i.e., masses of the oscillated parts) for the first orientation cross guide 364P and for the second orientation cross guide 364S are opposite.

As shown in Table 1, if the XY slider is configured only with the cross guide 364 of one of the attaching orientations (e.g., the first orientation cross guide 364P), the masses of the oscillated parts of the cross guide 364 change depending on whether the vibrating table 400 is oscillated in the X-axis direction or in the Y-axis direction. Due to this configuration, directionality occurs in the oscillating performance of the oscillating device 1. However, by providing the same number (a plurality of pairs) of the first orientation cross guides 364P and the second orientation cross guides 364S, the sum of the masses of the oscillated parts of the cross guide 364 becomes constant regardless of whether the vibrating table 400 is oscillated in the X-axis direction or the Y-axis direction, and therefore the directionality in the oscillating performance can be reduced.

Therefore, the XY slider 360A of the present variation which is configured with four pairs of the first orientation cross guide 364P and the second orientation cross guide 364S has less directionality as compared to the XY slider 360 of the first embodiment in which the number of the second orientation cross guide 364S is greater than the number of the first orientation cross guide 364P by one, and thereby enables uniform oscillation.

Also, since the total number of the cross guides 364 included in the XY slider 360A is fewer than that in the XY slider 360 of the first embodiment, the oscillated portion is reduced in weight, thereby making it possible to oscillate with higher frequencies.

Also, since the directionalities in the behaviors and the biases in the mass distributions of the crossguides 364P, 364S are effectively canceled by arranging the crossguides 364P, 364S in two attaching orientations alternately (uniformly) in each direction, it becomes possible to oscillate every portion of the vibrating table 400 more uniformly.

Next, the vibration table 400 will be described.

As shown in FIGS. 1-3, substantially the entire surface of the side face of the vibrating table 400 on the X-axis negative direction side (right side face in FIG. 1) is substantially evenly supported by the slide coupling mechanism 160 (specifically, a plurality of the linear guideways in which the slide coupling mechanism 160 includes) and the movable part 120 of the X-axis oscillating unit 100. By this configuration, it is configured such that the entire side face of the vibrating table 400 on the X-axis negative direction side can receive substantially even oscillating force from the X-axis oscillating unit 100.

Similarly, substantially the entire surface of the side face of the vibrating table 400 on the Y-axis negative direction side (left side face in FIG. 2) is substantially evenly supported by the slide coupling mechanism 260 and the movable part 220 of the Y-axis oscillating unit 200. By this configuration, it is configured such that the entire side face of the vibrating table 400 on the Y-axis negative direction side can receive substantially even oscillating force from the Y-axis oscillating unit 200.

Also, as shown in FIG. 5 and FIG. 6, substantially the entire surface of the lower face of the vibrating table 400 is substantially evenly supported by the slide coupling mechanism 360 (specifically, a plurality of the linear guideways which the slide coupling mechanism 360 include) and the movable part 320 of the Z-axis oscillating unit 300. By this configuration, it is configured such that the entire lower face of the vibrating table 400 can receive substantially even oscillating force from the Z-axis oscillating unit 300.

Therefore, if the center of gravity of the entire oscillated portion (the oscillated object and portions of the oscillating device 1, such as the vibrating table 400, which are oscillated along with the oscillated object) is inside the vibrating table 400, the entire oscillated portion can be oscillated without applying moments of forces of high magnitudes to the entire oscillated portion. Due to this configuration, occurrence of unnecessary vibration components (vibration noises) caused by moments of forces applied to the entire oscillated portion are reduced, thereby making it possible to oscillate with higher accuracy.

Figure 36:
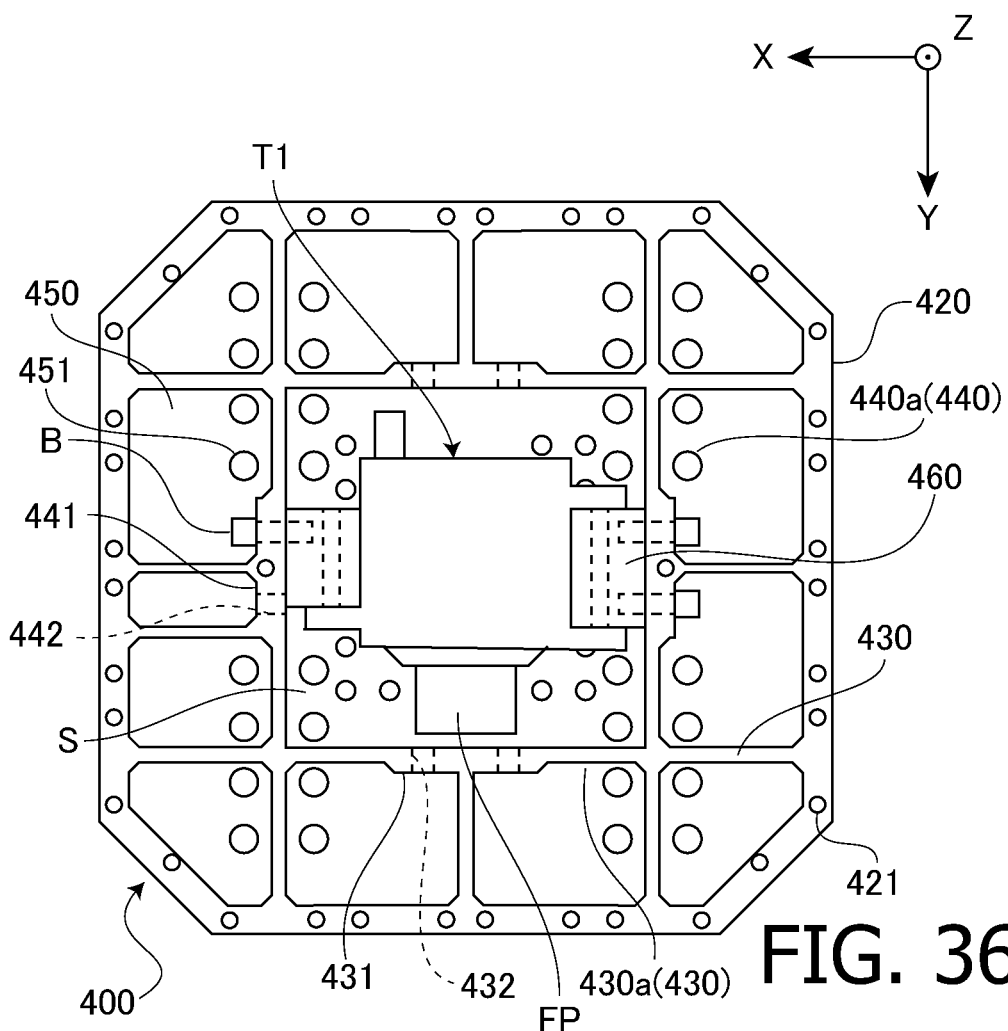
FIG. 36 is a plan view of the vibrating table according to the first embodiment of the present disclosure.
Figure 37:
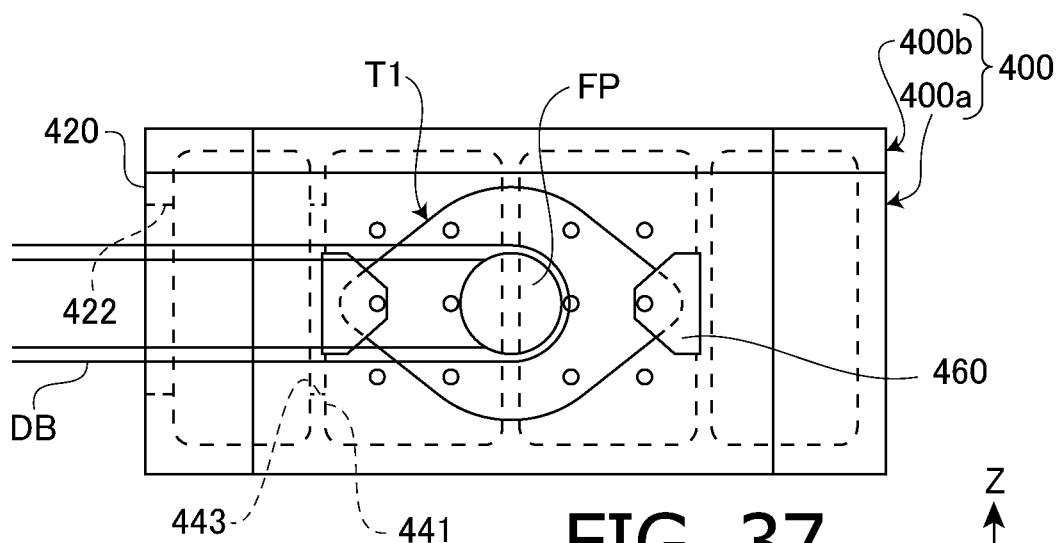
FIG. 37 is a front view of the vibrating table according to the first embodiment of the present disclosure.
Figure 38:
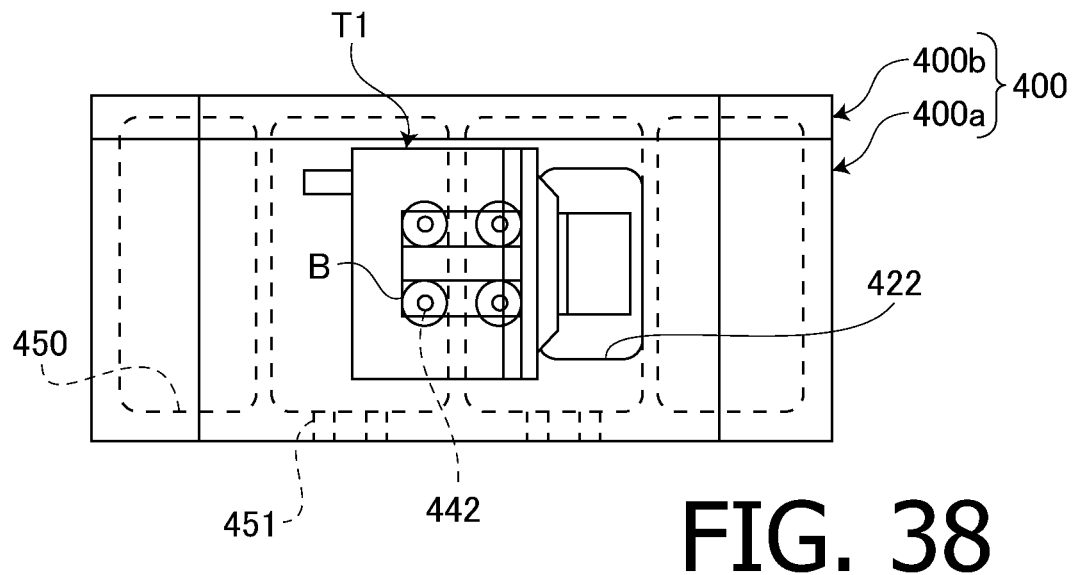
FIG. 38 is a left side view of the vibrating table according to the first embodiment of the present disclosure.

FIG. 36, FIG. 37 and FIG. 38 are a plan view, a front view and a left side view, respectively, of the vibrating table 400 according to an embodiment of the present disclosure in a state where an oscillated object T1 is attached. The vibrating table 400 of the present embodiment is configured such that an oscillation of an oscillated object can be performed in a state where the oscillated object is accommodated inside the vibrating table 400.

As showing in FIG. 37 and FIG. 38, the vibrating table 400 includes a box part 400a having an opening on its top face, and a lid part 400b which closes the opening of the box part 400a. It is noted that FIG. 36 shows a state where the lid part 400b is removed. The lid part 400b is detachably attached to the box part 400a by bolts (not shown) which fit female screws 421 provided on a top face of the box part 400a (more specifically, a frame part 420 which will be described later). The vibrating table 400 is configured such that its center of gravity is positioned substantially at the center of its outer shape.

The box part 400a has a bottom plate 450, and a frame part (wall part) 420 which vertically protrudes upward from a peripheral edge of the bottom plate 450. As shown in FIG. 36, the bottom plate 450 is formed in a shape in which four corners of a square are cut off.

Inside the frame part 420, a plurality of intermediate plates 430, 440 parallel to respective wall surfaces of the frame part 420 (apart from the cut off portions) are provided in a lattice. The intermediate plates 430 extend in the Y-axis direction (right-left direction in FIG. 36), and the intermediate plates 440 extend in the X-axis direction (up-down direction in FIG. 36). The intermediate plates 430, 440 are joint to the bottom plate 450 and the frame part 420 at one end (or both ends) thereof.

At the central portion of the vibrating table 400, an accommodating space S, which is a hollow part in which no intermediate plate (wall part) 430, 440 is formed, is provided. An oscillated object is accommodated in this accommodating space S.

At the central portions in the extending directions (horizontal directions) of the intermediate plates 430a, 440a which separate the accommodating space S, thick plate parts 431, 441, which are thicker than the other portions, are respectively formed. To the thick plate parts 431, 441, through holes 432, 442, in which bolts B for fixing the oscillated object are inserted, are respectively formed. In FIGS. 36-38, attachment parts 460 for attaching the oscillated object T1 to the vibrating table 400 are fixed to the intermediate plates 440a on both sides in the right-left direction by the bolts B inserted in the through holes 432.

Also, the oscillated object T1 is placed substantially at the center of the accommodating space S. Therefore, the center of gravity of the oscillated object T1 is positioned near the center of the vibrating table 400.

The vibrating table 400 of the present embodiment is configured to be able to oscillate an oscillated object having a rotating shaft (e.g., power transmission devices such as engines, motors and differential gears) in a state where the rotating shaft is rotated. The oscillated object T1 (and an oscillated object T2 which will be described later) of the present embodiment is a generator for hybrid cars.

As shown in FIG. 37 and FIG. 38, on the left side face of the frame part 420, an opening 422 for inserting a drive belt DB for transmitting power is formed. Also, on the intermediate plate 440 at the left side, an opening 443 for inserting the drive belt DB is formed at a position opposing the opening 422. In the present embodiment, the drive belt DB is wound around a drive pulley (not shown) of an external driving device and a driven pulley FP attached to the oscillated object T1, and thus it is made possible to oscillate the oscillated object T1 while rotating the oscillated object T1 by applying a driving force to the oscillated object T1 inside the vibrating table 400 from outside during oscillation.

It is noted that, in place of the drive belt DB (or in addition to the drive belt DB), one or more long objects of other types for connecting the oscillated object T1 with one or more external devices, such as pipes for supplying hydraulic pressure or air pressure to the oscillated object T1, electrical power cables for supplying electrical power, and communication cables for communicably connecting an external information processing device and the oscillated object (or sensors or measuring devices attached to the oscillated object), can be inserted in the openings 422, 443. Also, one or more openings for inserting these pipes and/or cables may be provided to the vibrating table 400 in addition to the openings 422, 443.

Also, if, for example, the oscillated object is an engine, the oscillated object and an external measuring device can be coupled by the drive belt DB, and power that the oscillated object generates can be measured while oscillating the oscillated object.

Also, to the bottom plate 450 of the vibrating table 400, a plurality of female screws 451 for fixing the oscillated object are provided.

Figure 39:
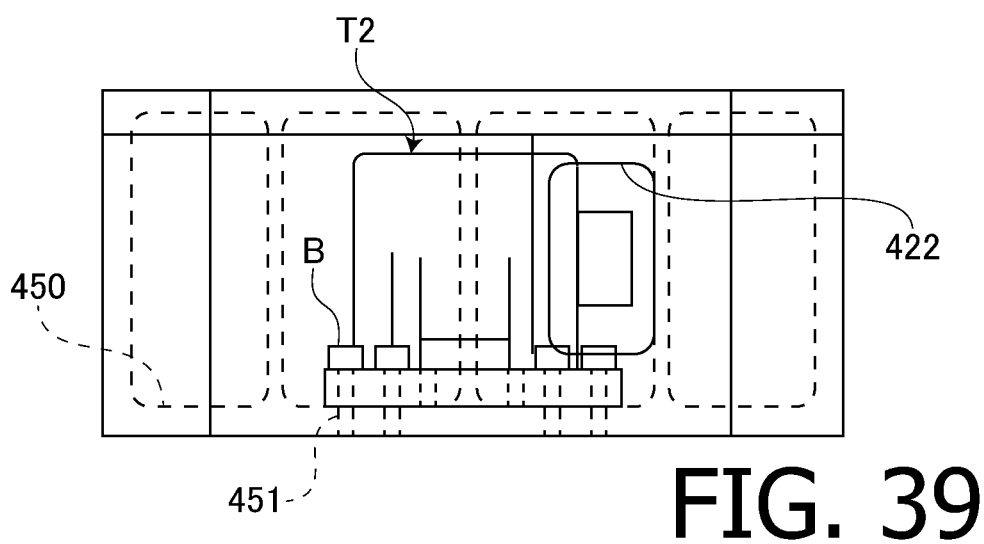
FIG. 39 is a left side view of the vibrating table according to the first embodiment of the present disclosure.

FIG. 39 is a left side view of the vibrating table 400 in a state where an oscillated object T2, having through holes for fixing at the bottom portion, is attached. The oscillated object T2 is fixed to the bottom plate 450 of the vibrating table 400 by screwing bolts B, inserted in the through holes for fixing of the oscillated object T2, in the female screws 451.

The oscillated object 12 is attached substantially at the center of the accommodating space S, too. Therefore, the center of gravity of the oscillated object 12 is positioned near the center of the vibrating table 400. It is noted that, although, in FIG. 39, the oscillated object 12 is directly fixed to the bottom plate 450 of the vibrating table 400, if the center of gravity of the oscillated object T2 is low, the oscillated object T2 may be fixed to the bottom plate 450 via a spacer or the like so as to position the center of gravity of the oscillated object T2 at the center of the vibrating table 400. Also, if the center of gravity of the oscillated object T2 is high, the oscillated object T2 may be, for example, fixed to the lid part 400b and attached to the vibrating table 400 upside down.

As described above, in the present embodiment, an oscillated object and the vibrating table 400 are oscillated in a state where the oscillated object is accommodated inside the vibrating table 400. Since the center of gravity of the entire oscillated portion is surely positioned within the vibrating table 400 by accommodating the oscillated object inside the vibrating table 400, it becomes possible to surely reduce the occurrence of moments of forces on the entire oscillated portion.

It is noted that, although the vibrating table 400 of the above-described embodiment is configured to have a box shape with a lid, the vibrating table 400 only needs to be configured such that, when an oscillated object is attached, the center of gravity of the entire oscillated portion is positioned within the vibrating table 400 (more precisely, within an area where a space formed by extending the movable part 320 (slide coupling mechanism 360) of the Z-axis oscillating unit 300 in the Z-axis direction and a space formed by extending the movable part 120 (slide coupling mechanism 160) of the X-axis oscillating unit 100 in the X-axis direction intersect). In other words, the vibrating table 400 only needs to be configured such that a projection of the center of gravity of the entire oscillated portion to the XY plane perpendicular to the Z-axis is included in a projection of the movable part 320 (slide coupling mechanism 360) of the Z-axis oscillating unit 300 to the XY plane, and a projection of the center of gravity of the entire oscillated portion to the YZ plane perpendicular to the X-axis is included in a projection of the movable part 120 (slide coupling mechanism 160) of the X-axis oscillating unit 100 to the YZ plane. For example, the vibrating table 400 may have a configuration that only has a face of the frame part 420 to which the slide coupling mechanism 160 is attached and a bottom plate 450 to which the Z-axis oscillating unit 300 is attached.

Also, in the present embodiment, it is made possible to more surely approach the center of gravity the oscillated object toward the center of the vibrating table 400 by providing the accommodating space S (the intermediate plates 430*a*. 440*a* which separate the accommodating space S) at the center of the vibrating table 400.

Second Embodiment

Next, the second embodiment of the present disclosure will be described. The second embodiment differs from the first embodiment only in the configurations of the biaxial sliders (slide coupling mechanisms). In the following description of the second embodiment, differences from the first embodiment will mainly be described, and descriptions of configurations that are common to those of the first embodiment are herein omitted.

Figure 40:
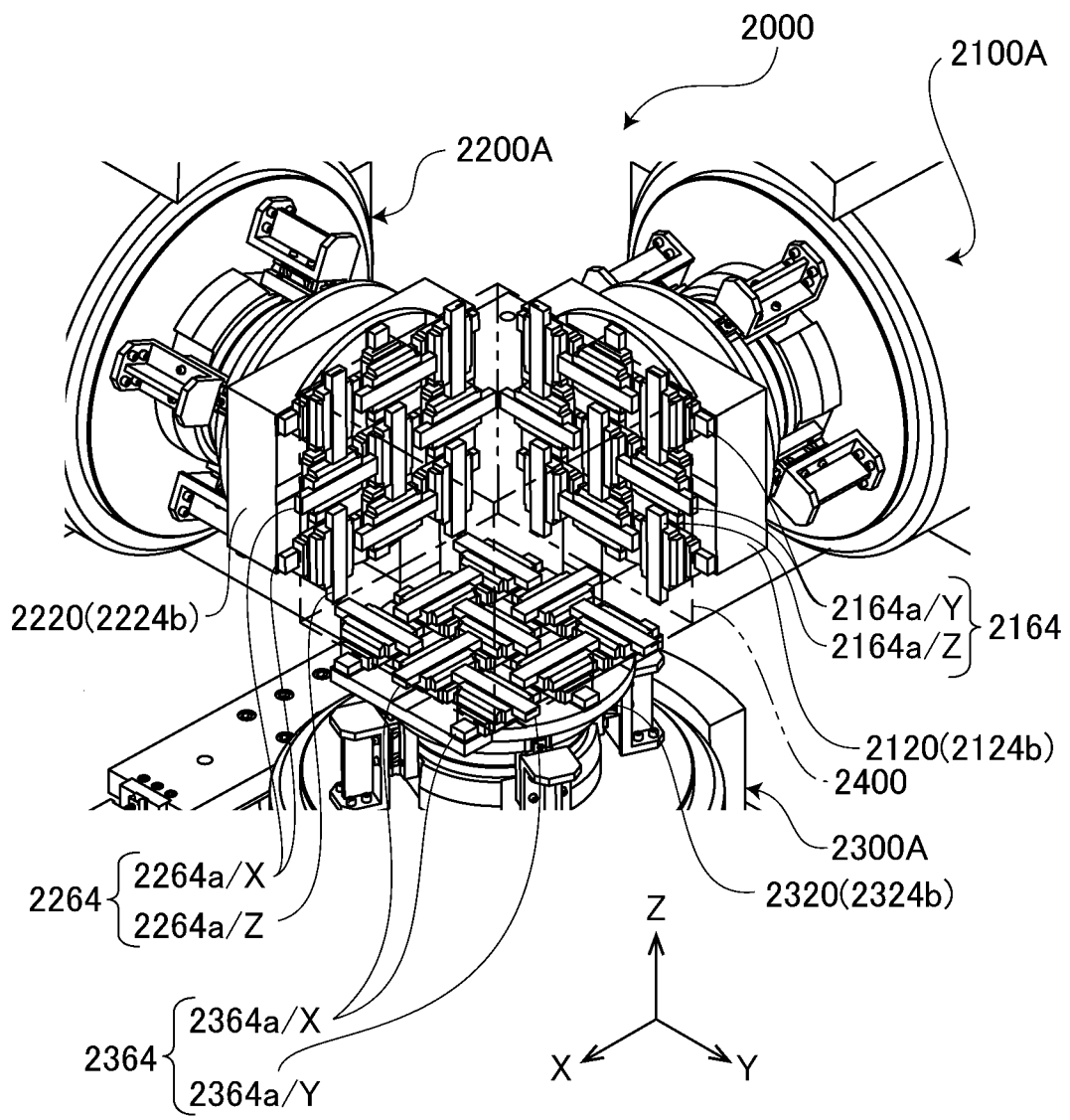
FIG. 40 is an enlarged perspective view around the vibrating table of the oscillating device according to the second embodiment of the present disclosure.

FIG. 40 is an enlarged perspective view (partially transparent view) around a vibrating table 2400 of an oscillating device 2000 according to the second embodiment of the present disclosure. The oscillating device 2000 includes horizontal actuators 2100A and 2200A, and a vertical actuator 2300A. It is noted that, in FIG. 40, only an outline of the vibrating table 2400 is shown by two-dot lines. Also, illustrations of the counter balancers are omitted.

Similarly to the XY slider 360 of the first embodiment, each of biaxial sliders (YZ slider 2160, ZX slider 2260, XY slider 2360) of the present embodiment is configured with nine cross guides 2164, 2264, 2364 arranged at regular intervals in a lattice (three rows×three columns). The cross guides 2164, 2264, 2364 have the same configuration as the cross guide 364 of the XY slider 360 of the first embodiment.

The XY slider 2360 of the present embodiment has the same configuration as the XY slider 360 (FIG. 12) of the first embodiment. That is, two arbitrary cross guides 2364 adjacent to each other in the X-axis direction or in the Y-axis direction are arranged mutually reversely in the up-down direction (in the Z-axis direction). That is, an X-axis rail 2364*a*/X (Y-axis rail 2364*a*/Y) of one of the two arbitrary cross guides 2364 adjacent to each other in the X-axis direction or in the Y-axis direction is fixed to a tip face (top plate 2324*b*) of a movable part 2320, and the X-axis rail 2364*a*/X (Y-axis rail 2364*a*/Y) of the other one is fixed to a lower face of the vibrating table 2400. By this arrangement, directionalities in mass distribution and/or motion characteristic that each of the cross guides 2364 has are averaged, and thereby the oscillating performance with small directionality (or unevenness in directionalities) is obtained.

Also, since substantially the entire surface of the lower face of the vibrating table 2400 is uniformly oscillated via the nine cross guides 2364 evenly and closely arranged, uniform oscillation with less unevenness in vibrating states inside the vibrating table 2400 becomes possible.

In the present embodiment, the same arrangement configuration of the cross guides 364 (first orientation cross guides 364P, second orientation cross guides 364S) as the first embodiment is adopted to the arrangement of the cross guides 2164 for the YZ slider 2160 and the arrangement of the cross guides 2264 for the ZX slider 2260.

Specifically, regarding the YZ slider 2160, a Y-axis rail 2164*a*/Y (Z-axis rail 2164*a*/Z) of one of two arbitrary cross guides 2164 adjacent to each other in the Y-axis direction or in the Z-axis direction is fixed to a tip face (top plate 2124*b*) of a movable part 2120, and the Y-axis rail 2164*a*/Y (Z-axis rail 2164*a*/Z) of the other one is fixed to a side face of the vibrating table 2400.

Also, regarding the ZX slider 2260, an X-axis rail 2264*a*/X (Z-axis rail 2264*a*/Z) of one of two arbitrary cross guides 2264 adjacent to each other in the Z-axis direction or in the X-axis direction is fixed to a tip face (top plate 2224*b*) of a movable part 2220, and the X-axis rail 2264*a*/X (Z-axis rail 2264*a*/Z) of the other one is fixed to a side face of the vibrating table 2400.

As described above, each face of the vibrating table 2400 is uniformly oscillated in three orthogonal directions by the same configuration as the above-described XY slider 2360. Therefore, uniform oscillation with less unevenness in vibrating states throughout the entire vibrating table 2400 becomes possible. Furthermore, since the vibrating table 2400 is oscillated in three orthogonal directions via the biaxial sliders (YZ slider 2160, ZX slider 2260, XY slider 2360) that have the same configuration, oscillation with lesser directionalities becomes possible.

It is noted that, if a height of the vibrating table 2400 is short, the YZ slider 2160 and the ZX slider 2260 may be configured with six cross guides 2164, 2264 arranged in two rows×three columns, obtained by removing three cross guides on the upper row or the lower row, among the nine cross guides 2164, 2264 arranged in three rows×three columns in the second embodiment. In this case, since, similarly to the variation 360A (FIG. 34), the same number of the first orientation cross guides and the second orientation cross guides are alternately arranged in two orthogonal directions, directionalities in the oscillating performance are reduced and it becomes possible to further uniformly oscillate each part of the vibrating table 2400.

Third Embodiment

Figure 41:
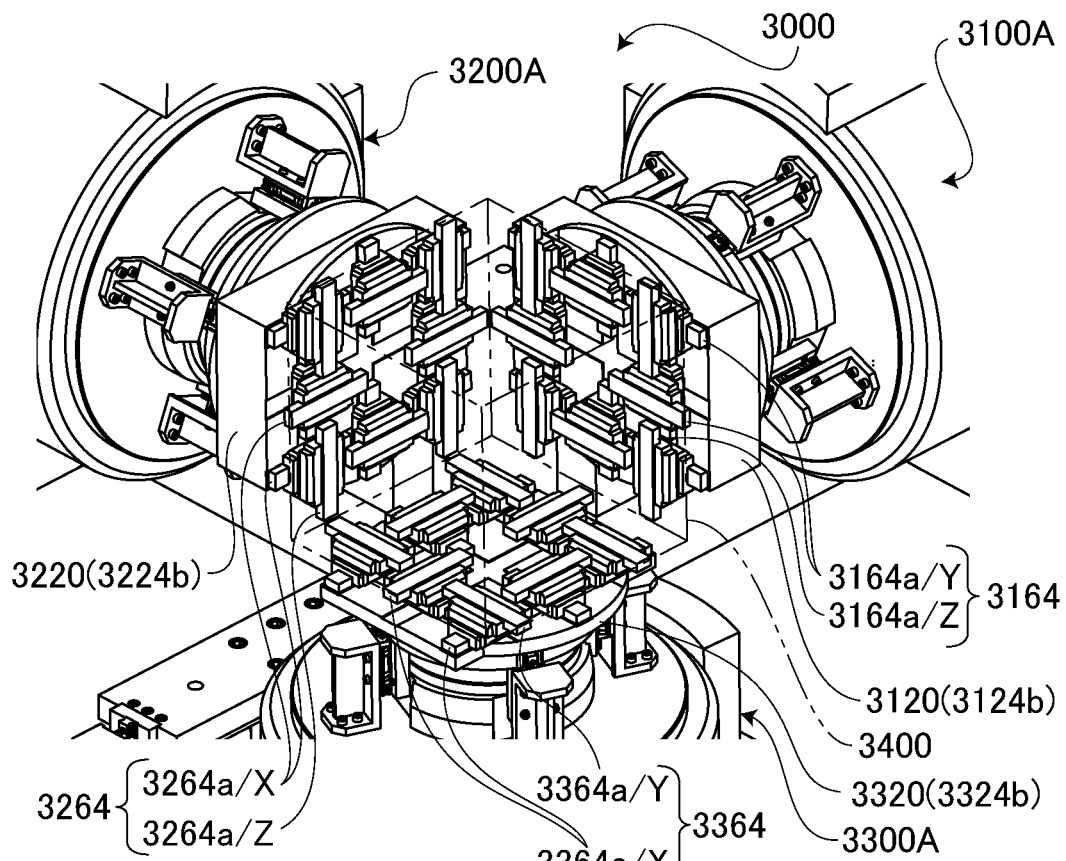
FIG. 41 is an enlarged perspective view around the vibrating table of the oscillating device according to the third embodiment of the present disclosure.

FIG. 41 is an enlarged perspective view (partially transparent view) around a vibrating table 3400 of an oscillating device 3000 according to the third embodiment of the present disclosure. It is noted that, in FIG. 41, only an outline of the vibrating table 3400 is shown by two-dot lines. Also, illustrations of the counter balancers are omitted.

The present embodiment is an embodiment in which the arrangement configuration of the cross guides 364 (first orientation cross guides 364P, second orientation cross guides 364S) of the above-described variation 360A (FIG. 34) of the XY slider is applied to each biaxial slider (YZ slider 3160, ZX slider 3260, XY slider 3360). It is noted that a horizontal actuator 3100A (including a movable part 3120 and a top plate 3124*b*), a horizontal actuator 3200A (including a movable part 3220 and a top plate 3224*b*), a vertical actuator 3300A (including a movable part 3320 and a top plate 3324*b*), a cross guide 3164 (including a Y-axis rail 3164*a*/Y and a Z-axis rail 3164*a*/Z), a cross guide 3264 (including an X-axis rail 3264*a*/X and a Z-axis rail 3264*a*/Z) and a cross guide 3364 (including an X-axis rail 3364*a*/X and a Y-axis rail 3364*a*/Y) have the same configurations as the horizontal actuator 2100A, the horizontal actuator 2200A, the vertical actuator 2300A, a cross guide 2164, a cross guide 2264 and a cross guide 2364, respectively.

Since the YZ slider 3160 and the ZX slider 3260 of the present embodiment couple the vibrating table 3400 to respective horizontal actuators 3100A and 3200A by a larger number of the cross guides 3164 and the cross guides 3264 than the YZ slider 160 and the ZX slider 260 of the first embodiment, it is possible to further uniformly oscillate the vibrating table 3400. Furthermore, since, similarly to the variation 360A (FIG. 34), the YZ slider 3160 and the ZX slider 3260 of the present embodiment have configurations in which the same number of the first orientation cross guides and the second orientation cross guides are alternately arranged, directionalities in the oscillating performance are reduced and it becomes possible to further uniformly oscillate each part of the vibrating table 3400.

Fourth Embodiment

Next, the fourth embodiment of the present disclosure will be described. The fourth embodiment differs from the above-described first embodiment only in the configurations of the biaxial sliders (slide coupling mechanisms). In the following description of the fourth embodiment, differences from the first embodiment will mainly be described, and descriptions of configurations that are common to those of the first embodiment are herein omitted.

Figure 42:
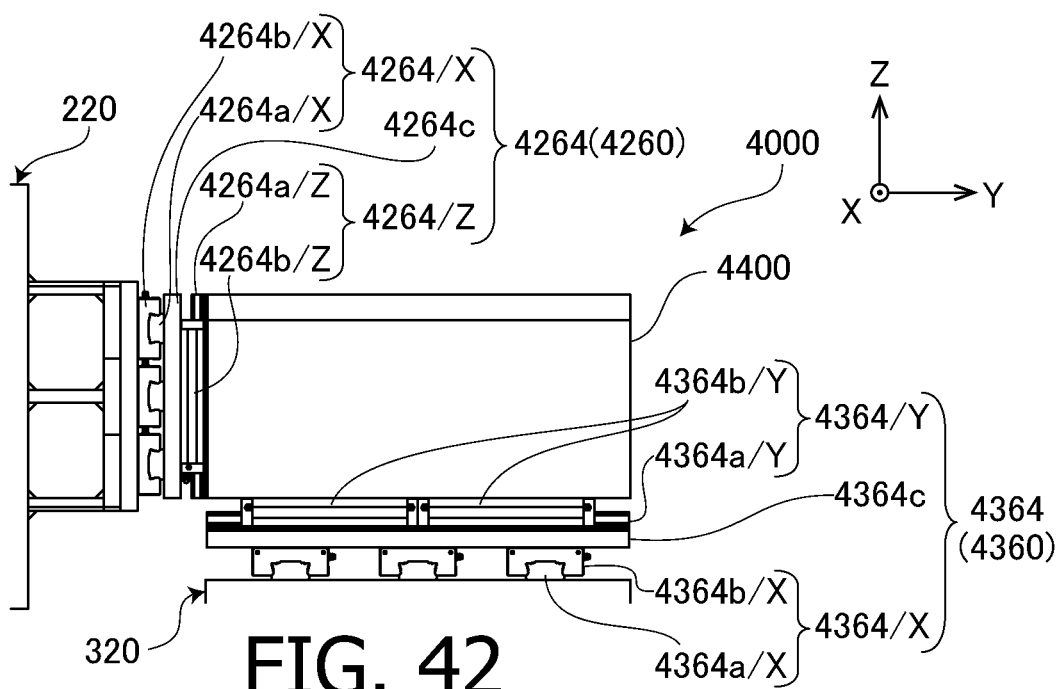
FIG. 42 is an enlarged front view around the vibrating table of the oscillating device according to the fourth embodiment of the present disclosure.

FIG. 42, FIG. 43 and FIG. 44 are an enlarged front view, an enlarged side view and an enlarged plan view around a vibrating table 4400 of an oscillating device 4000 according to the fourth embodiment of the present disclosure, respectively.

The present embodiment differs from the configuration of the first embodiment in that, in cross guide parts 4164, 4264, 4364 of biaxial sliders (YZ slider 4160, ZX slider 4260, XY slider 4360), coupling plates 4164*c*, 4264*c*, 4364*c* are used to couple the linear guides to improve rigidities of the cross carriage parts.

As shown in FIGS. 43-44, the YZ slider 4160 of the present embodiment includes three Y-axis linear guides 4164/Y (Y-axis rails 4164*a*/Y and Y-axis carriages 4164*b*/Y), five Z-axis linear guides 4164/Z (Z-axis rails 4164*a*/Z and Z-axis carriages 4164*b*/Z), and a coupling plate 4164*c* that couples all the Y-axis linear guides 4164/Y and the Z-axis linear guides 4164/Z. Similarly to the A-type carriage 364*b*/A of the first embodiment, the Y-axis carriage 4164*b*/Y and the Z-axis carriage 4164*b*/Z are eight-streak type carriages, but unlike the A-type carriage 364*b*/A, lowering of aspect ratios (shortening) and weight reductions by forming the notches C1, C2 are not made. It is noted that the A-type carriage 364*b*/A may be used as the Y-axis carriage 4164*b*/Y and the Z-axis carriage 4164*b*/Z. Also, the same carriage as the Y-axis carriage 4164*b*/Y (Z-axis carriage 4164*b*/Z) may be used in place of the A-type carriage 364*b*/A of other embodiments.

As shown in FIG. 44, the Y-axis linear guide 4164/Y is configured with one Y-axis rail 4164*a*/Y and two Y-axis carriages 4164*b*/Y.

As shown in FIG. 43, the Y-axis carriages 4164*b*/Y of three Y-axis linear guides 41641/Y are arranged in the Z-axis direction with substantially no gap therebetween, and are fixed to a tip face of a coupling arm 4162. Also, the Y-axis rails 4164*a*/Y are fixed to one face of the coupling plate 4164*c*. It is noted that the three Y-axis linear guides 4164/Y may be arranged in the Z-axis direction with intervals therebetween. In this case, to give sufficient rigidity to the YZ slider 4160, it is preferable that the intervals between the Y-axis linear guides 4164/Y are made narrower than a width (a size in the Z-axis direction) of the Y-axis carriage 4164*b*/Y.

The oscillating performance is improved by attaching the Y-axis carriage 4164*b*/Y, having large mass, not to the coupling plate 4164*c* which is oscillated in two axial directions (X-axis direction, Y-axis direction) but to the coupling arm 4162 which is oscillated only in the X-axis direction.

Also, since the Y-axis rail 4164*a*/Y has uniform mass distribution in the Y-axis direction, occurrence of vibration due to weight distribution changes when oscillated in the Y-axis direction is low. Therefore, occurrence of vibration noises is reduced by attaching the Y-axis rails 4164*a*/Y to the coupling plate 4164*c* which is oscillated in the Y-axis direction.

On the other hand, the Z-axis linear guide 4164/Z is configured with one Z-axis rail 4164*a*/Z and one Z-axis carriage 4164*b*/Z.

As shown in FIG. 44, the Z-axis carriages 4164*b*/Z of five Z-axis linear guides 4164/Z are arranged in the Y-axis direction with substantially no gap therebetween, and are fixed to the other face of the coupling plate 4164*c*. Also, the Z-axis rails 4164*a*/Z are fixed to a side face of the vibrating table 4400. It is noted that the five Z-axis linear guides 4164/Z may be arranged in the Y-axis direction with intervals therebetween. In this case, to give sufficient rigidity to the YZ slider 4160, it is preferable that the intervals between the Z-axis linear guides 4164/Z are made narrower than a width (a size in the Y-axis direction) of the Z-axis carriage 4164*b*/Z.

In the present embodiment, the three Y-axis linear guides 4164/Y are arranged in the Z-axis direction with no gap therebetween. Similarly, the five Z-axis linear guides 4164/Z are arranged in the Y-axis direction with no gap therebetween. Furthermore, all the Y-axis rails 4164*a*/Y and the Z-axis carriages 4164*b*/Z are directly fixed to the coupling plate 4164*c* which has sufficiently high rigidity. By this configuration, a rigidity of the YZ slider 4160 (especially a rigidity of the coupling part in which the coupling plate 4164*c*, the Y-axis rails 4164*a*/Y and the Z-axis carriages 4164*b*/Z are integrally fixed) improves, and thereby makes the resonance frequency higher.

The oscillating performance is improved by attaching the Z-axis carriage 4164*b*/Z, having large mass, not to the vibrating table 4400 which is oscillated in three axial directions (X-axis direction, Y-axis direction, Z-axis direction) but to the coupling plate 4164*c* which is oscillated only in two axial directions (X-axis direction, Y-axis direction).

Also, occurrence of vibration noises is reduced by attaching the Z-axis rails 4164*a*/Z to the vibrating table 4400 which is oscillated in the Z-axis direction.

Also, on one face of the coupling plate 4164*c*, a plurality of the Y-axis rails 4164*a*/Y are spread substantially all over the surface, and the coupling plate 4164*c* is oscillated in the X-axis direction via a plurality of the Y-axis rails 4164*a*/Y that evenly cover one face of the coupling plate 4164*c*. Therefore, the entire coupling plate 4164*c* is uniformly oscillated in the X-axis direction. Furthermore, oscillating forces transmitted from the Y-axis linear guides 4164/Y are averaged by the coupling plate 4164*c* having a high rigidity, and are transmitted to the vibrating table 4400 via the Z-axis linear guides 4164/Z as a more uniform oscillating force.

Similarly, on a side face of the vibrating table 4400 opposing the movable part 120 of the X-axis oscillating unit, a plurality of the Z-axis rails 4164*a*/Z are spread substantially all over the surface, and the vibrating table 4400 is oscillated in the X-axis direction via a plurality of the Z-axis rails 4164a/Z that evenly cover this side face. Therefore, the entire vibrating table 4400 is uniformly oscillated in the X-axis direction, and uniform oscillation with less unevenness in accelerations and jerk inside the vibrating table 4400 becomes possible.

Since the ZX slider 4260 has the same configuration as the above-described YZ slider 4160, detailed descriptions of a coupling arm 4262, X-axis linear guides 4264/X (X-axis rails 4264a/X and X-axis carriages 4264b/X) and Z-axis linear guides 4264/L (Z-axis rails 4264a/Z and Z-axis carriages 4264b/Z) of the ZX slider 4260 are herein omitted.

As shown in FIGS. 42-43, the XY slider 4360 of the present embodiment includes three X-axis linear guides 4364/X (X-axis rails 4364a/X and X-axis carriages 4364b/X), three Y-axis linear guides 4364/Y (Y-axis rails 4364a/Y and Y-axis carriages 4364b/Y), and a coupling plate 4364c that couples all the X-axis linear guides 4364/X and the Y-axis linear guides 4364/Y. The X-axis carriage 4364b/X and the Y-axis carriage 4364b/Y have the same configurations as the Y-axis carriage 4164b/Y and the Z-axis carriage 4164b/Z.

As shown in FIG. 43, the X-axis linear guide 4364/X is configured with one X-axis rail 4364a/X and two X-axis carriages 4364b/X.

Also, as shown in FIG. 42, the X-axis rails 4364a/X of the three X-axis linear guides 4364/X are arranged in the Y-axis direction at regular intervals, and are fixed to a tip face of the movable part 320 of the Z-axis oscillating unit 300. The X-axis carriages 4364b/X are fixed to a lower face of the coupling plate 4364c.

The Y-axis linear guide 4364/Y is also configured with one Y-axis rail 4364a/Y and two Y-axis carriages 4364b/Y.

Also, as shown in FIG. 43, the Y-axis rails 4364a/Y of the three Y-axis linear guides 4364/Y are arranged in the X-axis direction at regular intervals, and are fixed to a top face of the coupling plate 4364c. The Y-axis carriages 4364a/Y are fixed to a lower face of the vibrating table 4400.

In the present embodiment, the three X-axis linear guides 4364/X are arranged at intervals narrower than a width (a size in the Y-axis direction) of the X-axis carriage 4364b/X. Similarly, the three Y-axis linear guides 4364/Y are arranged at intervals narrower than a width (a size in the X-axis direction) of the Y-axis carriage 4364b/Y. Furthermore, all the X-axis carriages 4364b/X and the Y-axis rails 4364a/Y are directly fixed to the coupling plate 4364c which has sufficiently high rigidity. By this configuration, a rigidity of the XY slider 4360 (especially a rigidity of the coupling part in which the coupling plate 4364c, the X-axis carriages 4364b/X and the Y-axis rails 4364a/Y are integrally fixed) improves, and thereby makes the resonance frequency higher.

It is noted that, although, in the present embodiment, the X-axis linear guides 4364/X and the Y-axis linear guides 4364/Y of the XY slider 4360 are arranged with intervals therebetween, similarly to the Y-axis linear guides 4164/Y and the Z-axis linear guides 4164/Z of the YZ slider 4160, the X-axis linear guides 4364/X and the Y-axis linear guides 4364/Y may be arranged with substantially no gap therebetween.

Furthermore, although the coupling plates 4164c, 4264c, 4364c of the present embodiment are formed of stainless steel, if the oscillating performance of higher frequency is required, lighter structure materials such as aluminium alloys such as duralumin, magnesium alloys, carbon fiber composite materials or the like may be used to reduce inertia of the biaxial sliders.

Fifth Embodiment

Next, the fifth embodiment of the present disclosure will be described. FIG. 45 is an external view of an oscillating device 5000 according to the fifth embodiment of the present disclosure. The fifth embodiment differs from the first embodiment in the configurations of the linear guides which are used in the biaxial sliders (slide coupling mechanisms), the movable part support mechanisms and the fixing part support mechanisms, and in the configurations of the biaxial sliders. In the following description of the fifth embodiment, differences from the first embodiment will mainly be described, and descriptions of configurations that are common to those of the first embodiment are herein omitted.

Firstly, configurations of ZX slider 5260 which couples a Y-axis oscillating unit 5200 and a vibrating table 5400 will be described.

Figure 46:
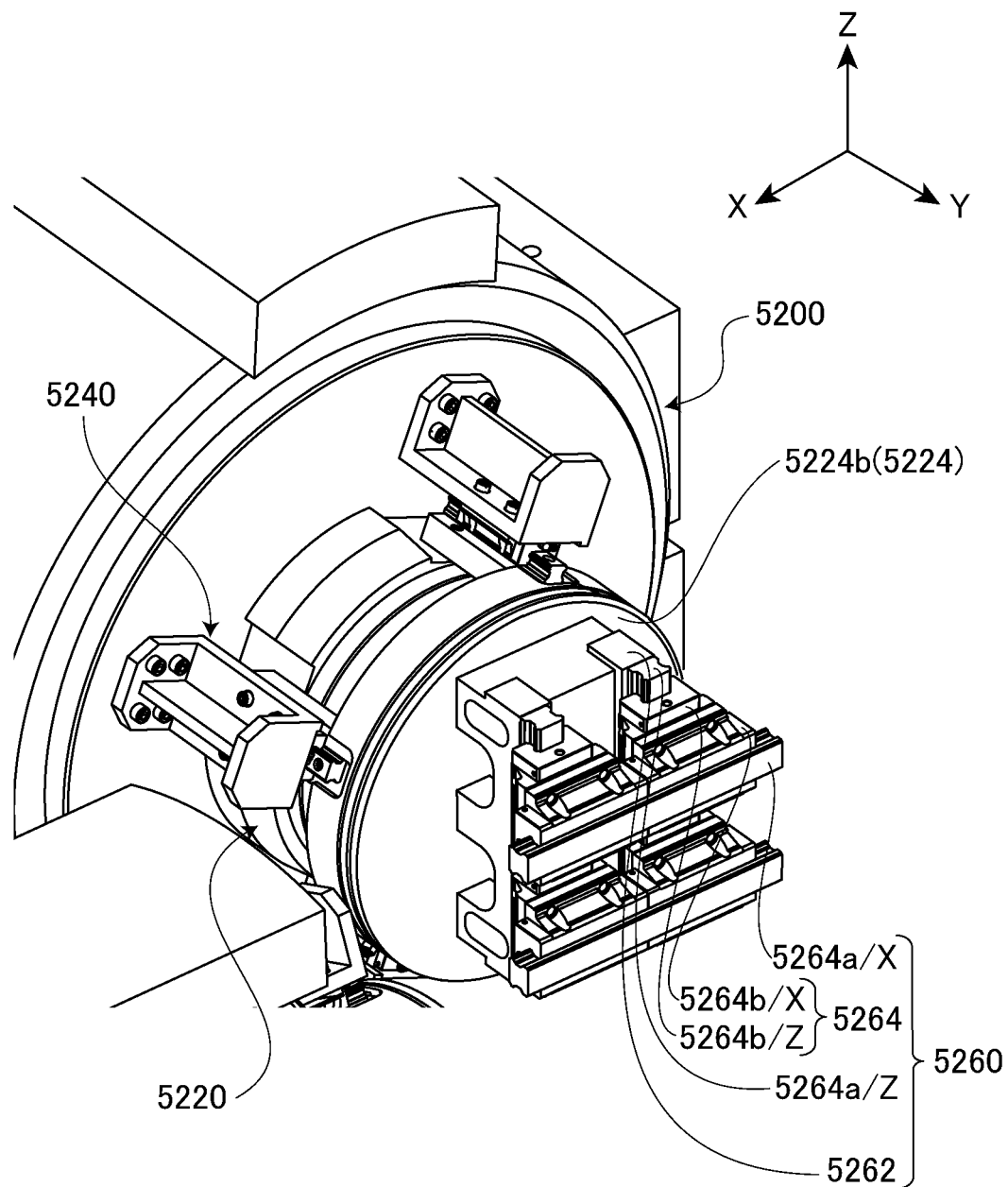
FIG. 46 is a diagram showing a distal end of a Y-axis oscillating unit to which a ZX slider according to the fifth embodiment is attached.

FIG. 46 is a diagram showing a distal end of the Y-axis oscillating unit 5200 to which the ZX slider 5260 is attached. The ZX slider 5260 includes two Z-axis rails 5264a/Z, four Z-axis carriages 5264b/Z, four X-axis carriages 5264b/X, two X-axis rails 5264a/X and a coupling arm 5262. The coupling arm 5262 is a supporting member which is fixed to a top plate 5224b of an extension frame 5224.

The two Z-axis rails 5264a/Z extending in the Z-axis direction are arranged in the X-axis direction with a predetermined interval therebetween, and are fixed to the coupling arm 5262. To each Z-axis rail 5264a/Z, two Z-axis carriages 5264b/Z which slidably engage with the Z-axis rail 5264a/Z are mounted.

Also, the two X-axis rails 5264a/X extending in the X-axis direction are arranged in the Z-axis direction with a predetermined interval therebetween, and are attached to a side face of the vibrating table 5400 (FIG. 45) opposing the Y-axis oscillating unit 5200. To each X-axis rail 5264a/X, two X-axis carriages 5264b/X which slidably engage with the X-axis rail 5264a/X are mounted.

Each Z-axis carriage 5264b/Z is integrally fixed to one of the X-axis carriages 5264b/X by bolts in a state where top faces of their carriages are superimposed with each other, thereby forming a cross carriage 5264.

A pair of the Z-axis rails 5264a/Z and a pair of the X-axis rails 5264a/X are arranged in a curb shape, and are coupled by the cross carriages 5264 at positions where they intersect each other. As a result, a movable part 5220 of the Y-axis oscillating unit 5200 (the movable part 5220 being movably supported only in its driving direction by a movable part support mechanism 5240) and the vibrating table 5400 are coupled slidably in both the X-axis direction and the Z-axis direction.

As described above, the ZX slider 5260 of the present embodiment includes a pair of the Z-axis rails 5264a/Z and a pair of the X-axis rails 5264a/X each arranged in their width directions (regarding the Z-axis rails 5264a/Z, in the X-axis direction, and regarding the X-axis rails 5264a/X, in the Z-axis direction) with intervals therebetween. By this configuration, rigidities of the ZX slider 5260 against moments of forces about longitudinal axes of respective rails improve, thereby making it possible to oscillate with higher frequencies.

It is more advantageous to make the arrangement interval for each pair of the rails as wide as possible. In the present embodiment, the interval for the X-axis rails 5264a/X is limited by a height of the vibrating table 5400. Therefore, one X-axis rail 5264a/X is attached at an upper end part of the side face of the vibrating table 5400, and the other X-axis rail 5264a/X is attached to a lower end part of the side face of the vibrating table 5400. Also, the arrangement interval for the Z-axis rails 5264a/Z is limited by a diameter of the movable part 5220 (top plate 5224b) of the Y-axis oscillating unit 5200. Therefore, as shown in FIG. 46, the interval for a pair of the Z-axis rail 5264a/Z is a maximum interval within a range in which each Z-axis rail 5264a/Z does not protrude outside a cylindrical surface formed by extending an outer peripheral surface of the movable part 5220 in the Y-axis direction.

It is also noted that, since the X-axis rail 5264a/X is longer than the X-axis carriage 5264b/X, and the width (X-axis direction) of the vibrating table 5400 is greater than the width of the coupling arm 5262, it becomes possible to widen a sliding width of the ZX slider 5260 in the X-axis direction. Also, since the width of the vibrating table 5400 is greater than the height (Z-axis direction) of the vibrating table 5400, it becomes possible to further widen the sliding width of the ZX slider 5260 in the X-axis direction by attaching the X-axis rail 5264a/X to the vibrating table.

Next, internal structures of a Z-axis linear guide 5264/Z configured with the Z-axis rails 5264a/Z and the Z-axis carriages 5264b/Z will be described. It is noted that other linear guides which are used in the oscillating device 5000 have the same structures as the Z-axis linear guide 5264/Z.

Figure 48:
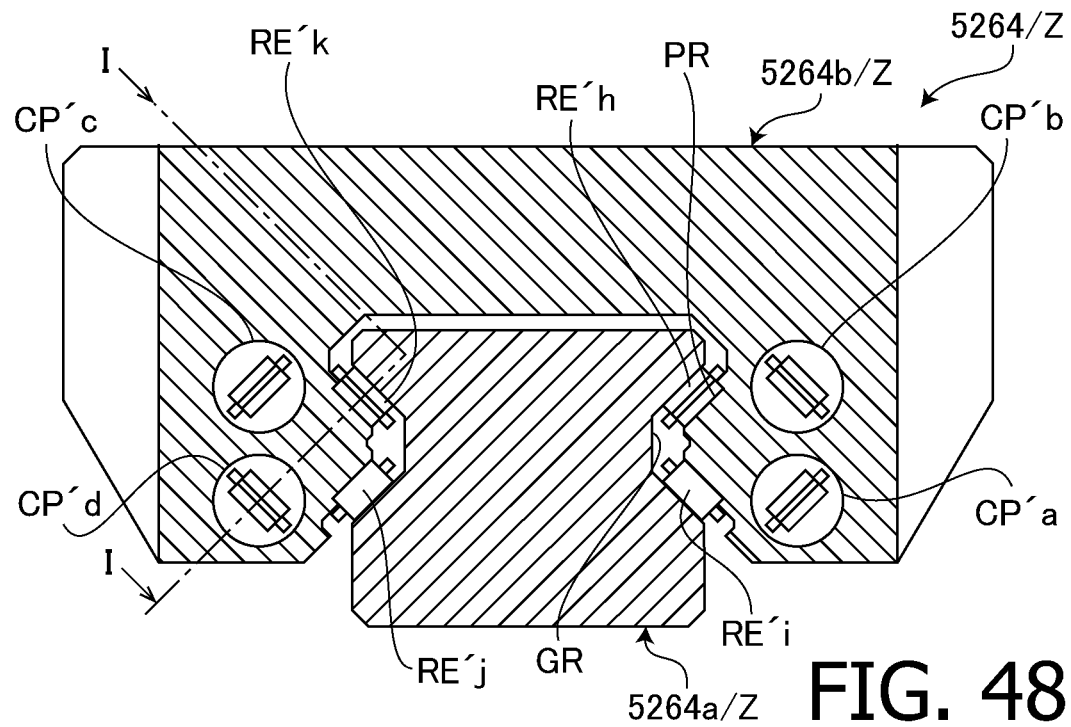
FIG. 48 is a cross sectional view of the linear guide according to the fifth embodiment.
Figure 49:
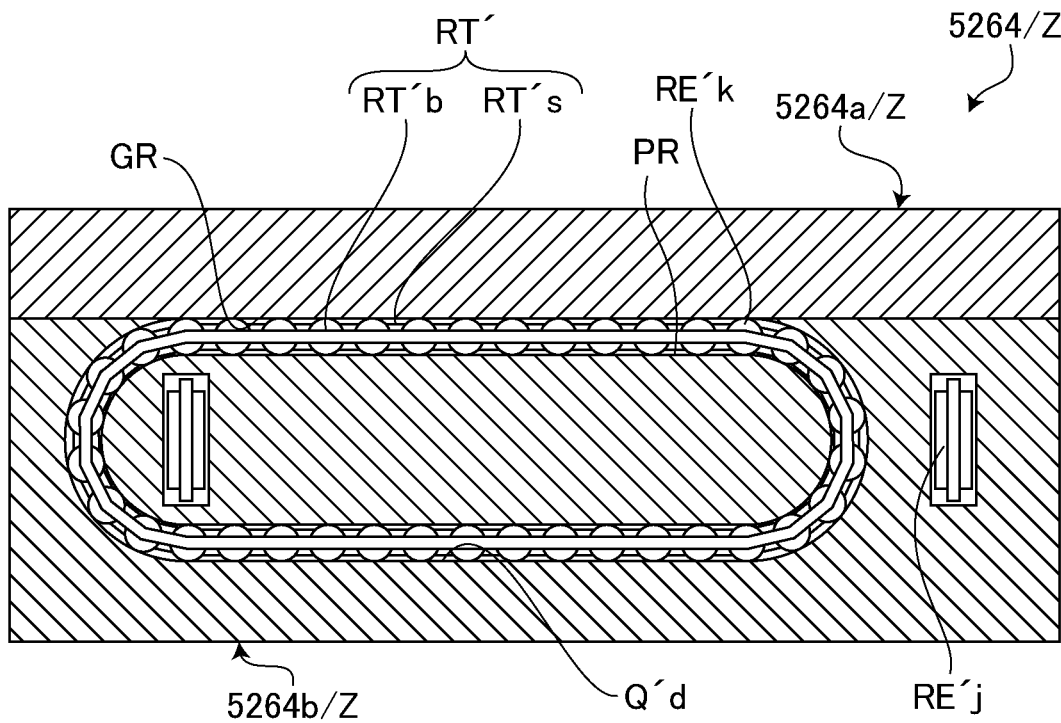
FIG. 49 is a diagram showing of a section I-I of FIG. 48.

FIG. 48 is a longitudinal section view of the Z-axis rail 5264a/Z and the Z-axis carriage 5264b/Z of the ZX slider 5260 cut along a plane perpendicular to a longitudinal axis of the Z-axis rail 5264a/Z (i.e., XY plane). Also, FIG. 49 is a figure viewing from the arrow direction of I-I line of FIG. 48. The Z-axis linear guide 5264/Z of the present embodiment is a linear guide in which rollers are used as the rolling bodies. By using millers as the rolling bodies, high positional accuracies and rigidities can be obtained. It is noted that balls or linear guides can be used as the rolling bodies.

On each of both side faces in the Y-axis direction of the Z-axis rail 5264a/Z shown in FIG. 48, a groove GR having a trapezoidal sectional shape and extending in the Z-axis direction is formed. Also, as shown in FIG. 48 and FIG. 49, to the Z-axis carriage 5264b/Z, the groove GR extending in the Z-axis direction is formed such that the groove GR surrounds the Z-axis rail 5264a/Z. To each side wall of the groove GR, a protruding part PR extending along the groove GR of the Z-axis rail 5264a/Z is formed. To the protruding part PR, a pair of inclined faces, the inclined faces of the pair being parallel to respective inclined faces of the trapezoidal groove GR of the Z-axis rail 5264a/Z, is formed. Between the four inclined faces of a pair of the grooves OR and the opposing inclined faces of the protruding part PR, respective gaps are formed. In each of these four gaps, a plurality of rollers RE' (RE'h, RE'i, RE'j, RE'k) made of stainless steel and a retainer RT' made of resin and configured to rotatably retain and couple the rollers are accommodated. Each of the rollers RE' is retained by being nipped between the inclined face of the groove OR and the inclined face of the protruding part PR.

Also, inside the Z-axis carriage 5264b/Z, four no-load paths (roller escape passages) Q' (Q'a, Q'b, Q'c, Q'd), being parallel to four respective gaps described above, are formed. As shown in FIG. 49, the no-load paths Q'a, Q'b, Q'c, Q'd communicate with respective gaps at both ends thereof. Thereby, circulating passages for allowing the rollers RE' (RE'h, RE'i, RE'j, RE'k) and the retainer RT' to circulate are formed.

As the Z-axis carriage 5264b/Z moves with respect to the Z-axis rail 5264a/Z in the Z-axis direction, a plurality of rollers RE'h, RE'i, RE'j, RE'k circulate in respective circulating passages CP'a, CP'b, CP'c, CP'd along with the retainer RT'. Therefore, even if large loads are applied in directions different from the Z-axis direction, the carriage can be supported by a plurality of rollers and a resistance in the Z-axis direction is maintained low by the rolling of the rollers RE' (RE'h, RE'i, RE'j, RE'k), and thus the Z-axis carriage 5264b/Z can be moved smoothly with respect to the Z-axis rail 5264a/Z.

As shown in FIG. 49, the retainer RT' that couples a plurality of rollers (e.g., rollers RE'k) has a plurality of spacer parts RT's positioned between the rollers RE'k and a pair of bands RT'b that couples a plurality of the spacer parts RT's. Both ends of each spacer part RT's are fixed to respective bands RT'b of the pair to form the ladder-like retainer RT'. Each roller RE'k is retained in a space surrounded by a pair of adjacent spacer parts RT's and the pair of bands RT'b.

Also, by interposing the spacer parts RT's of the retainer RT' having low hardness between the rollers RE'k, oil film shortage and/or abrasion due to direct contacts between the rollers RE'k with very narrow contact surface area are prevented, friction resistance decreases, and the product life drastically extends.

By coupling the Y-axis oscillating unit 5200 and the vibrating table 5400 via the ZX slider 5260 capable of sliding in the X-axis direction and the Z-axis direction with very small friction resistance as described above, vibration components of the vibrating table 5400 in the X-axis direction and the Z-axis direction will not be transmitted to the Y-axis oscillating unit 5200 even if the vibrating table 5400 is vibrated in the X-axis direction and the Z-axis direction by the X-axis oscillating unit 5100 and a Z-axis oscillating unit 5300, respectively. Also, since the vibrating table 5400 hardly receives forces in the Z-axis direction and the X-axis direction by the driving of the Y-axis oscillating unit 5200, oscillation with less crosstalk becomes possible.

Furthermore, the YZ slider 5160 which couples the X-axis oscillating unit 5100 and the vibrating table 5400 also has the same configuration as the ZX slider 5260, and the vibrating table 5400 is coupled to the movable part of the X-axis oscillating unit 5100 slidably in the Y-axis direction and the Z-axis direction. Therefore, vibration components of the vibrating table 5400 in the Y-axis direction and the Z-axis direction will not be transmitted to the X-axis oscillating unit 5100 even if the vibrating table 5400 is vibrated in the Y-axis direction and the Z-axis direction by the Y-axis oscillating unit 5200 and the Z-axis oscillating unit 5300, respectively. Also, since the vibrating table 5400 hardly receives forces in the Y-axis direction and the Z-axis direction by the driving of the X-axis oscillating unit 5100, oscillation with less crosstalk becomes possible.

Next, a configuration of an XY slider 5360 that couples the Z-axis oscillating unit 5300 and the vibrating table 5400 will be described.

Figure 47:
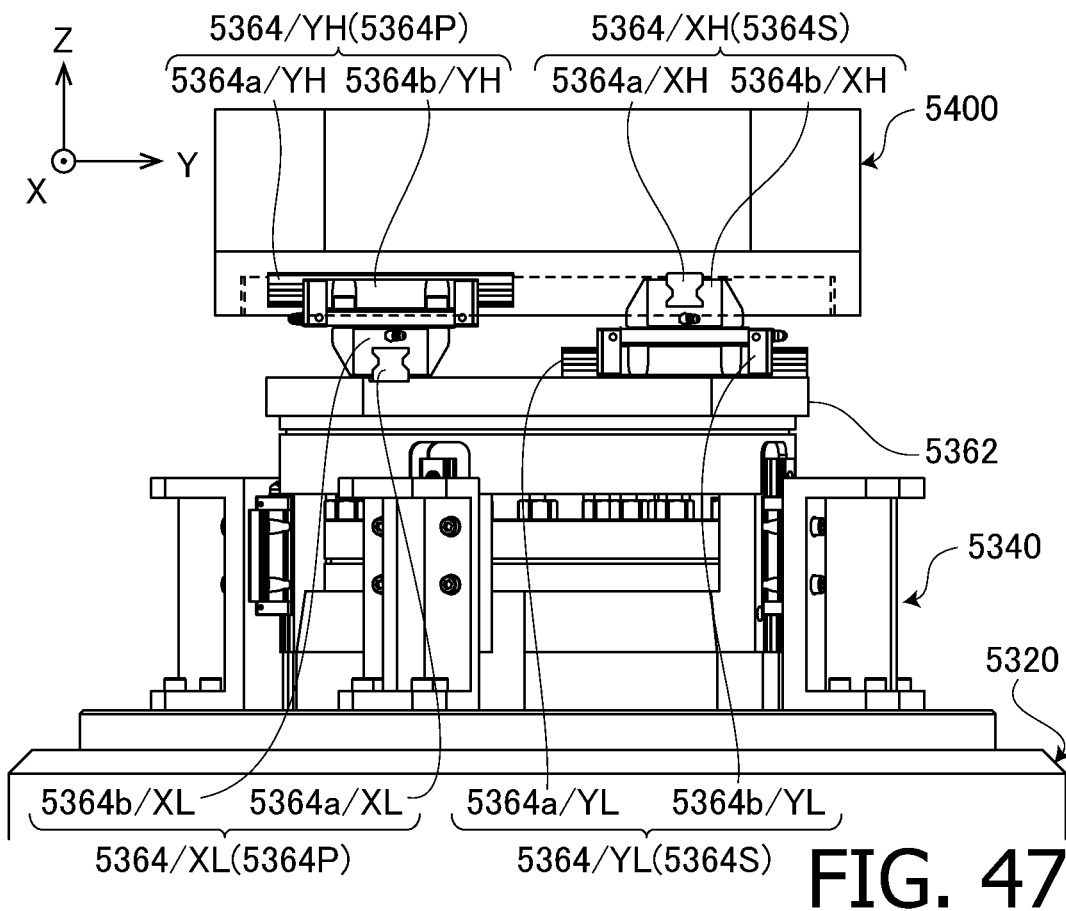
FIG. 47 is a side view around the XY slider according to the fifth embodiment.
Figure 50:
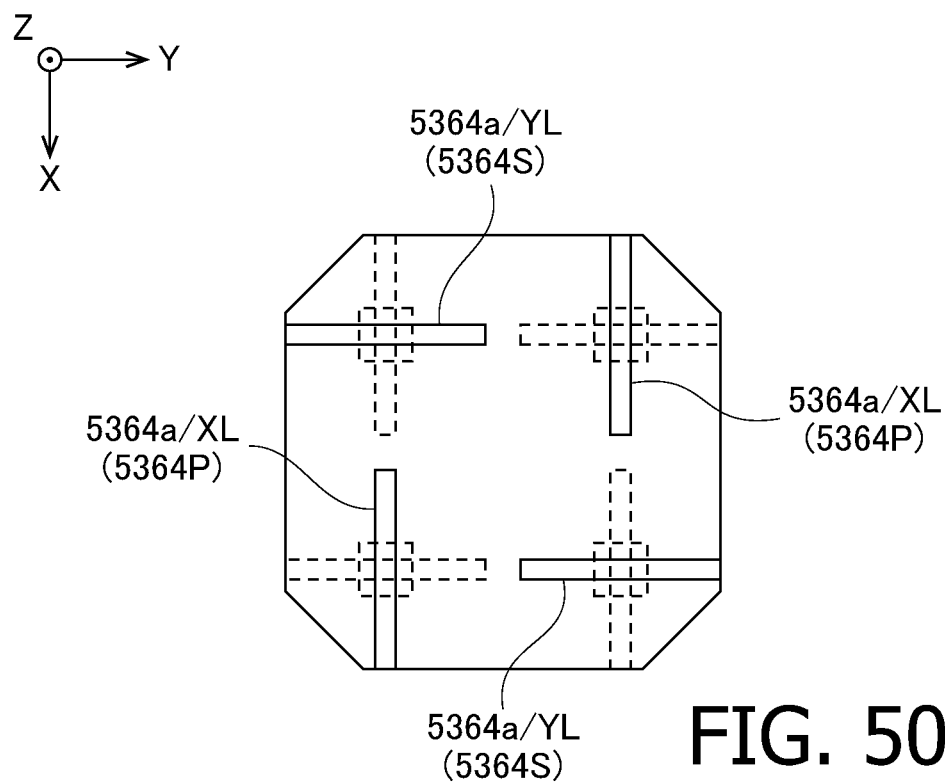
FIG. 50 is a diagram illustrating arrangements of rails attached to a top plate of a movable part of the Z-axis oscillating unit according to the fifth embodiment.

FIG. 47 is a side view around the XY slider 5360. FIG. 50 is a diagram illustrating arrangements of rails of the XY slider 5360 to be attached to a top plate 5362 of a movable part 5320 of the Z-axis oscillating unit 5300 (the movable part 5320 being movably supported only in its driving direction by a movable part support mechanism 5340).

The XY slider 5360 includes four cross guides 5364. The cross guide 5364 (5364P, 5364S) includes one X-axis linear guide 5364/X (5364/XL, 5364/XH) and one Y-axis linear guide 5364/Y (5364/YH, 5364/YL). The X-axis linear guide 5364/X is configured with one X-axis rail S364a/X (5364a/XL, 5364a/XH) and one X-axis carriage 5364b/X (5364b/XL, 5364b/XH), and the Y-axis linear guide 5364/Y is configured with one Y-axis rail 5364a/Y (5364a/YH, 5364a/YL) and one Y-axis carriage 5364b/Y (5364b/YH, 5364b/YL).

The X-axis carriage 5364b/X and the Y-axis carriage 5364b/Y are integrally fixed by bolts in a state where top faces of the carriages are superimposed with each other, thereby forming a cross carriage. This cross carriage has the same configuration as the cross carriage 5264 of the ZX slider 5260 described above.

The cross guide 5364 includes the first orientation cross guide 5364P of which the X-axis linear guide 5364/X is attached to the vibrating table 5400, and the second orientation cross guide 5364S of which the Y-axis linear guide 5364/Y is attached to the vibrating table 5400. The X-axis rail 5364a/XL of the cross guide 5364P is attached to the top face of the top plate 5362, and the Y-axis rail 5364a/YH is attached to a lower face of the vibrating table 5400. Also, the Y-axis rail 5364a/YL of the cross guide 5364S is attached to the top face of the top plate 5362, and the X-axis rail 5364a/XH is attached to the lower face of the vibrating table 5400. That is, each cross guide 5364 couples the movable part 5320 of the Z-axis oscillating unit 5300 and the vibrating table 5400 slidably in the X-axis direction and in the Y-axis direction.

It is noted that the X-axis linear guide 5364/X and the Y-axis linear guide 5364/Y attached to the top plate 5362 will be referred to as a lower X-axis linear guide 5364/XL (lower X-axis rail 5364a/XL, lower X-axis carriage 5364b/XL) and a lower Y-axis linear guide 5364/YL (lower Y-axis rail 5364a/YL, lower Y-axis carriage 5364b/YL), respectively. Also, the X-axis linear guide 5364/X and the Y-axis linear guide 5364/Y attached to the vibrating table 5400 will be referred to as an upper X-axis linear guide 5364/XH (upper X-axis rail 5364a/XH, upper X-axis carriage 5364b/XH) and an upper Y-axis linear guide 5364/YH (upper Y-axis rail 5364a/YH, upper Y-axis carriage 5364b/YH), respectively.

As shown in FIG. 50, the four cross guides 5364 are attached at four corners of the top face of the substantially square shaped top plate 5362. Also, the cross guides 5364P and 5364S are alternately arranged around a central axis Ax of the Z-axis oscillating unit 5300. That is, the arrangement of the cross guides 5364P and 5364S have four times rotation symmetry about the central axis Ax. By this arrangement of the cross guides 5364, the mass distribution of the XY slider 5360 about the central axis Ax is levelized. As a result, response characteristics of the XY slider 5360 to vibrations in the X-axis direction and the Y-axis direction are made more homogenous.

Also, the X-axis carriage 5364b/X and the Y-axis carriage 5364b/Y have the same structures apart from the types of the attachment holes (Four through holes are formed on the X-axis carriage 5364b/X, and four screw holes are formed on the Y-axis carriage 5364b/Y). Furthermore, the X-axis rail 5364a/X and the Y-axis rail 5364a/Y are the same. Each linear guide (X-axis linear guide 5364/X. Y-axis linear guide 5364/Y) has different mass distributions in the X-axis direction and in the Y-axis direction. However, the mass distributions in the X-axis direction and in the Y-axis direction are levelized by coupling the two linear guides to form the cross guide 5364. The response characteristics of the XY slider 5360 to vibrations in the X-axis direction and the Y-axis direction are made more homogenous by this configuration as well.

Also, each oscillating unit (X-axis oscillating unit 5100, Y-axis oscillating unit 5200, Z-axis oscillating unit 5300) is attached to a device base 5500 via a pair of supporting units 5150, 5250, 5350 (fixing part support mechanism). The supporting unit 5150, 5250, 5350 is a cushioning device including elastic components (coil springs or air springs) that elastically support each oscillating unit 5100, 5200, 5300, and suppress transmission of vibration (especially the high frequency components) of each oscillating unit in the oscillating direction to the device base 5500. By attaching each oscillating unit 5100, 5200, 5300 to the device base 5500 via the supporting unit 5150, 5250, 5350, transmission of vibrations between the oscillating units 5100, 5200, 5300 are suppressed, and triaxial oscillation with less crosstalk and higher accuracy becomes possible.

Sixth Embodiment

Next, the sixth embodiment of the present disclosure will be described. The sixth embodiment differs from the first embodiment in the frame structures of the movable parts of respective electrodynamic actuators (horizontal actuators in the X-axis direction and the Y-axis direction, and a vertical actuator 6300A). In the following description of the sixth embodiment, differences from the first embodiment will mainly be described, and descriptions of configurations that are common to those of the first embodiment are herein omitted.

Figure 51:
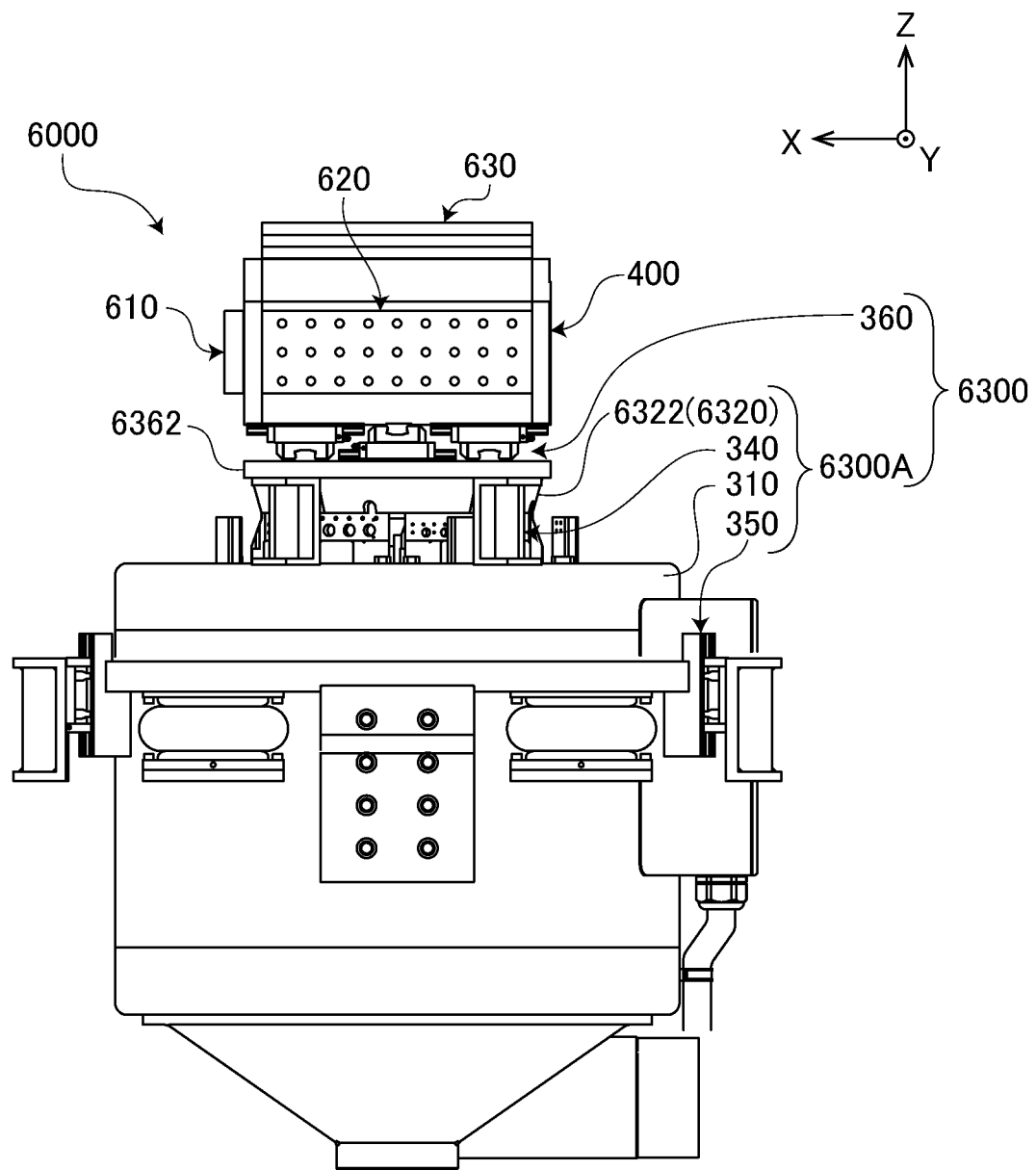
FIG. 51 is a front view of an electrodynamic triaxial oscillating device according to the sixth embodiment of the present disclosure.

FIG. 51 is a front view of an electrodynamic triaxial oscillating device 6000 (only a Z-axis oscillating unit 6300, the vibrating table 400, the X-axis counter balancer 610, the Y-axis counter balancer 620 and the Z-axis counter balancer 630 are shown) according to the sixth embodiment of the present disclosure. The movable part 6320 of the vertical actuator 6300A of the sixth embodiment includes a frame 6322.

Figure 52:
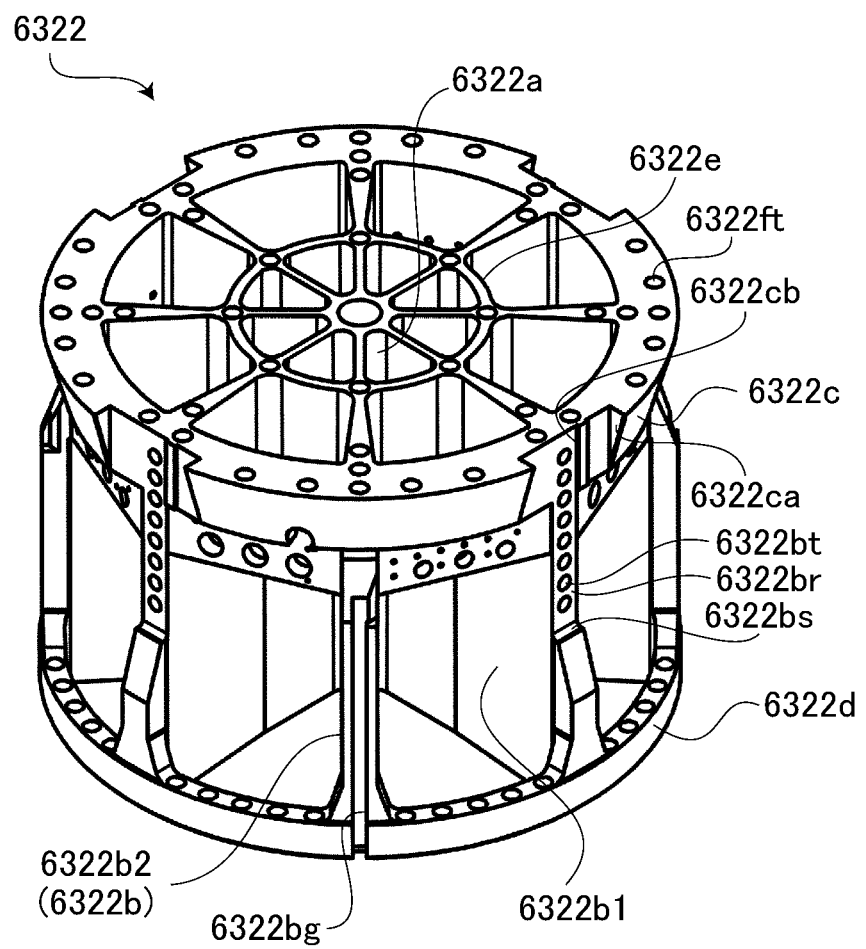
FIG. 52 is a perspective view of a frame 6322 according to the sixth embodiment of the present disclosure.
Figure 53:
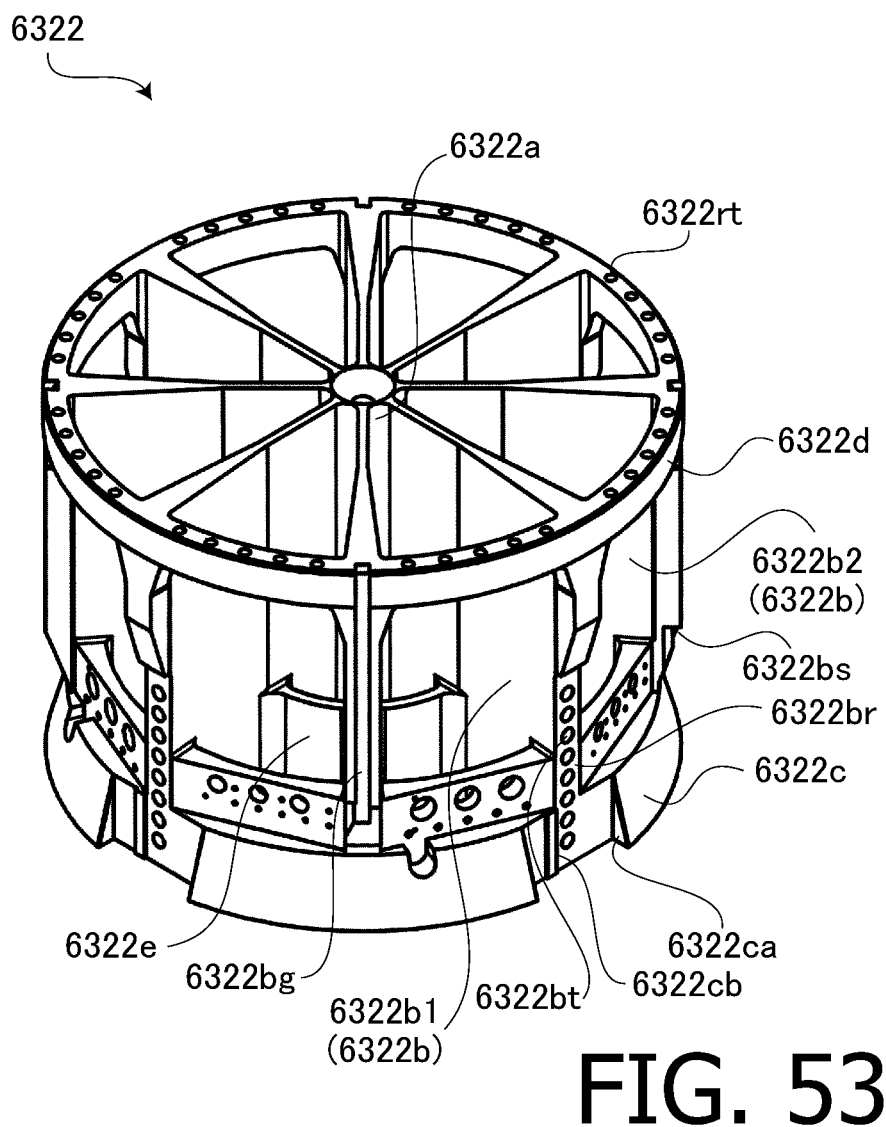
FIG. 53 is a perspective view of the frame 6322 according to the sixth embodiment of the present disclosure.

FIG. 52 and FIG. 53 are perspective views showing an outer appearance of the frame 6322. FIG. 52 is a diagram showing the frame 6322 viewed from the front side (vibrating table 400 side), and FIG. 53 a diagram showing the frame 6322 viewed from the back side. The frame 6322 as a whole is formed to have a substantially cylindrical shape of which the central axis extends in the driving direction (Z-axis direction).

The frame 6322 of the present embodiment is formed by the casting and cutting of aluminium alloys, but materials and processing methods for the frame 6322 are not limited to the above. For example, the frame 6322 may be made of other metallic materials such as stainless steels, titanium alloys or magnesium alloys, or resin materials such as glass fiber reinforced plastics (GFRP) or carbon fiber reinforced plastics (CFRP). Also, the frame 6322 may be integrally formed by welding, adhesion, bonding, injection molding, three-dimensional modeling (3D printer) or the like.

The frame 6322 includes a substantially tubular main column 6322a extending in the drive direction, eight plate-like ribs 6322b (6322b1, 6322b2) radially extending from an outer peripheral surface of the main column 6322a, a substantially circular front side peripheral edge part 6322c which couples distal ends of the eight ribs 6322b at the front side, a substantially circular back side peripheral edge part 6322d which couples distal ends of the eight ribs 6322b at the back side, and a tubular intermediate coupling part 6322e which couples intermediate portions in the radial direction (radiation direction) of the eight ribs 6322b at the front side. It is noted that, in the main column 6322a, the rod 326 (see FIG. 8) fits from below.

By adopting the configuration in which the eight ribs 6322b are circularly coupled by the front side peripheral edge part 6322c, the back side peripheral edge part 6322d and the intermediate coupling part 6322e, it is made possible to satisfy both high rigidity and weight saving of the frame 6322. Also, by providing the intermediate coupling part 6322e, it is made possible to more evenly support a base plate 6362 (to support the base plate 6362 with a face).

On a front side of the frame 6322 (specifically, the ribs 6322b, the front side peripheral edge part 6322c and the intermediate coupling part 6322e), a plurality of tapped holes 6322ft for attaching the base plate 6362 are formed. Also, on a back side of the frame 6322 (specifically, the back side peripheral edge part 6322d), a plurality of screw holes 6322rt for attaching the drive coil 321 are formed.

On each of end faces (outer peripheral surfaces) of four ribs 6322b1 out of the eight ribs 6322b, a row of screw holes 6322bt for attaching the Z-axis rails 344a of the movable part support mechanism 340 is formed. Also, on end faces of the remaining four ribs 6322b2, fitting grooves 6322bg which fit with the coil attaching parts 322d are formed. The ribs 6322b1 and the ribs 6322b2 are alternately arranged in a circumferential direction.

On a front side of an outer periphery of the front side peripheral edge part 6322c, recessed parts 6322ca are formed near the ribs 6322b so as not to interfere with the Z-axis carriages 344b of the movable part support mechanism 340. On the bottom of the recessed part 6322ca, a level difference 6322cb for positioning the Z-axis rail 344a in the horizontal direction is formed along the row of the holes 6322bt. An end face of the rib 6322b1 on a front side on which the Z-axis rail 344a is to be attached is also offset toward the main column 6322a up to the same depth as the bottom of the recessed part 6322ca, thereby forming a rail attaching surface 6322br. Also, on the end face of the rib 6322b1, a level difference 6322bs for positioning the Z-axis rail 344a in the vertical direction is formed at a boundary of the rail attaching surface 6322br.

The movable part 320 of the first embodiment described above includes a split type (two-piece) frame in which an extension frame 324 is coupled to the main frame 322 with bolts. By adopting the split type frame structure, it is made possible to additionally equip a standard electrodynamic actuator, having the main frame 322 only, with the movable part support mechanism 340.

However, since the split type frame structure requires a structure for coupling the two parts (the main frame 322 and the extension frame 324), and furthermore, the structure of the entire frame cannot be optimized (i.e., there is no choice but to design for the existing main frame 322), the split type frame structure causes the weight of the frame to increase, and thereby causes weight imbalance. Therefore, the split type frame structure is one of the causes that restrict the oscillating performance of the electrodynamic actuator. Furthermore, since the split type frame requires a process for coupling the two parts, more man-hour is necessary to assemble.

In the present embodiment, the integrated (one-piece) frame 6322 is used in place of the main frame 322 and the expansion frame 324 of the first embodiment. With this configuration, since there is no need to provide a structure for coupling a plurality of parts of the frame and the flexibility in design can be improved, the frame 6322 that is lighter, that has higher rigidity, that has better weight balance, and that can be assembled with less man-hour can be realized.

It is noted that, in the first embodiment, the top plate 322b (corresponding to the base plate 6362 of the present embodiment) for attaching the XY slider 360 is formed integrally with the expansion frame 324, but in the present embodiment, the frame 6322 and the base plate 6362 are separate members. By this configuration, it becomes unnecessary to change the design of the frame 6322 in accordance with the design of the XY slider 360, and thus designing and production management of the frame 6322 becomes easier. Furthermore, as with the first embodiment, the frame 6322 and the base plate 6362 may be integrated.

It is noted that the frame 6322 of the present embodiment can also be applied to the first to fifth embodiments.

The foregoings are descriptions of exemplary embodiments of the present disclosure. Embodiments of the present disclosure are not limited to the above-described embodiments, and various modifications are possible within a range of the technical ideas expressed by the descriptions in the scope of claims. For example, configurations of embodiments and the like explicitly illustrated in this specification and/or configurations in which configurations of embodiments and the like that are obvious, to a person with ordinary skills in the art, from this specification are combined accordingly are also included in the embodiments of this application.

Each of the above described embodiments is an example in which the present disclosure is applied to an electrodynamic oscillating device, but the present disclosure is not limited to this configuration and can be applied to oscillating devices which use other types of oscillating units (e.g., a linear motion oscillating unit in which a rotary electric motor or a hydraulic rotary motor and a rotation/linear motion conversion mechanism such as a feed screw mechanism are combined, a linear motor and the like) as well. For example, the present disclosure can be applied to a conventionally known oscillating unit in which a servo motor and a ball screw mechanism are used.

Also, each of the above described embodiments is an example in which the present disclosure is applied to an electrodynamic triaxial simultaneous oscillating device, but the present disclosure can of course be applied to uniaxial and biaxial oscillating devices as well.

Also, in the first embodiment, an air spring is used as a cushioning means for attenuating vibration of the supporting unit 350 (fixing part support mechanism), but configurations that use other types of springs that have vibration prevention effects (e.g., a coil spring made of steel) or elastic bodies (such as a vibration prevention rubber) are also possible.

The number of linear guides (one, two, three, four, or five or more) for each axis and their arrangements in the slide coupling mechanism may be selected accordingly in accordance with a size of a vibrating table, a size and weight distribution of a specimen, test conditions (frequency and amplitude) and the like. Also, the number of cross guides the XY slider 360 of the first embodiment and the YZ slider 2160, the ZX slider 2260 and the XY slider 2360 of the third embodiment include is not limited to nine, but may be set to an arbitrary number of equal to or more than three in accordance with a size of a vibrating table, a weight of a specimen, test conditions and the like.

In each of the above described embodiments (except for the fifth embodiment), the balls RE (balls) are used as rolling bodies of the linear guide, but rollers (skids) may be used as the rolling bodies.

In each of the above described embodiments (except for the fifth embodiment), eight streaks of load paths are formed to the linear guide, but a plurality of load paths of five streaks, six streaks, seven streaks, or nine or more streaks may be provided. Also, in the linear guide of each of the above described embodiments (except for the fifth embodiment), a plurality of adjacently formed path pairs are provided, but the load paths need not be provided with the path pair as a fundamental unit. A plurality of load paths may be provided at uniform intervals, or may be provided at completely non-uniform intervals. It is noted that it is also possible to use the conventional four-streak type linear guide having four streaks of load paths.

In each of the above described embodiments, the vertical direction is referred to as the Z-axis direction, but the vertical direction may be referred to as the Y-axis direction or the X-axis direction. Also, it is preferable that each oscillating direction is in the horizontal direction or the vertical direction, but the oscillating device may be arranged such that two or more axes of the three oscillating directions are in the non-vertical and non-horizontal directions.

In each of the above described embodiments, the cross guides are arranged in a square lattice in two orthogonal directions at regular intervals, but the cross guides may be arranged in a hexagonal lattice (equilateral triangle pattern). For example, the XY slider can be made to have a configuration in which the first orientation cross guide is arranged at the center of gravity of a equilateral triangle shaped periodic structure (unit lattice) on the XY plane, and the second orientation cross guide is arranged at each apex of the equilateral triangle.

In the first embodiment described above, the opening for putting the oscillated object in and out of the vibrating table 400 is formed on the top face of the box part 400a, but this opening may be provided on a side face of the box part.

In the first embodiment described above, the female screws 421 and the through holes 432, 442 for attaching the oscillated object are provided on the vibrating table 400, but other types of attaching mechanisms (e.g., fixing bands, clamps, electromagnets or the like) for attaching the oscillated object may be provided on the vibrating table 400.

The first embodiment described above is an example in which the present disclosure is applied to an electrodynamic oscillating device, but the present disclosure is not limited to this configuration and can be applied to oscillating devices which use other types of oscillating units (e.g., a linear motion oscillating unit in which a rotary electric motor or a hydraulic rotary motor and a rotation/linear motion conversion mechanism such as a feed screw mechanism are combined, a linear motor, a hydraulic cylinder and the like) as well.

Also, the oscillating device 1 of the first embodiment described above is an example in which the present disclosure is applied to a biaxial oscillating device, but the present disclosure can be applied to uniaxial and triaxial oscillating devices as well.

Each of the above described embodiments is an example in which the present disclosure is applied to an electrodynamic oscillating device, but the present disclosure is not limited to this configuration and can be applied to oscillating devices which use other types of oscillating units (e.g., a linear motion oscillating unit in which a rotary electric motor or a hydraulic rotary motor and a rotation/linear motion conversion mechanism such as a feed screw mechanism are combined, a linear motor and the like) as well. For example, the present disclosure can be applied to a conventionally known oscillating unit in which a servo motor and a ball screw mechanism are used.

Also, each of the above described embodiments is an example in which the present disclosure is applied to an electrodynamic triaxial simultaneous oscillating device, but the present disclosure can of course be applied to uniaxial and biaxial oscillating devices as well.

Also, in the first embodiment, an air spring is used as a cushioning means for attenuating vibration of the supporting unit 350 (fixing part support mechanism), but configurations that use other types of springs that have vibration prevention effects (e.g., a coil spring made of steel) or elastic bodies (such as a vibration prevention rubber) are also possible.

The number of linear guides (one, two, three, four, or five or more) for each axis and their arrangements in the slide coupling mechanism may be selected accordingly in accordance with a size of a vibrating table, a size and weight distribution of a specimen, test conditions (frequency and amplitude) and the like. Also, the number of cross guides the XY slider 360 of the first embodiment and the YZ slider 2160, the ZX slider 2260 and the XY slider 2360 of the third embodiment include is not limited to nine, but may be set to an arbitrary number of equal to or more than three in accordance with a size of a vibrating table, a weight of a specimen, test conditions and the like.

In the above described embodiments, the balls RE (balls) are used as rolling bodies of the linear guide, but rollers (skids) may be used as the rolling bodies.

In the above described embodiments, eight streaks of load paths are formed to the linear guide, but a plurality of load paths of five streaks, six streaks, seven streaks, or nine or more streaks may be provided. Also, in the linear guides of the above described embodiments (except for the fifth embodiment), a plurality of adjacently formed path pairs are provided, but the load paths need not be provided with the path pair as a fundamental unit. A plurality of load paths may be provided at uniform intervals, or may be provided at completely non-uniform intervals.

Furthermore, configurations in which parts of the components of each of the above described embodiments are removed, configurations in which a plurality of the above described embodiments are combined, and configurations in which parts or all of the components of two or more of the above described embodiments are combined are also included in the scope of the present disclosure.

<Supplement>

A triaxial oscillating device that oscillates a sample fixed to a vibrating table in three orthogonal axis directions is known. To oscillate the sample in three orthogonal axis directions, for example, the vibrating table and an X-axis actuator for oscillating the vibrating table in the X-axis direction need to be coupled slidably in two directions orthogonal to the X-axis (Y-axis direction and Z-axis direction) with a biaxial slider. An oscillating device that enables triaxial oscillation at a high frequency range by adopting biaxial sliders which use roller bearing type linear guideways (Hereinafter simply referred to as "linear guide.") that includes rolling bodies is conventionally known.

In the conventionally known oscillating device, slide coupling mechanisms for horizontal driving (YZ slider, ZX slider) that couple the vibrating table to actuators which drive in horizontal directions (X-axis actuator, Y-axis actuator) are connected to the vibrating table via one Y-axis or X-axis rail.

That is, since the conventionally known oscillating device is configured to receive moments of forces about the Y-axis (or X-axis) that act on the slide coupling mechanism for horizontal driving only with one thin Y-axis rail (or X-axis rail), a rigidity against the moments of forces about the Y-axis (or X-axis) is lower than a rigidity against moments of forces about the Z-axis. This was one of the causes that block improvement in an accuracy of the oscillating device (especially the improvement in the oscillating performance at high frequency ranges).

An aspect of the present disclosure is made in view of the above situation, and the object of the present disclosure is to improve the oscillating performance by improving the rigidity of the slide coupling mechanism.

What is claimed is:

1. An oscillating device comprising:
   a vibrating table configured to directly hold a specimen and transmit a vibration to the specimen;
   a first actuator configured to oscillate the vibrating table in a first direction;
   a first slide coupling attached to a first side of the vibrating table between the first actuator and the vibrating table, the vibrating table being configured to slideably move relative to the first actuator and in a second direction orthogonal to the first direction; and
   a first counter balancer including:
      a weight fastened to a second side of the vibrating table opposite to the first side, the first counter balancer being configured to compensate a first imbalance of an oscillated portion including at least the vibrating table, the first imbalance being caused by attaching the first slide coupling to the vibrating table, the weight including:
         a first weight member fixed to the vibrating table by a first bolt,
         a second weight member fixed to the first weight member by a second bolt, and
         a third weight member fixed to the second weight member by a third bolt; and
      a cushion disposed between the weight and the vibrating table, the cushion including:
         a first cushioning member disposed between the vibrating table and the first weight member,
         a second cushioning member disposed between the first weight member and the second weight member, and
         a third cushioning member disposed between the second weight member and the third weight member.

2. The oscillating device according to claim 1, wherein the weight has a flat plate shape.

3. The oscillating device according to claim 1, wherein the cushion has a sheet shape.

4. The oscillating device according to claim 1, wherein the cushion includes an elastomer.

5. The oscillating device according to claim 1, wherein the cushion includes a spacer configured to support the weight of the first counter balancer.

6. The oscillating device according to claim 1, wherein:
   the first counter balancer includes a plurality of bolts configured to fasten the weight to the second side of the vibrating table, and the plurality of bolts are disposed at intervals equal to or less than 100 mm.

7. The oscillating device according to claim 6, wherein the plurality of bolts are disposed at intervals equal to or less than 50 mm.

8. The oscillating device according to claim 1, further comprising:
   a second actuator configured to oscillate the vibrating table in the second direction;
   a third actuator configured to oscillate the vibrating table in a third direction;
   a second slide coupling attached to a third side of the vibrating table between the second actuator such that the vibrating table is configured to slideably move relative to the second actuator in the first direction and the third direction;
   a third slide coupling attached to a fourth side of the vibrating table between the third actuator such that the vibrating table is configured to slideably move relative to the third actuator in the first direction and the second direction; and
   a second counter balancer attached to the vibrating table and configured to compensate a second imbalance of the oscillated portion, the second imbalance being caused by attaching the third slide coupling to the vibrating table,
   wherein the vibrating table is configured to slideably move relative to the first actuator in the third direction.

9. The oscillating device according to claim 8, wherein:
   the third slide coupling includes:
      a first linear guideway configured to guide a linear motion of the vibrating table in the first direction; and
      a second linear guideway configured to guide a linear motion of the vibrating table in the second direction,
   the vibrating table is coupled with the third actuator via the first linear guideway and the second linear guideway,
   the first linear guideway includes:
      a rail extending in the first direction; and
      a carriage engageable with the rail and slidable relative to the rail in the first direction, and
   eight load paths are formed between the carriage and the rail, each of the eight load paths being configured to have a plurality of rolling bodies roll along a length of the eight load paths.

10. An oscillating device comprising:
    a vibrating table configured to directly hold a specimen and transmit a vibration to the specimen;
    an actuator configured to oscillate the vibrating table in a first direction;
    a slide coupling attached to a first side of the vibrating table between the actuator and the vibrating table, the vibrating table being configured to slideably move relative to the actuator and in a second direction orthogonal to the first direction; and
    a counter balancer attached to the vibrating table and configured to compensate an imbalance of an oscillated portion including at least the vibrating table, the imbalance being caused by attaching the coupling mechanism to the vibrating table, the counter balancer including a first weight fixed to the vibrating table via a first cushion, the first weight being configured to receive a second weight separated from the first weight by a second cushion, and a third cushion disposed between the second weight and a third weight, wherein:
       the first weight is fixed to the vibrating table by a first bolt,
       the second weight is fixed to the first weight by a second bolt, and
       the third weight is fixed to the second weight by a third bolt.

11. The oscillating device according to claim 10, wherein the first cushion includes a spacer configured to support the first weight of the counter balancer.

12. The oscillating device according to claim 10, wherein:
    the counter balancer includes a plurality of bolts configured to fasten the first weight to the second side of the vibrating table, and
    the plurality of bolts are disposed at intervals equal to or less than 100 mm.

13. The oscillating device according to claim 12, wherein the plurality of bolts are disposed at intervals equal to or less than 50 mm.

14. An oscillating device comprising:
- a vibrating table configured to directly hold a specimen and transmit a vibration to the specimen;
- an actuator configured to oscillate the vibrating table in a first direction;
- a slide coupling attached to a first side of the vibrating table between the actuator and the vibrating table, the vibrating table being configured to slideably move relative to the actuator and in a second direction orthogonal to the first direction; and
- a counter balancer including:
  - a weight fastened to a second side of the vibrating table opposite to the first side, the counter balancer being configured to compensate an imbalance of an oscillated portion including at least the vibrating table, the imbalance being caused by attaching the slide coupling to the vibrating table, the weight including:
    - a first weight member fixed to the vibrating table by a first bolt,
    - a second weight member fixed to the first weight member by a second bolt, and
    - a third weight member fixed to the second weight member by a third bolt, and
  - a cushion disposed between the weight and the vibrating table, the cushion including:
    - a first cushioning member disposed between the vibrating table and the first weight member,
    - a second cushioning member disposed between the first weight member and the second weight member, and
    - a third cushioning member disposed between the second weight member and the third weight member.

* * * * *